US007618606B2

(12) United States Patent
Fan et al.

(10) Patent No.: US 7,618,606 B2
(45) Date of Patent: Nov. 17, 2009

(54) SEPARATION OF CARBON DIOXIDE ($CO_2$) FROM GAS MIXTURES

(75) Inventors: Liang-Shih Fan, Columbus, OH (US); Himanshu Gupta, Columbus, OH (US); Mahesh V. Iyer, Columbus, OH (US)

(73) Assignee: The Ohio State University, Columbus, OH (US)

( * ) Notice: Subject to any disclaimer, the term of this patent is extended or adjusted under 35 U.S.C. 154(b) by 679 days.

(21) Appl. No.: 11/255,099

(22) Filed: Oct. 20, 2005

(65) Prior Publication Data

US 2006/0093540 A1 May 4, 2006

Related U.S. Application Data

(63) Continuation-in-part of application No. 10/359,763, filed on Feb. 6, 2003, now Pat. No. 7,067,456.

(51) Int. Cl.
*B01D 53/04* (2006.01)
(52) U.S. Cl. ........................ 423/230; 423/220
(58) Field of Classification Search ............... 423/220, 423/230; 502/38, 51
See application file for complete search history.

(56) References Cited

U.S. PATENT DOCUMENTS

| | | | |
|---|---|---|---|
| 1,798,802 A | 3/1931 | Niles | |
| 3,194,732 A | 7/1965 | Neuhauser | |
| 3,749,380 A | 7/1973 | Strom et al. | |
| 3,864,450 A | 2/1975 | Takeyama et al. | |
| 4,081,522 A | 3/1978 | Hubble et al. | |
| 4,088,736 A | 5/1978 | Courty et al. | |
| 4,115,518 A | 9/1978 | Delmon et al. | |
| 4,174,373 A | 11/1979 | Yoshida et al. | |
| 4,212,854 A | 7/1980 | Maki et al. | |
| 4,215,096 A | 7/1980 | Sinha et al. | |
| 4,226,839 A | 10/1980 | O'Neill et al. | 423/177 |
| 4,312,280 A | 1/1982 | Shearer et al. | |
| 4,409,124 A * | 10/1983 | Robinson et al. | 502/22 |
| 4,433,981 A * | 2/1984 | Slaugh et al. | 95/139 |
| 4,442,078 A | 4/1984 | Jalan et al. | |
| 4,442,221 A * | 4/1984 | Bishop et al. | 502/25 |
| 4,533,532 A | 8/1985 | Gebhard et al. | 423/244 |
| 4,544,542 A | 10/1985 | Angevine et al. | |
| 4,613,487 A | 9/1986 | Yoon et al. | |
| 4,729,889 A | 3/1988 | Flytani-Stephanopoulos et al. | 423/593 |
| 4,748,010 A | 5/1988 | Walker | |
| 4,772,455 A | 9/1988 | Izumi et al. | |
| 4,855,276 A | 8/1989 | Osborne et al. | |
| 4,871,522 A | 10/1989 | Doyle | |
| 4,937,059 A | 6/1990 | Kolts et al. | |
| 4,950,409 A | 8/1990 | Stanforth | 210/751 |
| 5,053,238 A | 10/1991 | Zeidler et al. | |
| 5,078,973 A | 1/1992 | Kuroda et al. | |
| 5,084,256 A | 1/1992 | McElroy et al. | 423/244 |
| 5,087,597 A | 2/1992 | Leal et al. | 502/62 |
| 5,130,106 A | 7/1992 | Koves et al. | |
| 5,160,715 A | 11/1992 | Pinnavaia et al. | 423/244.08 |
| 5,186,914 A | 2/1993 | Yoshihiro et al. | |
| 5,232,793 A | 8/1993 | Miyauchi et al. | |
| 5,275,739 A | 1/1994 | Grant et al. | 210/682 |
| 5,334,564 A | 8/1994 | Pinnavaia et al. | |
| 5,492,676 A | 2/1996 | Katatani et al. | |
| 5,520,894 A | 5/1996 | Heesink et al. | |
| 5,525,317 A | 6/1996 | Bhat et al. | |
| 5,585,081 A | 12/1996 | Chu et al. | |
| 5,653,785 A | 8/1997 | Horio et al. | |
| 5,779,464 A | 7/1998 | Fan et al. | 423/244.08 |
| 5,895,634 A | 4/1999 | Mitsuoka et al. | |
| 5,902,561 A | 5/1999 | Carrea et al. | |
| 5,939,118 A | 8/1999 | Cox et al. | |
| 6,224,839 B1 | 5/2001 | Fan et al. | |
| 6,309,996 B1 | 10/2001 | Fan et al. | |
| 6,358,554 B1 | 3/2002 | Hagiwara et al. | |
| 6,569,388 B1 | 5/2003 | Fan et al. | |
| 6,669,917 B2 | 12/2003 | Lyon | |
| 6,682,838 B2 | 1/2004 | Stevens | 429/17 |
| 6,692,545 B2 | 2/2004 | Gittleman et al. | 48/128 |
| 6,723,230 B1 | 4/2004 | Chen et al. | |
| 6,737,031 B2 | 5/2004 | Beal et al. | 423/320 |
| 6,790,430 B1 | 9/2004 | Lackner et al. | 423/648.1 |
| 6,834,623 B2 | 12/2004 | Cheng | |
| 6,880,635 B2 | 4/2005 | Vinegar et al. | |

(Continued)

FOREIGN PATENT DOCUMENTS

CA 2401279 A1 8/2001

(Continued)

OTHER PUBLICATIONS

Agnihotri et al., Influence of Surface Modifiers on the Structure of Precipitated Calcium Carbonate, Ind. Eng. Chem. Res. 1999, 38, pp. 2283-2291.

(Continued)

*Primary Examiner*—Edward M Johnson
(74) *Attorney, Agent, or Firm*—Standley Law Group LLP

(57) ABSTRACT

A reaction-based process has been developed for the selective removal of carbon dioxide from a multicomponent gas mixture. The proposed process effects the separation of $CO_2$ from a mixture of gases by its reaction with metal oxides. The Calcium based Reaction Separation for $CO_2$ process consists of contacting a $CO_2$ laden gas with calcium oxide in a reactor such that CaO captures the $CO_2$ by the formation of calcium carbonate. Once "spent", $CaCO_3$ is regenerated by its calcination leading to the formation of fresh CaO sorbent. The "regenerated" CaO is then recycled for the further capture of more $CO_2$. This process also identifies the application of a mesoporous $CaCO_3$ structure, that attains >90% conversion over multiple carbonation and calcination cycles. Lastly, thermal regeneration (calcination) under vacuum provided a better sorbent structure that maintained reproducible reactivity levels over multiple cycles.

20 Claims, 38 Drawing Sheets

U.S. PATENT DOCUMENTS

| | | | |
|---|---|---|---|
| 6,911,057 | B2 | 6/2005 | Lyon .......................... 48/77 |
| 7,008,967 | B2 | 3/2006 | Keyser et al. |
| 7,067,456 | B2 | 6/2006 | Fan et al. |
| 2002/0197199 | A1 | 12/2002 | Fan et al. |
| 2003/0007918 | A1 | 1/2003 | Fan et al. |
| 2003/0113239 | A1 | 6/2003 | Pahlman et al. |
| 2003/0224932 | A1 | 12/2003 | Saaski et al. |
| 2004/0237404 | A1 | 12/2004 | Andrus, Jr. et al. ............ 48/101 |
| 2004/0261617 | A1 | 12/2004 | Stewart ........................ 95/96 |
| 2005/0042166 | A1 | 2/2005 | Kindig et al. |
| 2005/0175533 | A1 | 8/2005 | Thomas et al. |
| 2005/0197411 | A1 | 9/2005 | Lowe et al. |
| 2006/0039853 | A1 | 2/2006 | Fan et al. .................... 423/637 |
| 2006/0177546 | A1 | 8/2006 | Hoehne |
| 2006/0211571 | A1 | 9/2006 | Iyer et al. |

FOREIGN PATENT DOCUMENTS

| | | |
|---|---|---|
| DE | 3335499 A1 | 4/1985 |
| DE | 3512169 A1 | 10/1986 |
| DE | 265559 A1 | 3/1989 |
| EP | 0467526 A2 | 1/1992 |
| EP | 1251948 | 10/2002 |
| EP | 1332783 A1 | 8/2003 |
| JP | 49-84956 A | 8/1974 |
| JP | 59-52516 A | 3/1984 |
| JP | 63-171623 A | 7/1988 |
| JP | 10-15353 A | 1/1998 |
| KR | 2002-0040234 A | 5/2002 |
| WO | 97/25138 A1 | 7/1997 |
| WO | 99/56868 A1 | 11/1999 |
| WO | 01/08785 A1 | 2/2001 |
| WO | 01/56689 A1 | 8/2001 |
| WO | 01/74491 A2 | 10/2001 |
| WO | 2006/099599 A2 | 9/2006 |
| WO | 2007082089 A2 | 7/2007 |
| WO | 2008039783 A2 | 4/2008 |

OTHER PUBLICATIONS

Barker, "The Reversibility of the Reaction $CaCO_3 \leftrightarrows CaO + CO_2$", J. appl. Chem. Biotechnol. 1973, 23, pp. 733-742.

Barker, "The Reactivity of Calcium Oxide Towards Carbon Dioxide and Its Use fro Every Storage", J. appl. Chem. Biotechnol. 1974, 24, pp. 221-227.

Bhatia et al., "Effect of the Poduct Layer on the Kinetics of the $CO_2$-Lime Reaction", AIChE Journal, vol. 29, No. 1, Jan. 1983, pp. 79-86.

Blauwhoff et al., "A Study on the Reaction Between $CO_2$ and Alkanolamines in Aqueous Solutions", Chemical Engineering Science, vol. 39, No. 2, 1984, pp. 207-225.

Borgwardt, "Sintering of Nascent Calcium Oxide", Chemical Engineering Science, vol. 44, No. 1, 1989, pp. 53-60.

Bortz et al. "Recent IFRF Fundamental and Pilot Scale Studies on the Direct Sorbent Injection Process", International Flame Research Foundation, 1985, pp. 17-1-17-22.

Bruce et al., "Comparative $SO_2$ Reactivity of CaO Derived from $CaCO_3$ and $Ca(OH)_2$", AIChE Journal, vol. 35, No. 1, Jan. 1989, pp. 37-41.

Butt et al., "Kinetics of Thermal Dehydroxylation and Carbonation of Magnesium Hydroxide", J. Am. Ceram. Soc., vol. 79, No. 7, 1996, pp. 1892-1898.

Dedman et al., "Calcium Cyanamide Synthesis", Explosives Research and Development Establishment, Ministry of Aviation, Mar. 1962, pp. 2027-2035.

Fernández et al., "Kinetic study of carbonation of MgO slurries", Hydrometallurgy 53, 1999, pp. 155-167.

Ghosh-Dastidar et al. "Selenium Capture Using Sorbent Powders: Mechanisms of Sorption by Hydrated Lime", Sep. 11, 1995.

Ghosh-Dastidar, et al. "Ultrafast Calcination and Sintering of $Ca(OH)_2$ Powder: Experimental & Modeling", Chemical Engineering Science, vol. 50, No. 13, 1995, pp. 2029-2040.

Gullett et al., "Pore Distribution Changes of Calcium-Based Sorbents Reacting with Sulfur Dioxide", AIChE Journal, vol. 33, No. 10, pp. 1719-1726.

Gupta et al., "NOx Reduction By Carbonaceous Materials and $CO_2$ Separation Using Regenerative Metal Oxides From Fossil Fuel", Dissertation, The Ohio State University, cataloged Oct. 1, 2001, 75 pages.

Gupta et al., "Carbonation-Calcination Cycle Using High Reactivity Calcium Oxide for Carbon Dioxide Separation From Flue Gas", Ind. Eng. Chem. Res. 2002, 41, pp. 4035-4042.

Herzog et al., "$CO_2$ Capture, Reuse, and Storage Technologies for Mitigating Global Climate Change" A White Paper Final Report, Energy Laboratory, Jan. 1997, 70 pages.

Kaplan, "Cost-saving process recovers $CO_2$ from power-plant fluegas", Chemical Engineering, Nov. 1982, pp. 30-31.

Kato et al., "Utilization of High Temperature Heat From Nuclear Reactor Using Inorganic Chemical Heat Pump", Progress in Nuclear Energy, vol. 32, No. 3/4, 1998, pp. 563-570.

Kato et al., "Kinetic feasibility of a chemical heat pump for heat utilization of high-temperature processes", Applied Thermal Engineering 19, 1999, pp. 239-254.

Keeling, "Atmospheric CO2 concentrations (ppmv) derived from in situ air samples collected at Mauna Loa Observatory, Hawaii", http://cdiac.esd.ornl.gov/ftp/maunaloa-co2/maunaloa.co2, Jul. 25, 2003, 2 pages.

Kikkinides et al., "Concentration and Recovery Of $CO_2$ from Flue Gas by Pressure Swing Adsorption", Ind. Eng. Chem. Res. 1993, 32, pp. 2714-2720.

Kirchgessner et al., "Lignosulfonate-Modified Calcium Hydroxide for Sulfur Dioxide Control", Ind. Eng. Chem. Res. 1987, 26, pp. 2397-2400.

Kirchgessner et al., "Enhancement of Reactivity in Surfactant-Modified Sorbents for Sulfurdioxide Control", Ind. Eng. Chem. Res. 1989, 28, pp. 413-418.

Mahuli et al., "Pore-Structure Optimization of Calcium Carbonate for Enhanced Sulfation", 1997, 13 pages.

Mess et al., "Product Layer Diffusion during the Reaction of Calcium Oxide with Carbon Dioxide", Energy & Fuels 1999, 13, pp. 999-1005.

Milne et al., "High-Temperature, Short-Time Sulfation of Calcium-Based Sorbents", Ind. Eng. Chem. Res. 1990, 29, pp. 2201-2214.

Mimura et al., "Development of Energy Saving Technology for Flue Gas Carbon Dioxide Recovery in Power Plant by Chemical Absorption Method and Steam System", Energy Convers. Mgmt., vol. 38, Suppl., 1997, pp. S57-S62.

Pauley et al., "N-ReN Recovers $CO_2$ From flue gas economically," Technology Oil and Gas Journal, May 1984, 87-92.

Raghunathan et al., "A technique for the study of ultrafast gas-solid reactions for residence times less than 100 ms", Rev. Sci. Instrum. 63(11), Nov. 1992, pp. 5469-5471.

Sawada et al., "Thermal analysis of basic zinc carbonate." Part 1. Carbonation process of zinc oxide powders at 8 and 13° C., Thermochimica Acta 273, 1996, pp. 95-102.

Shaheen et al., "Effect of thermal treatment on physicochemical properties of pure and mixed manganese carbonate and basic copper carbonate", Thermochimica Acta 322, 1998, pp. 117-128.

Tinkler et al., "Towards a Coal-Capable Solid Oxide Fuel Cell System", Proceedings of the 26th International Technical Conference on Coal Utilization and Fuel Systems, Clearwater, Florida, Mar. 5-8, 2001, pp. 569-570.

Wei et al., "High Surface Area Calcium Carbonate: Pore Structural Properties and Sulfation Characteristics", Ind. Eng. Chem. Res. 1997, 36, pp. 2141-2148.

Abanades, J.C., "The maximum capture efficiency of CO2 using a carbonation/calcinations cycle of CaO/CaCO3", Chemical Engineering Journal, 90, 2002, pp. 303-306.

Abanades, J.C. et al., "Conversion Limits in the Reaction of CO2 with Lime", Energy and Fuels, 17(2), 2003, pp. 308-315.

Adánez, J. et al., "Regeneration of Sulfided Dolomite with Steam and Carbon Dioxide", Energy & Fuels, 15(1), 2001, pp. 85-94.

Agnihotri, R. et al., "Sorbent/Ash Reactivation for Enhanced SO2 Capture Using a Novel Carbonation Technique", Ind. Eng. Chem. Res., 38(3), 1999, pp. 812-819.

Al-Shawabkeh et al., Enhanced SO2 Abatement with Water-Hydrated Dolomitic Particles, AIChE Journal, 43(1), Jan. 1997, 173-179.

Balasubramanian, B. et al., "Hydrogen from methane in a single-step process", Chemical Engineering Science, 54, 1999, pp. 3534-3552.

Beruto, D. et al., "Calcium oxides of high reactivity", Nature, 263, Sep. 16, 1976, pp. 221-222.

Beruto, D. et al., "Characterization of the Porous CaO Particles Formed by Decomposition of CaCO3 and Ca(OH) 2 in Vacuum", Journal of The American Ceramic Society, 63(7/8), 1980, pp. 439-443.

Bhatia, S.K. et al., "The Effect of Pore Structure on Fluid-Solid Reactions: Application to the SO2-Lime Reaction", AIChE Journal, 27(2), Mar. 1981, pp. 226-234.

Biswas, S.C. et al., "Hydrgen Sulphide from Reduced Gypsum", Fert. Technol., 13(4), 1976, pp. 255-258.

Brooks, M.W. et al., "Recovery of Calcium Carbonate and Hydrogen Sulfide from Waste Calcium Sulfide", Ind. Eng. Chem. Res., 36(10), 1997, pp. 4236-4242.

Chauk, S.S. et al., "Kinetics of High-Pressure Removal of Hydrogen Sulfide Using Calcium Oxide Powder", AIChE Journal, 46(6), Jun. 2000, pp. 1157-116.

Couturuer, M.F. et al., "Reactivation of Partially-Sulphated Limestone Particles form a CFB Combustor by Hydration", The Canadian Journal of Chemical Engineering, 72, Feb. 1994, pp. 91-97.

Dash, S. et al., "Nanocrystalline and metastable phase formation in vacuum thermal decomposition of calcium carbonate", Thermochimica Acta, 363, 2000, pp. 129-135.

Davis, C. et al., "High value opportunities from the chicken egg", RIRDC Publication No. 02/094, Aug. 2002, 69 pages.

Davison, R.L. et al., "Trace Elements in Fly Ash", Environmental Science & Technology, 8(13), Dec. 1974, pp. 1107-1113.

Deshmukh, A.C. et al., "Preservation of Hatchery Waste by Lactic Acid Fermentation. 2. Large Scale Fermentation and Feeding Trial to Evaluate Feeding Value.", Poultry Science, 76, 1997, pp. 1220-1226.

Dismukes, E.B., "Trace element control in electrostatic precipitators and fabric filters", Fuel Processing Technology, 39, 1994, pp. 403-416.

Doong, S. et al., "A Novel Membrane Reactor For Direct Hydrogen Production From Coal", DOE Final Technical Report, http://www.osti.gov/bridge/servlets/purl/876470-v2hbxY/876470.PDF, Jan. 2006, 58 pages.

Fan, L.S. et al., "Clean Coal Technologies: Oscar and Carbonox Commercial Demonstrations", AIChE Journal, 48(10), Oct. 2002, pp. 2115-2123.

Fenouil, L.A. et al., "Study of Calcium-Based Sorbents for High-Temperature H2S Removal. 1. Kinetics of H2S Sorption by Uncalcined Limestone", Ind. Eng. Chem. Res., 34(7), 1995, pp. 2324-2333.

Fenouil, L.A. et al., "Study of Calcium-Based Sorbents for High-Temperature H2S Removal. 2. Kinetics of H2S Sorption by Calcined Limestone", Ind. Eng. Chem. Res., 34(7), 1995, pp. 2334-2342.

Froning, G.W., "Recent Advances in Egg Products Research and Development", University of California Egg Processing Workshop, Jun. 2-3, 1998, 7 pages.

Froning, G.W. et al., "Research Note: Utilisation of Inedible Eggshells and Technical Egg White Using Extrusion Technology", Poultry Science, 69, 1990, pp. 2051-2053.

Germani, M.S. et al., "Vapor-Phase Concentrations of Arsenic, Selenium, Bromine, Iodine, and Mercury in the Stack of a Coal-Fired Power Plant", Environ. Sci. Technol., 22(9), 1988, pp. 1079-1085.

Ghosh-Dastidar, A. et al., "Investigation of High-Reactivity Calcium Carbonate Sorbent for Enhanced SO2 Capture", Ind. Eng. Chem. Res., 35(2), 1996, pp. 598-606.

Gittins, J. et al., "Utilisation of Egg Shell Waste from UK Egg Processing and Hatchery Establishments", ADAS report, http://www.defra.gov.uk.foodrin/poultry/utilisation.htm, May 2002, 7 pages.

Gullett, B.K. et al., "Reduction of Coal-Based Metal Emissions by Furnace Sorbent Injection", Energy and Fuels, 8(5), 1994, pp. 1068-1076.

Gupta, H. et al., "Reactive separation of CO2 using pressure pelletized limestone", Int. J. Environmental Technology and Management, 4,(1/2), 2004, pp. 3-20.

Gupta, H. et al., The Role of CaO in Maximizing Hydrogen Production from Fossil Fuels, Proceedings from Fuel Cell Seminar, San Antonio, Texas, 2004, 4 pages.

Hajaligol, M.R. et al., "Analysis and Modeling of the Direct Sulfation of CaCo3", Ind. Eng. Chem. Res., 27(12), 1988, pp. 2203-2210.

Hartman, M. et al., "Reaction of Sulfur Dioxide with Limestone and the Grain Model", AIChE Journal, 22(3), May 1976, pp. 490-498.

Hartman, M. et al., "Reaction of Sulfur Dioxide with Limestone and the Influence of Pore Structure", Ind. Eng. Chem., Process Des. Develop, 13(3), 1974, pp. 248-253.

Hartman, M. et al., "Reactions between Calcium Oxide and Flue Gas Containing Sulfur Dioxide at Lower Temperatures", AIChE Journal, 39(4), Apr. 1993, pp. 615-624.

Herzog, H. et al., "Feasibility, Modeling and Economics of Sequestering Power Plant CO2 Emissions In the Deep Ocean", Environmental Progress, 10(1), Feb. 1991, pp. 64-74.

Heuchel, M. et al., "Adsorption of Carbon Dioxide and Methane and Their Mixtures on an Activated Carbon: Simulation and Experiment", Langmuir, 15(25), 1999, pp. 8695-8705.

Ho, T.C. et al., "Lead and Cadmium Capture by Various Sorbents During Fluidized Bed Combustion/Incineration", Fluidization VIII, International Symposium of the Engineering Foundation, Tours, France, May 14-19, 1995, pp. 899-906.

Ho, T.C. et al., "Metal Behavior and Metal Capture by Sorbents During Fluidized Bed Coal Combustion", Department of Chemical Engineering, Lamar University, pp. 281-286.

Hufton, J.R. et al., "Sorption-Enhanced Reaction Process for Hydrogen Production", AIChE Journal, 45(2), Feb. 1999, pp. 248-256.

Ida, J.I. et al., "Mechanism of High-Temperature CO2 Sorption on Lithium Zirconate", Environ. Sci. Technol., 37(9), 2003, pp. 1999-2004.

Iyer, M.V. et al., "Multicyclic Study on the Simultaneous Carbonation and Sulfation of High Reactivity CaO", Ind. Eng. Chem. Res., 43(14), 2004, pp. 3939-3947.

Iyer, M. et al., "Novel Calcium-based Reactive Separation of CO2 from Flue Gas: Effect of SO2", Presented at the 20th Annual International Pittsburgh Coal Conference, Pittsburgh, PA, Paper S-1, 2003, pp. 1-11.

Jadhav, R.A. et al., "Mechanism of Selenium Sorption by Activated Carbon", The Canadian Journal of Chemical Engineering, 78, Feb. 2000, pp. 168-174.

Jia, C.Q. et al., "A kinetic study of the generation of hydrogen sulphide from aqueous calcium sulphide slurry with carbon dioxide", Waste Process. Recycl. Min. Metall. Ind., Proc. Int. Symp., 1992, pp. 215-227.

Jozewicz, W. et al., "Fly Ash Recycle in Dry Scrubbing", Environmental Progress, 5(4), Nov. 1986, pp. 219-224.

Jozewicz, W. et al., "Reaction Mechanisms of Dry Ca-Based Sorbents with Gaseous HCl", Ind. Eng. Chem. Res., 34(2), 1995, pp. 607-612.

Jozewicz, W. et al., "Reactivation of Solids from Furnace Injections of Limestone for SO2 Control", Environ. Sci. Technol., 21(7), 1987, pp. 664-670.

Kato, M. et al., "Carbon dioxide absorption by lithium orthosilicate in a wide range of temperature and carbon dioxide concentrations", Journal of materials Science Letters, 21, 2002, pp. 485-487.

Keairns, D.L. et al., "Sulfur Emission Control With Limestone/Dolomite In Advanced Fossil Fuel-Processing Systems", Environmental Aspects of Fuel Conversion Technology, St. Louis, MO, 1974; Research Triangle Institute: Research Triangle Park, NC, 1974, pp. 135-146.

Khan, T. et al., "Improving Limestone Utilization in Circulating Fluidized Bed Combustors Through the Reactivation and Recycle of Partially Utilized Limestone in the Ash", Fluidized Bed Combustion, 2, ASME, 1995, pp. 831-840.

Li, G.G. et al., "CO2 reaction with Ca(OH)2 during SO2 removal with convective pass sorbent injection and high temperature filtration", Environ Eng Policy, 2, 2000, pp. 47-56.

Lin, S.Y. et al., "Developing an innovative method, HyPr-RING, to Product Hydrogen from hydrocarbons", Energy Conversion and Management, 43, 2002, pp. 1283-1290.

Lin, S. et al., "Process analysis for hydrogen production by reaction integrated novel gasification (HyPr-RING)", Energy Conversion and Management, 46, 2005, pp. 869-880.

Mahuli, S. et al., "Mechanism of Arsenic Sorption by Hydrated Lime", Environ. Sci. Technol., 31(11), 1997, pp. 3226-3231.

Markowski, G.R. et al., "Trace Element Concentration as a Function of Particle Size in Fly Ash from a Pulverized Coal Utility Boiler", Env. Sci. Tech., 19(9), 1985, pp. 796-804.

Martinez, J.C. et al., Reactivation of Fly Ash and Ca(OH)2 Mixtures for SO2 Removal of Flue Gas, Ind. Eng. Chem. Res., 30(9), 1991, pp. 2143-2147.

Marquis, D.L., "Reactivation of Spent CFB Limestone by Hydration", Master of Science in Engineering Thesis, The University of New Brunswick, Fredericton, NB, Sep. 1992, 179 pages.

Newsome, D.S., "The Water-Gas Shift Reaction", Catal. Rev. Sci. Eng., 21(2), 1980, pp. 275-318.

Nishev, T. et al., "Kinetics of Carbonization of Calcium Sulfide in Water Suspension", J. Chem. Tech. Biotechnol., 56, 1993, pp. 271-272.

Oakeson, W.G. et al., "Effect of CO2 Pressure on the Reaction with CaO", Journal of The American Ceramic Society, 62(11-12), 1979, pp. 556-558.

Ondov, J.M. et al., "Emissions and Particle-Size Distributions of Minor and Trace Elements at Two Western Coal-Fired Power Plants Equipped with Cold-Side Electrostatic Precipitators", Environmental Science & Technology, 13(8), Aug. 1979, pp. 946-953.

Ortiz, L.A. et al., "Hydrogen Production Using Sorption Enhanced Reaction", Ind. Eng. Chem. Res., 40(23), 2001, pp. 5102-5109.

Qiu, K. et al., "Oxidation behaviour of desulphurization residues from gasification and fuel-rich combustion", Fuel, 78, 1999, pp. 225-231.

Rao, A.B. et al., "A Technical, Economic, and Environmental Assessment of Amine-Based CO2 Capture Technology for Power Plant Greenhouse Gas Control", Environ. Sci. Technol., 36(20), 2002, pp. 4467-4475.

Reimer, P. et al., "CO2 Capture from Power Generation", IEA Greenhouse Gas R&D Programme, Cheltenham, Gloucester, U.K., www.ieagreen.org.uk, 2001, 2 pages.

Roark, S.E. et al., "Hydrogen Separation Membranes For Vision 21 Energy Plants", Proceedings of the International Technical Conference on Coal Utilization & Fuel Systems, 27(1), 2002, 11 pages.

Rosen, M.A. et al., "Comparative Efficiency Assessments for a Range of Hydrogen Production Processes", Int. J. Hydrogen Energy, 23(8), 1998, pp. 653-659.

Rosen, M.A. et al., "Thermodynamic Comparison of Hydrogen Production Processes", Int. J. Hydrogen Energy, 21 (5), 1996, pp. 349-365.

Ruth, L.A. et al., "Developing Regenerable SO2 Sorbents for Fluidized Bed Coal Combustion Using Thermogravimetric Analysis", Thermochimica Acta, 26, 1978, pp. 241-255.

Sasaoka, E. et al., "Novel Preparation Method of Macroporous Lime from Limestone for High-Temperature Desulfurization", Ind. Eng. Chem. Res., 36(9), 1997, pp. 3639-3646.

Schubert, H., "Grudlagen des Agglomerierens", Chem.-Ing.-Tech., 51(4), 1979, pp. 266-277.

Shearer, J.A. et al., "Hydration Enhanced Sulfation of Limestone and Dolomite in the Fluidized-Bed Combustion of Coal", Journal of the Air Pollution Control Association, 30(6), Jun. 1980, pp. 684-688.

Simbeck, D.R., "CO2 Mitigation Economics for Existing Coal-fired Power Plants", First National Conference on Carbon Sequestration, Washington DC, May 14-17, 2001, pp. 1-12.

Snow, M.J.H. et al., "Direct Sulfation of Calcium Carbonate", Ind. Eng. Chem. Res., 27(2), 1988, pp. 268-273.

Song, J.H. et al., "Solubility of Carbon Dioxide in Monoethanolamine + Ethylene Glycol + Water and Monoethanolamine + Poly(ethylene glycol) + Water", J. Chem. Eng. Data, 41(3), 1996, pp. 497-499.

Stiegel, G.J. et al., "Hydrogen from coal gasification: An economical pathway to a sustainable energy future", International Journal of Coal Geology, 65, 2006, pp. 173-190.

Tacon, A.G.J., "Utilisation of Chick Hatchery Waste: The Nutritional Characterizes of Day Old Chicks and Egg Shells", Agricultural Wastes, 4, 1982, 335-343.

Thurnau, R.C. et al., "The Behavior of Arsenic in a Rotary Kiln Incinerator", Air Waste Manage. Assoc., 42(2), 1992, pp. 179-184.

Tsuchiai, H. et al., "Highly Active Absorbent for SO2 Removal Prepared from Coal Fly Ash", Ind. Eng. Chem. Res., 34(4), 1995, pp. 1404-1411.

Tullin, C. et al., "Direct Sulfation of CaCO3: The Influence of CO2 Partial Pressure", Energy & Fuels, 7(4), 1993, pp. 512-519.

Tullin, C. et al., "Reaction between Calcium Carbonate and Sulfur Dioxide", Energy & Fuels, 3(3) 1989, pp. 284-287.

Uberoi, M. et al., "High-Temperature Removal of Cadmium Compounds Using Solid Sorbents", Environ. Sci. Technol., 25(7), 1991, pp. 1285-1289.

Uberoi, M. et al., "Sorbents for Removal of Lead Compounds from Hot Flue Gases", AIChE Journal, 36(2), 1990, pp. 307-309.

U.S. Department of Energy, "Carbon Sequestration R & D Program Plan: FY 1999—FY 2000", Office of Fossil Energy, Federal Energy Technology Center, www.fetc.doe.gov, Jun. 1999, 28 pages.

Vincent Corporation, Tampa Florida, press release, www.vincentcorp.com, Issue 77, May 19, 1998, 1 page.

White, C.M. et al., "Separation and Capture of CO2 from Large Stationary Sources and Sequestration in Geological Formations-Coalbeds and Deep Saline Aquifers", J. Air & Waste Manage. Assoc., 53, 2003, pp. 645-715.

Wouterlood, H.J. et al., "Removal and Recovery of Arsenious Oxide from Flue Gases", Environmental Science & Technology, 13(1), Jan. 1979, pp. 93-97.

Wu, B. et al., "Multi-Functional Sorbents for the Removal of Sulfur and metallic Contaminants from High Temperature Gases", Environ. Sci. Technol., 29, 1995, pp. 1660-1665.

Wu, S. et al., "Effect of Pore-Size Distribution of Lime on the Reactivity for the Removal of SO2 in the Presence of High-Concentration CO2 at High Temperature", Ind. Eng. Chem. Res., 41(22), 2002, pp. 5455-5458.

Zhang, Z. et al., "Separation of Nitrogen-Carbon Dioxide Mixture by Rapid Pressure Swing Adsorption", Adsorption, 4, 1998, pp. 173-177.

Ziock, H.J. et al., "Zero Emission Coal Power, a New Concept", http://www.netl.doe.gov/publications/proceedings/01/carbon_seq/2b2.pdf, 9 pages.

Abanades, J.C. et al., "Capture of CO2 from Combustion Gases in a Fluidized Bed of CaO", AIChE Journal, 50(7), Jul. 2004, pp. 1614-1622.

Abanades, J.C. et al., "Sorbent Cost and Performance in CO2 Capture Systems", Ind. Eng. Chem. Res., 43(13), 2004, pp. 3462-3466.

Denton, L. et al., "Simultaneous Production of High-Purity Hydrogen and Sequestration-Ready CO2 From Syngas", GE Final Technical Report, Dec. 2003, 108 pages.

Iyer, M. et al., "Calcium Looping process for high temperature high presser hydrogen production with in-situ CO2 and sulfur capture", National Symposium on Chemical Reaction Engineering, Feb. 2007, 1 page, Houston, Texas.

Iyer, M. et al., "Enhanced Hydrogen Production with in-situ CO2 capture in a Single Stage Reactor", Proc. 23rd Annu. Int. Pittsburgh Coal Conference, Sep. 2006, 17 pages, Pittsburgh, Pennsylvania.

Li, Y.U. et al., "The effect of the binder on the manufacture of a 5A zeolite monolith", Powder Technology, 116, 2001, pp. 85-96.

Manovic, V. et al., "Parametric Study on the CO2 Capture Capacity of a CaO-Based Sorbents in Looping Cycles", Energy & Fuels, 22(3), 2008, 1851-1857.

Manovic, V. et al., "Sequential SO2/CO2 capture enhanced by steam reactivation of a CaO-based sorbent", Fuel, 87, 2008, pp. 1564-1573.

Manovic, V. et al., "Steam hydration of sorbents from a dual fluidized bed CO2 looping cycle reactor", Fuel, 87, 2008, pp. 3344-3352.

Manovic, V. et al., "Sulphation and carbonation properties of hydrated sorbents from a fluidized bed CO2 looping cycle reactor", Fuel, 87, 2008, pp. 2923-2931.

Manovic, V. et al., "Thermal Activation of CaO-Based Sorbent and Self-Reactivation during CO2 Capture Looping Cycles", Environmental Science & Technology, 42(11), 2008, pp. 4170-4174.

Sun, P. et al., "The Effect of CaO Sintering on Cyclic CO2 Capture in Energy Systems", Environmental and Energy Engineering, 53(9), Sep. 2007, pp. 2432-2442.

Sun, P. et al., "Removal of CO2 by Calcium-Based Sorbents in the Presence of SO2", Energy & Fuels, 21(1), 2007, pp. 163-170.

Wang, J. et al., "On the Decay Behavior of the CO2 Absorption Capacity of CaO-Based Sorbents", Ind. Eng. Chem. Res., 44(3), 2005, pp. 627-629.

Zeman, F., "Effect of steam hydration on performance of lime sorbent for CO2 capture", International Journal of Greenhouse Gas Control, 2, 2008, pp. 203-209.

Zheng, L. et al., "Comparison of Shell, Texaco, BGL and KRW gasifiers as part of IGCC plant computer simulations", Energy Conversion and Management, 46, 2005, pp. 1767-1779.

* cited by examiner

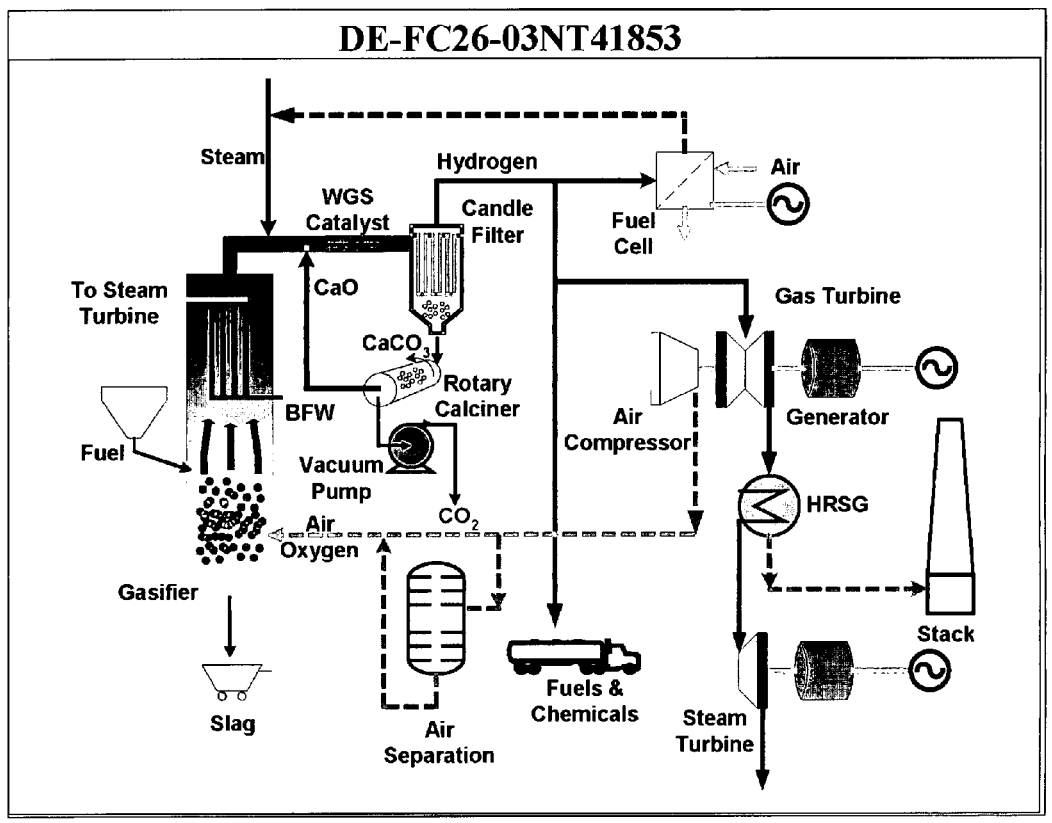
Figure 1 Flow sheet depicting the integration of the current process in the overall coal-gasifier electric production facility.

SEPARATION OF CARBON DIOXIDE (CO₂) FROM GAS MIXTURES

RELATED APPLICATION DATA

This application is a continuation-in-part of and claims the priority benefit of U.S. patent application Ser. No. 10/359,763 Feb. 6, 2003 now U.S. Pat. No. 7,067,456, which is hereby incorporated herein by reference.

TECHNICAL FIELD OF THE INVENTION

The present invention relates to the application of chemical sorbents for the separation of $CO_2$ from gas mixtures.

BACKGROUND OF THE INVENTION

As used herein, the term "supersorbent" shall mean a sorbent as taught in U.S. Pat. No. 5,779,464 entitled "Calcium Carbonate Sorbent and Methods of Making and Using Same", the teachings of which are hereby incorporated by reference.

As used herein, the term "microporous" shall mean a pore size distribution of less than 5 nanometers. As used herein, the term "mesoporous" shall mean a pore size distribution of from about 5 nanometers to about 20 nanometers.

Atmospheric $CO_2$ concentration has been increasing steadily since the industrial revolution. It has been widely accepted that the while the $CO_2$ concentration was about 280 ppm before the industrial revolution, it has increased from 315 ppmv in 1959 to 370 ppmv in 2001 [Keeling, C. D. and T. P. Whorf. 2002. Atmospheric $CO_2$ records from sites in the SIO air sampling network. In Trends: A Compendium of Data on Global Change. Carbon Dioxide Information Analysis Center, Oak Ridge National Laboratory, U.S. Department of Energy, Oak Ridge, Tenn., U.S.A. This data is also available from http://cdiac.esd.ornl.gov/ftp/maunaloa-co2/maunaloa.co2]. Rising $CO_2$ concentrations has been reported to account for half of the greenhouse effect that causes global warming [IPCC Working Group I. IPCC Climate Change 1995—The Science of Climate Change: The Second Assessment Report of the Intergovernmental Panel on Climate Change; Houghton, J. T., Meira Filho, L. G., Callander, B. A., Harris, N., Kattenberg, A., Maskell K, Eds.; Cambridge University Press: Cambridge, U.K., 1996]. Although the anthropogenic $CO_2$ emissions are small compared to the amount of $CO_2$ exchanged in the natural cycles, the discrepancy between the long life of $CO_2$ in the atmosphere (50-200 years) and the slow rate of natural $CO_2$ sequestration processes leads to $CO_2$ build up in the atmosphere. The IPCC (Intergovernmental Panel on Climate Change) opines that "the balance of evidence suggests a discernible human influence on the global climate." Therefore, it is necessary to develop cost effective $CO_2$ management schemes to curb its emission.

Many of the envisaged $CO_2$ management schemes consist of three parts—separation, transportation and sequestration of $CO_2$ [FETC Carbon Sequestration R&D Program Plan: FY 1999-2000. National Energy Technology Laboratory, Department of Energy, Washington, D.C., 1999]. The cost of separation and compression of $CO_2$ to 110 bar (for transportation of $CO_2$ in liquid state) is estimated at $30-50 per ton $CO_2$, and transportation and sequestration would cost about $1-3 per ton per 100 km and $1-3 per ton of $CO_2$, respectively [Wallace, D. Capture and Storage of $CO_2$. What Needs To Be Done. Presented at the 6th Conference of the Parties, COP 6, to the United Nations Framework Convention on Climate Change; The Hague, The Netherlands, Nov. 13-24, 2000; www.iea.org/envissu/index.htm]. The capture of $CO_2$ imposes severe energy penalties thereby reducing the net electricity output by as much as 13-37% [Herzog, H.; Drake, E.; Adams, E. $CO_2$ Capture, Reuse, and Storage Technologies for Mitigating Global Climate Change. A White Paper; Final Report No. DE-AF22-96PC1257, January 1997]. The dominating costs associated with the current $CO_2$ separation technologies necessitate development of economical alternatives.

Historically, $CO_2$ separation was motivated by enhanced oil recovery [Kaplan, L. J. Cost-Saving Processes Recovers $CO_2$ from Power-Plant Flue gas. Chem. Eng. 1982, 89 (24), 30-31; Pauley, C. P.; Smiskey, P. L.; Haigh, S. N—ReN Recovers $CO_2$ from Flue Gas Economically. Oil Gas J. 1984, 82(20), 87-92]. Currently, industrial processes such as limestone calcination, synthesis of ammonia and hydrogen production require $CO_2$ separation. Absorption processes employ physical and chemical solvents such as Selexol and Rectisol, MEA and KS-2 [Reimer, P.; Audus, H.; Smith, A. Carbon Dioxide Capture from Power Stations. IEA Greenhouse R&D Programme, www.ieagreen.org.uk, 2001. ISBN 1 898373 15 9; Blauwhoff, P. M. M.; Versteeg, G. F.; van Swaaij, W. P. M. A study on the reaction between $CO_2$ and alkanoamines in aqueous solution. Chem. Eng. Sci.1984, 39(2), 207-225. Mimura, T.; Simayoshi, H.; Suda, T.; Iijima, M.; Mitsuake, S. Development of Energy Saving Technology for Flue Gas Carbon Dioxide Recovery by Chemical Absorption Method and Steam System in Power Plant. Energy Convers. Mgmt. 1997, 38, Suppl. P.S57-S62]. Adsorption systems capture $CO_2$ on a bed of adsorbent materials such as molecular sieves and activated carbon [Kikkinides, E. S.; Yang, R. T.; Cho, S. H. Concentration and Recovery of $CO_2$ from flue gas by pressure swing adsorption. Ind. Eng. Chem. Res. 1993, 32, 2714-2720]. $CO_2$ can also be separated from the other gases by condensing it out at cryogenic temperatures. Polymers, metals such as palladium, and molecular sieves are being evaluated for membrane based separation processes [Reimer, P.; Audus, H.; Smith, A. Carbon Dioxide Capture from Power Stations. IEA Greenhouse R&D Programme, www.ieagreen.org.uk, 2001. ISBN 1 898373 15 9].

Reaction based processes, as promulgated in this work, can be applied to separate $CO_2$ from gas mixtures. This process is based on a heterogeneous gas-solid non-catalytic carbonation reaction where gaseous $CO_2$ reacts with solid metal oxide (represented by MO) to yield the metal carbonate ($MCO_3$). The reaction can be represented by:

(1)

Once the metal oxide has reached its ultimate conversion, it can be thermally regenerated to the metal oxide and $CO_2$ by the calcination of the metal carbonate product. The calcination reaction can be represented by:

(2)

As an example of the above-mentioned scheme, FIG. 1 shows the variation in the free energy of the carbonation reaction as a function of temperature for calcium oxide. From the figure, we can see that the carbonation reaction is thermodynamically favored with a decrease in temperature (Gibbs free energy declines with a decrease in temperature). However, at lower temperatures, the carbonation reaction is kinetically slow. In fact, it takes geological time scales for the formation of $CaCO_3$ by the reaction between CaO and atmospheric $CO_2$ (at 280-360 ppm) at ambient temperatures. It should also be noted that the carbonation reaction would be favored as long as the free energy is negative. This creates an upper bound of 890° C. for carbonation to occur under a $CO_2$ partial pressure of 1 atm. The equilibrium temperature for this reaction is a function of the partial pressure of $CO_2$. A reaction based $CO_2$ separation process offers many advantages. Under ideal conditions, MEA captures 60 g $CO_2$/kg, silica gel adsorbs 13.2 g $CO_2$/kg and activated carbon adsorbs 88 g $CO_2$/kg. The sorption capacity of some metal oxides (such as the modified CaO, presented in this study) is about 700 g $CO_2$/kg of CaO. This is about an order of magnitude higher than the capacity of adsorbents/solvents used in other $CO_2$ separation processes and would significantly reduce the size of the reactors and the material handling associated with $CO_2$ separation.

Numerous metal oxides exhibit the carbonation and calcination reaction. The calcination temperature of a few metal carbonates ($CaCO_3$~750° C., $MgCO_3$~385° C., $ZnCO_3$~340° C., $PbCO_3$~350° C., $CuCO_3$~225-290° C. and $MnCO_3$~440° C.) makes them viable candidates for this process. Apart from CaO, gas-solid carbonation of other metal oxides has not been widely studied. The carbonation of ZnO to $ZnCO_3$ at 8-13° C. was low when exposed to $CO_2$ and $H_2O$ for over 100 days (Sawada, Y.; Murakami, M.; Nishide, T. Thermal analysis of basic zinc carbonate. Part 1. Carbonation process of zinc oxide powders at 8 and 13° C. *Thermochim. Acta.* 1996, 273, 95-102.). $MnCO_3$ undergoes a more complex thermal degradation phenomena. $MnCO_3$ first decomposes to $MnO_2$ at 300° C., which in turn changes to $Mn_2O_3$ at 440° C. At higher temperatures (~900° C.), the final thermal decomposition product was identified as $Mn_3O_4$ (Shaheen, W. M.; Selim, M. M. Effect of thermal treatment on physicochemical properties of pure and mixed manganese carbonate and basic copper carbonate. *Thermochim. Acta.* 1998, 322(2), 117-128.). Different oxides of manganese provide the flexibility of exploiting the carbonation/calcination reaction over a wider temperature range. Aqueous phase MgO carbonation has been studied for its suitability for mineral-based $CO_2$ sequestration (Fernandez, A. I.; Chimenos, J. M.; Segarra, M.; Fernandez, M. A.; Espiell, F. Kinetic study of carbonation of MgO slurries. *Hydrometallurgy.* 1999, 53, 155-167). The carbonation extent of $Mg(OH)_2$ was about 10% between 387-400° C. and 6% formation between 475-500° C. (Butt, D. P.; Lackner, K. S.; Wendt, C. H.; Conzone, S. D.; Kung, H.; Lu, Y-C.; Bremser, J. K. Kinetics of Thermal Dehydroxylation and Carbonation of Magnesium Hydroxide. *J. Am. Ceram. Soc.* 1996, 79(7), 1892-1898). They attributed the low conversions to the formation of a non-porous carbonate product layer. This layer hinders the inward diffusion of $CO_2$ and the outward diffusion of $H_2O$ (a product of the carbonation reaction) leading to low conversions. The carbonation of PbO was studied as a part of the chemical heat pump process (Kato, Y.; Saku, D.; Harada, N.; Yoshizawa, Y. Utilization of High Temperature Heat from Nuclear Reactor using Inorganic Chemical Heat Pump. *Progress in Nuclear Energy.* 1998, 32(3-4), 563-570. & Kato, Y.; Harada, N.; Yoshizawa, Y. Kinetic feasibility of a chemical heat pump for heat utilization from high temperature processes. *Applied Thermal Engineering.* 1999, 19, 239-254). They reported 30% conversion in an hour under 100% $CO_2$ atmosphere at 300° C. Furthermore, they found the reactivity of PbO to drop with the number of carbonation-calcination cycles.

Carbonation of calcium oxide has been widely studied. Related applications of the CaO carbonation and calcination include the storage of energy (Barker, R. The Reversibility of the Reaction $CaCO_3$=$CaO$+$CO_2$. *J. Appl. Chem. Biotechnol.* 1973, 23, 733-742) and the zero emission coal alliance process, consisting of hydrogasification of coal fueled by the heat of the carbonation reaction (Tinkler, M. J.; Cheh, C. Towards a Coal-capable Solid Oxide Fuel Cell System. *Proceedings of the 26th International Technical Conference on Coal Utilization and Fuel Systems*; Clearwater, Fla., Mar. 5-8, 2001; pp 569-570). The gas-solid CaO—$CO_2$ reaction proceeds through two rate-controlling regimes. The first regime involves a rapid, heterogeneous chemical reaction. In the second regime, the reaction slows down due to the formation of an impervious layer of $CaCO_3$. This product layer prevents the exposure of unreacted CaO in the particle core to $CO_2$ for further carbonation. The kinetics of the second regime is governed by the diffusion of ions through the $CaCO_3$ product layer. The activation energy was estimated to be 21 kcal/mol below 688 K and 43 kcal/mol above it for the product layer diffusion, based on the counter migration of $CO_3^{2-}$ and $O^{2-}$ ions through the product layer (Bhatia, S. K.; and Perlmutter, D. D. Effect of the product layer on the kinetics of the $CO_2$-Lime Reaction. *AlChE J.* 1983, 29(1), 79-86).

The extent of the carbonation reaction reported in many studies has also shown considerable variation. Stoichiometrically, 56 g of CaO should react with 44 g of $CO_2$ to form 100 g of $CaCO_3$. This translates to about 78.6-wt % capacity for CaO. However, the structural limitations prevent the attainment of theoretical conversion. The extent of carbonation was only 23-wt % in 30 minutes at 600° C. (Dedman, A. J.; Owen, A. J. Calcium Cyanamide Synthesis, Part 4.—The reaction CaO+$CO_2$=$CaCO_3$. *Trans. Faraday Soc.* 1962, 58, 2027-2035). A higher surface area CaO sorbent provided 55-wt % $CO_2$ sorption (Bhatia, S. K.; and Perlmutter, D. D. Effect of the product layer on the kinetics of the $CO_2$-Lime Reaction. *AlChE J.* 1983, 29(1), 79-86). 64-wt % $CO_2$ sorption was achieved at 1050° C. temperature and 11.74 atm $CO_2$ pressure in 32 hours (Mess, D.; Sarofim, A. F.; Longwell, J. P. Product Layer Diffusion during the Reaction of Calcium Oxide with Carbon Dioxide. *Energy and Fuels.* 1999, 13, 999-1005). However, the extent of carbonation at lower temperature/pressure conditions that are more characteristic of $CO_2$ containing gaseous mixtures is absent in their work. The limitation in total conversion stems essentially from the nature of the initial pore size distribution of the CaO sorbent. Microporous sorbents (pore size<2 nm) are very susceptible to pore blockage and plugging due to the formation of higher molar volume product (molar volume of CaO: 17 $cm^3$/mol; molar volume of $CaCO_3$: 37 $cm^3$/mol). CaO sorbents obtained from naturally occurring precursors are usually microporous in nature. At the end of the kinetically controlled regime, diffusion processes through the product layer control the reaction rate. Similar structural limitations have prevented calcium-based sorbents from attaining theoretical conversion for the sulfation reaction between CaO and sulfur dioxide ($SO_2$) as well (Wei, S.-H.; Mahuli, S. K.; Agnihotri, R.; Fan, L.-S. High Surface Area Calcium Carbonate: Pore Structural Properties and Sulfation Characteristics. *Ind. Eng. Chem. Res.* 1997, 36(6), 2141-2148). They suggested that a mesoporous structure, which maximizes porosity in the 5-20 nm pore size range, would be less susceptible to pore pluggage. This structure would also be able to provide sufficient surface area to ensure rapid kinetics. Their modified precipitation technique resulted in a mesoporous $CaCO_3$ structure that also had a high BET surface area determined by nitrogen (60 $m^2$/g). A similar approach could also enhance the reactivity of CaO sorbents towards the carbonation reaction, which is the focus of this study.

Lastly, it is important that the CaO sorbents maintain their reactivity over many carbonation and calcination cycles. The conversion of CaO dropped from about 73% in the first carbonation cycle to 43% at the end of the 5th cycle at 866° C. (Barker, R. The Reversibility of the Reaction $CaCO_3$=$CaO$+$CO_2$. *J. Appl. Chem. Biotechnol.* 1973, 23, 733-742 & Barker, R. The Reactivity of Calcium Oxide Towards Carbon Dioxide and its use for Energy Storage. *J. Appl. Chem. Biotechnol.* 1974, 24, 221-227). Barker suggested that the CaCO$_3$ layer is about 22 nm thick and his latter work showed repeated 93% conversion over 30 cycles at 629° C. on 10 nm CaO particles. In another study, cyclical studies conducted at a carbonation temperature of 880° C. and calcination at 860° C. led to a drop in conversion from 70% in the first carbonation to 38% in the 7$^{th}$ carbonation step (Kato, Y.; Harada, N.; Yoshizawa, Y. Kinetic feasibility of a chemical heat pump for heat utilization from high temperature processes. *Applied Thermal Engineering.* 1999, 19, 239-254). The process described here leads to >95% conversion due to the application of novel mesoporous CaO sorbents for CO$_2$ capture and maintains their reactivity over repeated cycles of carbonation and calcination.

Enhanced Hydrogen Production Integrated with CO$_2$ Separation in a Single-stage Reactor There has been a global push towards the development of a hydrogen economy. The main premise behind this drastic alteration in our energy usage stems from the fact that the use of hydrogen in portable and mobile applications would be the most environmentally beneficial process that leads only to the emission of water. However, the biggest issue that needs to be addressed for the success of the hydrogen-based economy involves the source of hydrogen itself. While hydrogen may be considered as the best "carrier" of energy, there is clearly no hydrogen "wells" on earth. The major processes for hydrogen production from fossil fuels consist of steam reforming of methane (SMR), coal gasification, catalytic cracking of natural gas, and partial oxidation of heavy oils. Other processes consist of water electrolysis, thermo chemical water decomposition, biological processes, etc. (Rosen and Scott, 1998; Rosen, 1996). However, water electrolysis is not a very energy efficient process.

Water gas, a mixture of CO, CO$_2$, H$_2$O and H$_2$, is formed by the gasification of coal by sub-stoichiometric air and/or steam. Irrespective of the initial concentration of these four gases, the reversible water gas shift (WGS) reaction gets initiated until the exact ratio of the concentration of these gases reaches a particular equilibrium constant KWGS that is a function of temperature. The WGS reaction and its equilibrium constant can be written as:

WGS Reaction: CO+H$_2$O<=>CO$_2$+H$_2$ ΔH=−40.6 kJ/mol     (1)

WGS equilibrium constant:

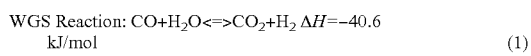

$$K_{WGS} = \frac{[CO_2][H_2]}{[CO][H_2O]} = 812.9 - \frac{6.628e+5}{T} + \frac{1.001e+8}{T^2} \quad (2)$$

where T is in ° C. From equation (2), it can be observed that KWGS reduces with increasing temperature. This means that processes aimed at converting coal-derived gas to hydrogen at high temperatures are thermodynamically restricted. While catalysts aid in achieving this equilibrium, they cannot alter the value of K to provide a higher hydrogen yield. An effective technique to shift the reaction to the right for enhanced hydrogen generation has been to remove hydrogen from the reaction mixture. This premise has lead to the development of hydrogen separation membranes. However, membranes cannot completely remove hydrogen from the mixture. Any remaining hydrogen would dilute CO$_2$ after its utilization in either a fuel cell or gas turbine.

Another option for driving the WGS reaction forward is to remove CO$_2$ from the reaction mixture by reacting it with CaO. The carbonation reaction can be written as:

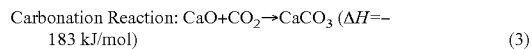

Carbonation Reaction: CaO+CO$_2$→CaCO$_3$ (ΔH=− 183 kJ/mol)     (3)

Under the appropriate reaction temperature, CO$_2$ concentration can be lowered down to ppm levels by reaction (3), thereby enabling the maximum production of hydrogen from carbon via reaction (1). By conducting the reaction such that CO is the limiting reactant, we can ensure complete utilization of the fuel as well. Besides these advantages, CO$_2$ is simultaneously removed from the gas mixture in the form of CaCO$_3$, thereby improving the purity of the hydrogen stream (the other contaminant being only water). The spent sorbent can then be calcined separately to yield pure CO$_2$ stream, which is then amenable for compression and liquefaction before its transportation to sequestration sites. Calcination reaction, reverse of the carbonation reaction can be written as:

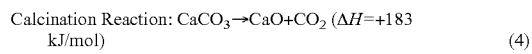

Calcination Reaction: CaCO$_3$→CaO+CO$_2$ (ΔH=+183 kJ/mol)     (4)

The resulting CaO sorbent is recycled to capture CO$_2$ in the next cycle. This cyclical CCR process can be continued so long as the sorbent provides a satisfactory CO$_2$ capture.

To obtain high purity H$_2$, the WGS reaction is generally carried out in two stages for: (1) high temperature shift (250-500° C.) using iron catalysts and (2) low temperature shift (210-270° C.) using copper-based catalysts (Gerhartz, 1993; Bohlbro, 1969). Copper based catalysts are extremely intolerant to small quantities of sulfur (<0.1 ppm) and hence the fuel gases need to be desulfurized upstream of the WGS reactor. Besides, to achieve satisfactory carbon monoxide conversion a considerable quantity of high-pressure steam is required. For example, to lower the CO content of the typical fuel gas from 45% (inlet) to 3% (outlet) a total steam addition of 1.18 kg/m$^3$ of the gas is required, at a total pressure of 60 bar and 410° C. (Gerhartz, 1993). The steam to CO ratio at 550° C. can be as high as 50 during a single-stage operation or 7.5 for a more expensive dual-stage process to obtain 99.5% pure H2 (David, 1980). This is necessary due to the equilibrium limitation inherent in the WGS reaction. From the point of view of H$_2$ production, even though higher temperatures lead to improved kinetics, WGS has poor equilibrium conditions at the higher temperatures. However, the continuous removal of the carbon dioxide product from the reaction chamber will incessantly drive the equilibrium-limited water-gas shift reaction forward. This will ensure a high yield and purity of hydrogen with near stoichiometric amounts of steam needed for the reaction. Besides, the reaction can now be carried out at higher temperatures leading to superior kinetics in the forward direction. Thus the major equilibrium related drawback in this process could be overcome. The continuous CO$_2$ removal can be brought about by the carbonation reaction of a metal oxide to give the corresponding metal carbonate. We have identified a high reactivity, mesoporous calcium oxide as the potential sorbent for the in-situ CO$_2$ capture given by eqn. 3.

The success of this process would effectively bridge coal gasification to fuel cell usage and chemical synthesis. Other side benefits of this process involve the potential for removal of sulfur and heavy metals such as arsenic and selenium from the fuel gas stream.

Recently, Harrison and co-workers reported a single-step sorption-enhanced process to produce hydrogen from methane (Balasubramanian et al., 1999; Lopez Ortiz and Harrison, 2001). They used the traditional concept of SMR with WGS using Ni-based catalyst to produce hydrogen, coupled with this novel scheme of in-situ continuous $CO_2$ capture using a calcium-based dolomite sorbent. They obtained high hydrogen yields with 97% purity (dry basis).

However, they reported a low "calcium" conversion in the sorbent of about 50% at the beginning of the breakthrough to about 83% at the end of the test. These conversion calculations are based on only the calcium portion of their dolomite sorbent. Their total sorbent conversion will be much lower than these values as dolomite does not entirely contain calcium based material. In fact, dolomite comprises of nearly 50 wt. % calcium, which participates in the reaction to some extent, and the remaining portion of the sorbent (mainly magnesium oxide) stays unreacted. Further, they attribute the incomplete conversions of the calcium material to the concept of pore filling and pluggage at the pore-mouths of these sorbent particles by $CaCO_3$ product layer, preventing the access of $CO_2$ in the gas to unreacted CaO surface at the pore interiors.

Harrison and co-workers regenerated the dolomite sorbent in streams of $N_2$, 4% $O_2$ in $N_2$ and pure $CO_2$. They had to use high regeneration temperatures of 800-950° C., especially while using pure $CO_2$. Exposure of the reforming catalyst to an oxidizing atmosphere (viz. $O_2/N_2$ or $CO_2$) while regenerating the sorbent used to oxidize the Ni catalysts to NiO. Hence, the catalyst had to be reduced back to Ni before every cycle or the sorbent-catalyst mixture had to be separated after every run so that only the sorbent is subjected to the regeneration conditions. Further, the temperature of operation can be lowered by regeneration in a pure $N_2$ stream. However, it would not solve the problem of $CO_2$ separation due to the formation of a $CO_2/N_2$ gas mixture. Calcination in a pure $CO_2$ stream will result in higher operating temperatures due to the thermodynamic limitations of the calcination reaction in presence of the $CO_2$ product. Higher temperatures and the presence of $CO_2$ during calcination would cause the sorbent to sinter. This is in agreement with the results of multiple carbonation-calcination cycle tests for dolomite by Harrison and co-workers (Lopez Ortiz and Harrison, 2001) in pure $CO_2$ stream (800-950° C.). They observed a decrease in "calcium" conversion from 83% in the $1^{st}$ cycle to about 69% in the $10^{th}$ cycle itself. However, a mesoporous high suface area calcium based sorbent (precipitated calcium carbonate, PCC) developed at OSU has undergone 100 cycle experiments. The PCC sorbent has shown 85% conversion in the $1^{st}$ cycle 66.7% in the $10^{th}$ cycle and 45.5% in the $100^{th}$ cycle towards carbonation. These experiments were carried out in a TGA at 700° C. in a 10% $CO_2$ stream in the carbonation cycle and 100% $N_2$ gas in the calcination cycle, with 30 minute residence times for each cycle. Therefore this project aims testing this PCC based sorbent towards further enhancing the WGSR and overcoming some of the problems faced by Harrison and co-workers.

SUMMARY OF THE INVENTION

The present invention includes a calcium oxide, its usage for the separation of $CO_2$ from multicomponent gas mixtures and the optimum process conditions necessary for enhancing the repeatability of the process.

A preferred method for separating carbon dioxide from a flow of gas comprising carbon dioxide comprises the steps of: (1) directing the flow of gas to a gas-solid contact reactor, the gas-solid contact reactor contains at least one sorbent comprising at least one metal oxide; (2) reacting the carbon dioxide with the at least one sorbent so as to remove the carbon dioxide from said flow of gas, thereby converting the at least one sorbent into spent sorbent; (3) calcining the spent sorbent so as to liberate the carbon dioxide from the spent sorbent, thereby regenerating the sorbent; and (4) repeating the aforementioned steps.

Although any metal oxide may be employed, it is preferred that the at least one metal oxide is selected from the group consisting of: ZnO, MgO, $MnO_2$, NiO, CuO, PbO, and CaO. Further, it is preferred that the spent sorbent is a metal carbonate.

It is preferred that the sorbent has a sorption capacity of at least about 70 grams of carbon dioxide per kilogram of sorbent. However, it is even more preferred that the sorbent has a sorption capacity of at least about 300 grams of carbon dioxide per kilogram of sorbent. Irrespective of the sorption capacity of the sorbent, it is preferred that the sorbent has substantially the same sorption capacity after calcining as the sorbent had prior to adsorbing the carbon dioxide.

Although any calcination method may be employed, it is preferred that the calcining is performed under at least partial vacuum. It is also preferred that the calcining is performed by steam.

The present invention includes facilities practicing the aforementioned method.

A method for separating carbon dioxide from a flow of gas comprising carbon dioxide of the present invention comprises the steps of: (1) directing the flow of gas to a first gas-solid contact reactor, the first gas-solid contact reactor containing at least one sorbent, the sorbent comprising at least one metal oxide; (2) reacting the carbon dioxide in the flow of gas on the sorbent in the first gas-solid contact reactor so as to remove the carbon dioxide from the flow of gas; (3) directing the flow of gas to a second gas-solid contact reactor when the sorbent in the first gas-solid contact reactor is spent thereby forming spent sorbent, the second gas-solid contact reactor containing at least one sorbent, the sorbent comprising at least one metal oxide; (4) reacting the carbon dioxide in the flow of gas on the sorbent in the second gas-solid contact reactor so as to remove the carbon dioxide from the flow of gas; (5) calcining the spent sorbent from the first gas-solid contact reactor so as to generate carbon dioxide and to regenerate the sorbent; (6) directing the flow of gas to the first gas-solid contact reactor when the sorbent in the second gas-solid contact reactor is spent, thereby forming spent sorbent; and (7)calcining the spent sorbent from the second gas-solid contact reactor so as to generate carbon dioxide and to regenerate the sorbent.

Although any calcination method may be employed, it is preferred that the calcining is performed under at least partial vacuum. It is also preferred that the calcining is performed by steam. This applies to both gas-solid contact reactors.

Although any metal oxide may be utilized, it is preferred that the at least one metal oxide is selected from the group consisting of: ZnO, MgO, $MnO_2$, NiO, CuO, PbO, and CaO.

It is preferred that the sorbent has a sorption capacity of at least about 70 grams of carbon dioxide per kilogram of sorbent. However, it is even more preferred that the sorbent has a sorption capacity of at least about 300 grams of carbon dioxide per kilogram of sorbent. Irrespective of the sorption capacity of the sorbent, it is preferred that the sorbent has substantially the same sorption capacity after calcining as the sorbent had prior to adsorbing the carbon dioxide.

The present invention also includes facilities practicing the aforementioned method A method for regenerating a spent sorbent for carbon dioxide of the present invention comprises the steps of: (1) providing a spent sorbent, the spent sorbent comprising metal carbonate; and (2) calcining the spent sorbent so as to liberate carbon dioxide gas and so as to regenerate the spent sorbent thereby forming a sorbent comprising a metal oxide.

It is preferred that the spent sorbent is calcium carbonate. It is further preferred that the metal oxide is calcium oxide.

It is preferred that the sorbent has substantially the same sorption capacity after calcining as the sorbent had prior to adsorbing the carbon dioxide.

Although any calcination method may be employed, it is preferred that the calcining is performed under at least partial vacuum. It is also preferred that the calcining is performed by steam. This applies to both gas-solid contact reactors.

The present invention includes facilities practicing the aforementioned method.

A method for producing a sorbent of the present invention comprises the steps of: (1) obtaining a structurally altered high surface area calcium carbonate having a surface area of at least $25.0 \text{ m}^2/\text{g}$, a pore volume of at least $0.05 \text{ cm}^3/\text{g}$, and a mesoporous pore size distribution; and (2) calcining the structurally altered high surface area calcium carbonate so as to produce a sorbent having a surface area of less than $22 \text{ m}^2/\text{g}$, a pore volume of at least $0.005 \text{ cm}^3/\text{g}$, and a mesoporous pore size distribution.

Although any calcination method may be employed, it is preferred that the calcining is performed under at least partial vacuum. It is also preferred that the calcining is performed by steam. This applies to both gas-solid contact reactors.

The present invention includes sorbents made according to the aforementioned method.

A sorbent according to the present invention comprising calcium oxide having a surface area of at least $12.0 \text{ m}^2/\text{g}$ and a pore volume of at least $0.015 \text{ cm}^3/\text{g}$, the calcium carbonate sorbent having sorption capacity of at least about 70 grams of carbon dioxide per kilogram of sorbent.

In addition to the novel features and advantages mentioned above, other objects and advantages of the present invention will be readily apparent from the following descriptions of the drawing(s) and preferred embodiment(s).

BRIEF DESCRIPTION OF THE DRAWINGS

FIG. 14 provides a flow sheet depicting the integration of the current process in the overall coal-gasifier electric production facility.

DETAILED DESCRIPTION OF THE PREFERRED EMBODIMENT(S)

In accordance with the foregoing summary, the following presents a detailed description of the preferred embodiment(s) of the invention that are currently considered to be the best mode.

Chemicals, Sorbents and Gases

Naturally occurring limestone ($CaCO_3$) and hydrated lime ($Ca(OH)_2$), synthesized from it were obtained from Linwood Mining and Minerals. Dolomite ($CaCO_3.MgCO_3$) was procured from the National Dolomite Company. The purity of these ores was above 90%. High purity metal oxides such as ZnO, MgO, $MnO_2$, NiO, CuO, PbO, CaO were obtained from Aldrich Chemical Company. Precipitated calcium carbonate (PCC) was synthesized from Linwood hydrate by the procedure described in a following section. N40V® dispersant, a sodium salt of a carboxylic acid, used in the synthesis of PCC was obtained from Allied Colloid. The synthesis procedure is described in detail in a following section. $N_2$ and $CO_2$ used for calcination and carbonation experiments were 99.999% and 99.9% pure, respectively.

Sorbent Reactivity Testing and Structural Analysis

The reactivity testing of CaO sorbents for carbonation was carried out in a Perkin Elmer Thermogravimetric Analyzer (TGA-7) apparatus. The balance can accurately measure up to 1 microgram. A small sample of the sorbent (5-20 mg) is placed in a quartz boat. The weight of the sample was recorded every second. The structural properties of CaO sorbents and their precursors were tested in a NOVA 2200 analyzer (Quantachrome Company). The BET surface area, pore volume, and pore size distribution were measured at $-196°$ C. using nitrogen as the adsorbent.

Screening of Metal Oxides

Figure 1:
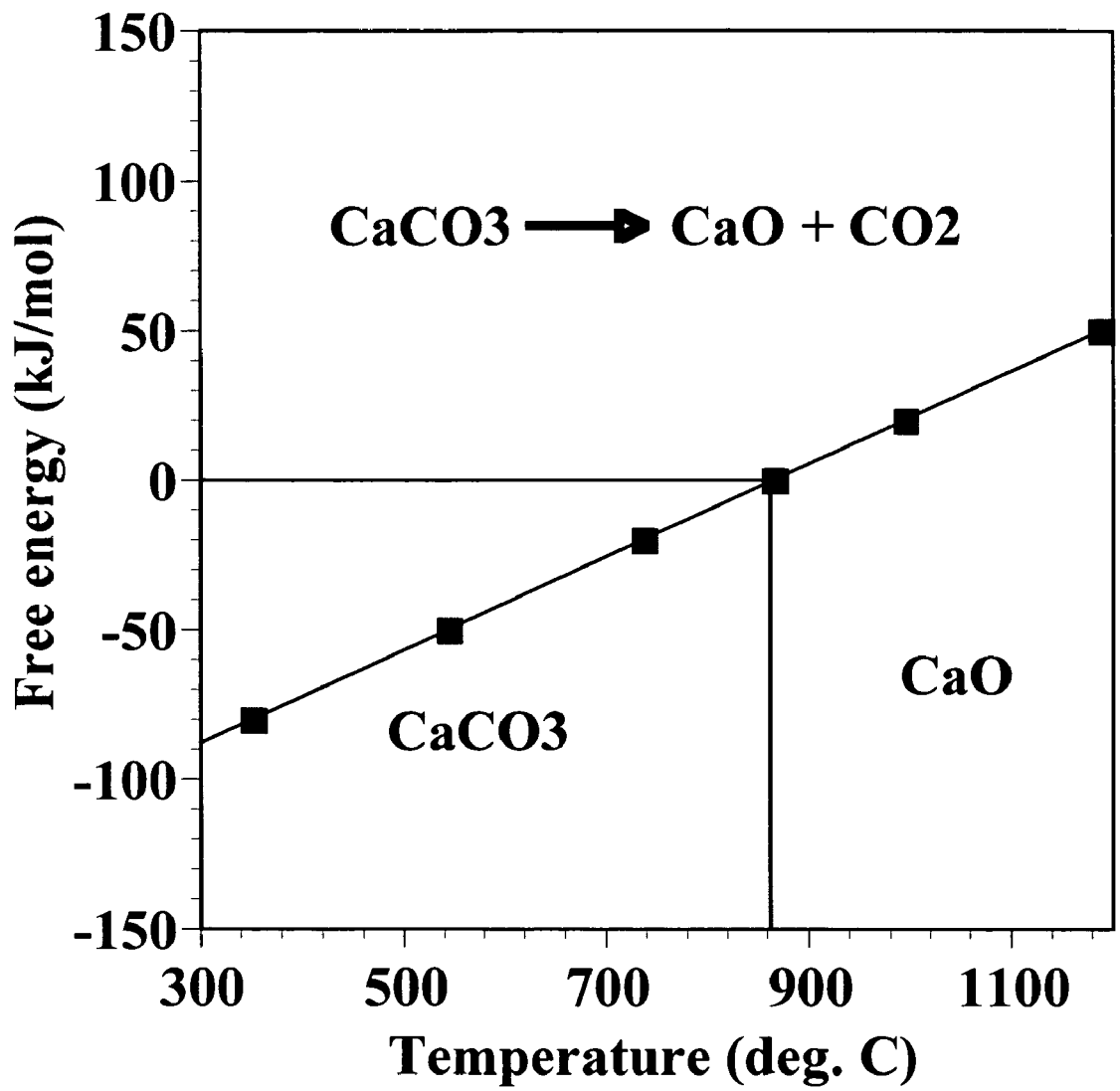
FIG. 1 depicts the Gibbs Free Energy diagram for the carbonation reaction, $CaCO_3 \rightarrow CaO + CO_2$, as a function of temperature.
Figure 2:
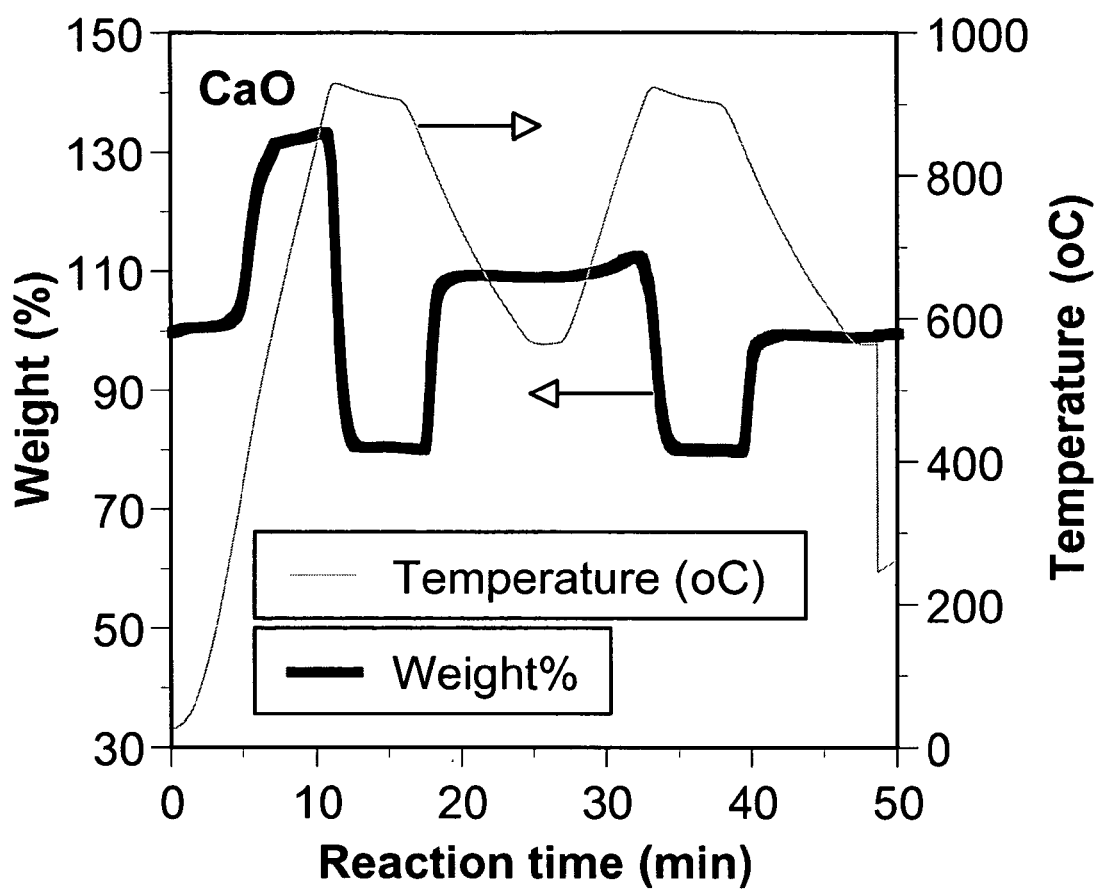
FIG. 2 illustrates the performance of calcium oxide for the carbonation reaction.

Metal oxides such as ZnO, MgO, CuO, $MnO_2$, NiO, PbO and CaO that undergo the CCR scheme in the 800-200° C. temperature range were analyzed for their reactivity in a TGA. A powdered sample of these oxides was placed in a quartz pan and pure $CO_2$ was passed over the sample metal oxide. The temperature was then slowly raised and the weight of the sample was continuously monitored. An increase in the weight of the sample is an indication of the formation of metal carbonate. FIG. 2 provides experimental data for the carbonation of lime ($Ca(OH)_2$) under flowing pure $CO_2$ gas. With an increase in temperature, the weight of the sample increases till the temperature reaches about 890° C. Calcination, which is thermodynamically favored above 890° C. at 1 atm $CO_2$ partial pressure, causes a rapid decrease in weight until the sorbent converts completely to CaO. When the sample is reheated, the weight starts to increase again and the process is repeated once more. Besides proving that CaO is a viable candidate, the data also shows recyclability of the sorbent.

XRD Analysis of CaO Obtained from its Precursors

Figure 3:
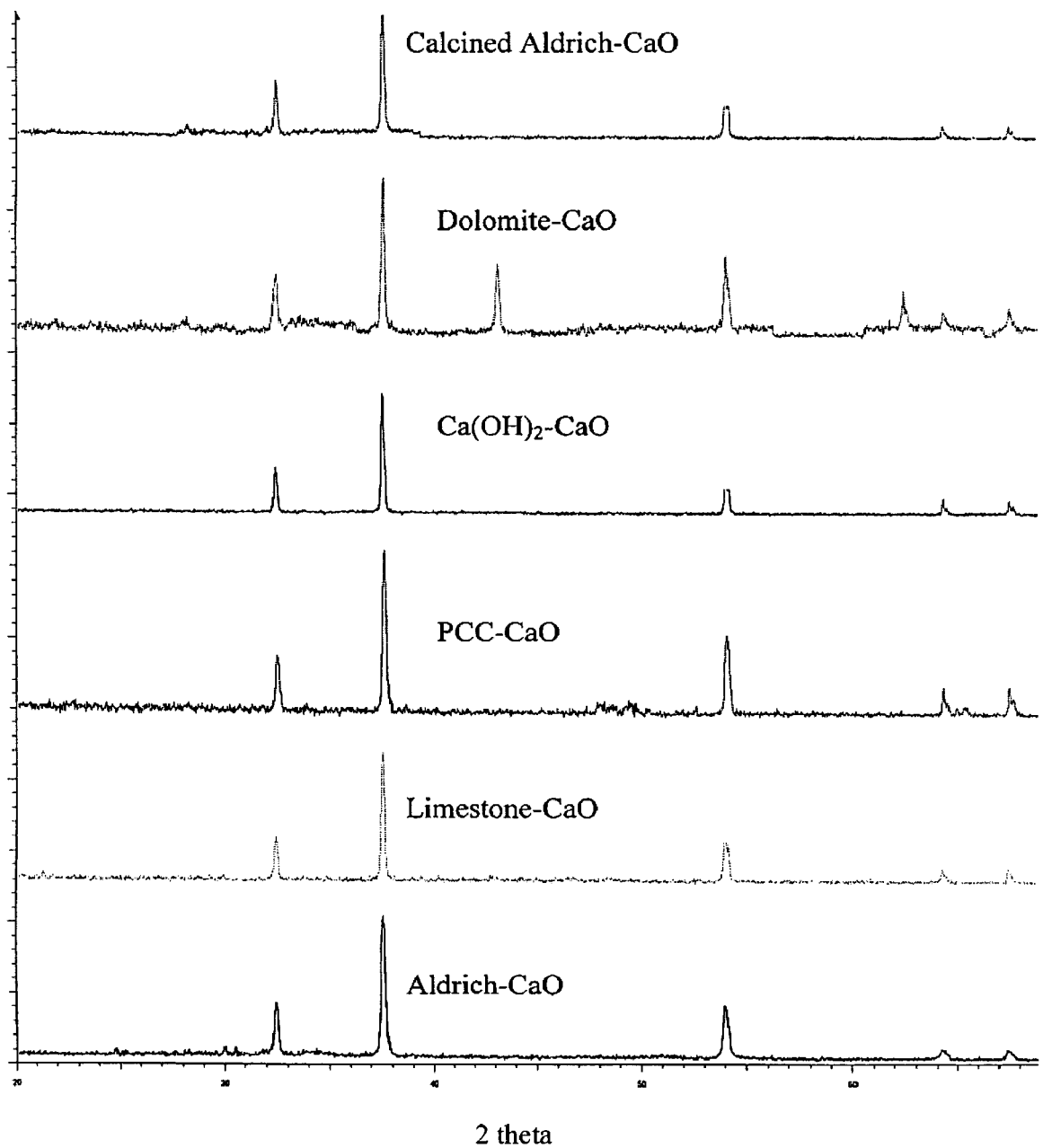
FIG. 3 compares the XRD diffractograms of CaO derived from various precursors.

CaO was identified as a viable candidate for the carbonation-calcination reactions. However, a variety of precursors can be calcined to obtain the CaO sorbents necessary for the carbonation reaction. Common and economical precursors include calcium carbonate, calcium hydroxide and dolomite. The other important source of CaO is via the calcination of synthesized high surface area precipitated calcium carbonate. In order to compare the crystal structure of the CaO sorbents obtained from these sources, XRD patterns were obtained on all the CaO sorbents. FIG. 3 depicts these diffractograms (a. Calcined Aldrich-CaO; b. Dolomite-CaO; c. $Ca(OH)_2$-CaO; d. PCC-CaO; e. Limestone-CaO; and f. Aldrich-CaO). From this figure we can conclude that the crystal structure of the CaO sorbents obtained from numerous sources is identical. Only the XRD pattern corresponding to dolomite-derived CaO shows extra peaks due to the presence of MgO in the calcined dolomite. Based on the similarity in all the CaO structures, it can be assumed that any difference in reactivity of CaO for carbonation is an artifact of the sorbent morphology and not due to the chemistry of the gas-solid reaction that occurs on the CaO surface.

Precipitated Calcium Carbonate (PCC) Synthesis

Figure 4:
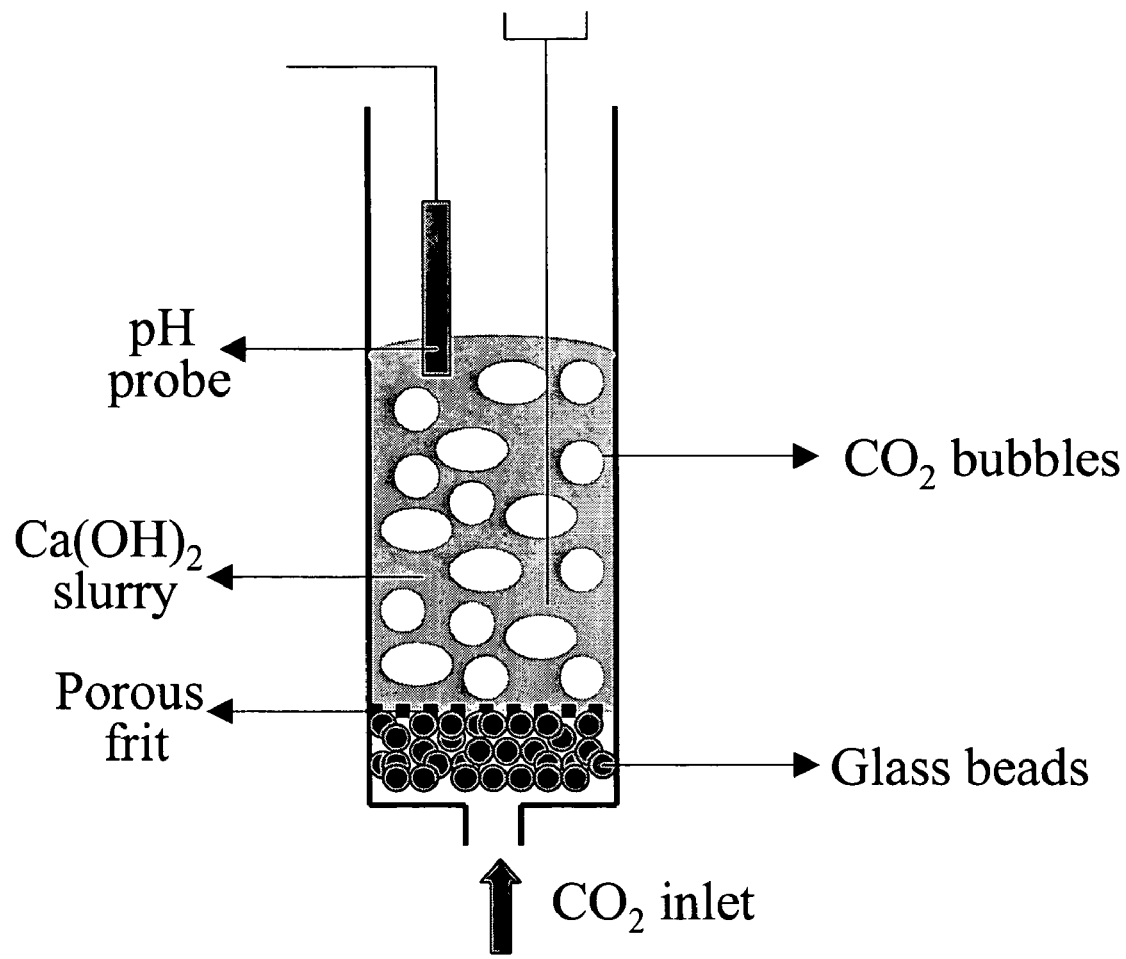
FIG. 4 is a schematic diagram of a carbonator reactor for the synthesis of precipitated calcium carbonate.
Figure 5:
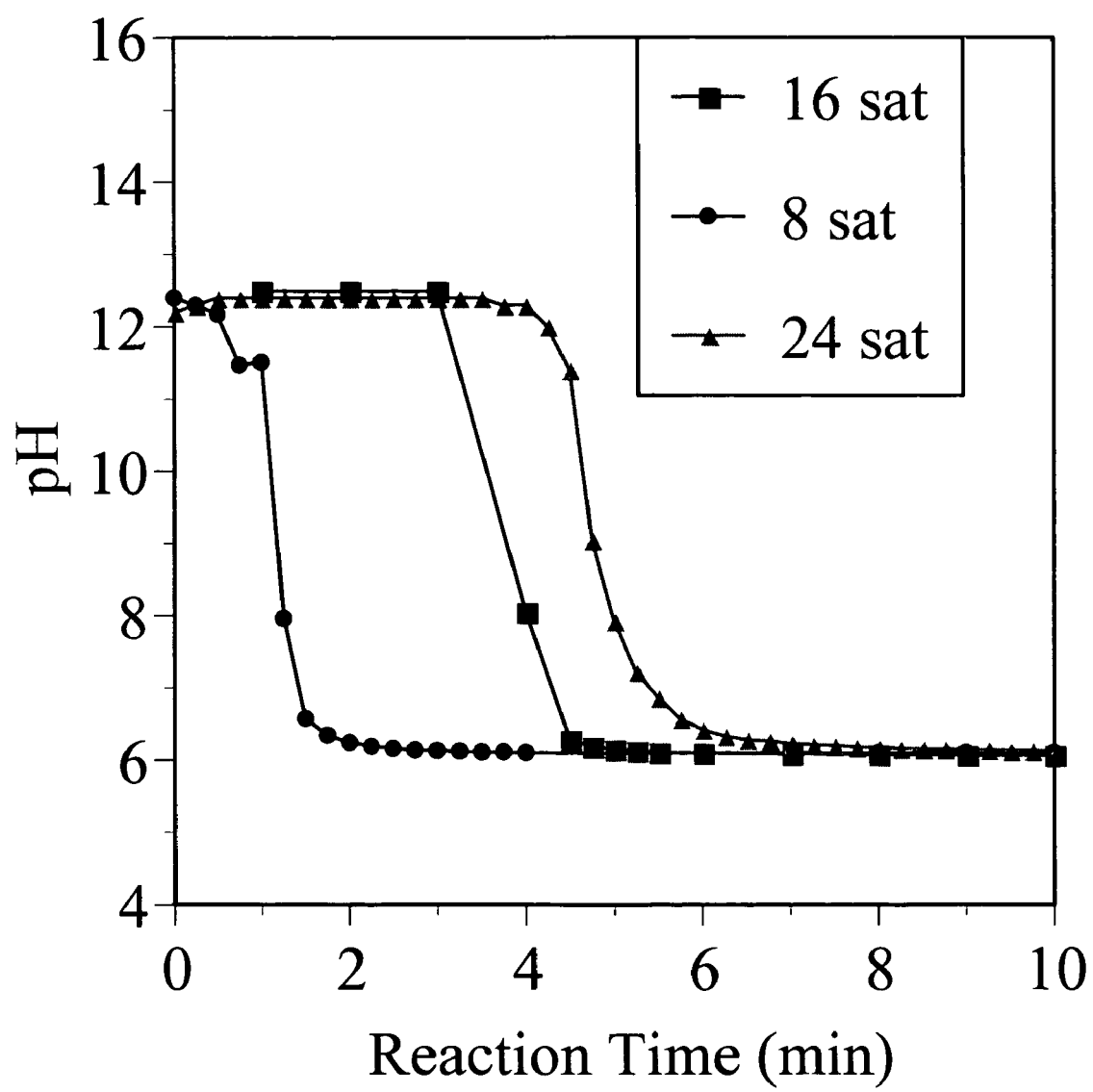
FIG. 5 shows the change in the pH of the slurry as a function of $Ca(OH)_2$ loading. (500 mL water, 0.0575% N40V® dispersant, 4 scfh $CO_2$).

Structurally altered high surface area CaO precursors were synthesized based on the procedure outlined elsewhere (Fan, L.-S.; Ghosh-Dastidar, A.; Mahuli, S.; Calcium Carbonate Sorbent and Methods of Making the Same. U.S. Pat. No. 5,779,464 and Agnihotri, R.; Chauk, S.; Mahuli, S.; Fan, L.-S. Influence of Surface Modifiers on Structure of Precipitated Calcium Carbonate. *Ind. Eng. Chem. Res.* 1999, 38, 2283-2291). A schematic diagram of the slurry bubble column used for this purpose is shown in FIG. 4. The carbonator 40 consists of a 2" OD Pyrex tube 40a. A porous frit 40d at the bottom, disposed over glass beads 40f, provides good distribution of $CO_2$ 40g through the slurry 40c. A K-type thermocouple 40h inserted in the slurry continuously records the slurry temperature. A pH probe 40b monitors the pH of the slurry as the reaction medium changes from a basic to an acidic solution as the reaction proceeds. First, 500 ml of distilled water is poured into the carbonator, followed by the addition of 0.0575 g of N40V®. 12.8 g of $Ca(OH)_2$ is added to the solution to provide a loading of 2.56% by weight. This corresponds to a concentration of 16-sat (concentration of $Ca(OH)_2$ is 16 times its saturation solubility limit). The solubility of $Ca(OH)_2$ (~0.16 g/100 g water) leads to a pH of 12 at the start of the experiment. The remaining $Ca(OH)_2$ remains suspended in the solution. The ratio of N40V® and $Ca(OH)_2$ loading is chosen to create a surface charge of zero on the incipiently formed $CaCO_3$ particles. The flow of $CO_2$ 40e into the carbonator is then started and the pH was continuously monitored. FIG. 5 shows the change in pH with reaction time as a function of $Ca(OH)_2$ loading. $CO_2$ dissolved in water provides carbonate ions that react with $Ca^{++}$ ions to form $CaCO_3$ according to the reaction below:

$$Ca^{2+} + CO_3^{2-} \rightarrow CaCO_3 \qquad (3)$$

$CaCO_3$ has a much lower solubility in water (~0.0012 g/100 g water) compared to $Ca(OH)_2$ and thus precipitates out. As the reaction proceeds, $Ca^{2+}$ ions get depleted, but are continuously replenished by the suspended $Ca(OH)_2$. Hence the pH remains 12. As the reaction proceeds, $Ca(OH)_2$ ultimately gets depleted and the concentration of $Ca^{2+}$ ions cannot be maintained at its solubility limit. On the other hand, continued dissolution of $CO_2$ gas leads to the accumulation of $H^+$ ions causing the solution to become acidic. Eventually, the pH settles at about 6.0, corresponding to equilibrium solubility of $CO_2$ in water at ambient temperature. This also signals the end of the carbonation of all $Ca(OH)_2$. The slurry is then removed from the precipitator, vacuum filtered and stored in a vacuum oven at 90-110° C. for 20 hours to completely remove the moisture. Higher Ca(OH)$_2$ loading requires more reaction time as evident from FIG. 5.

Effect of the Ratio of Ca(OH)$_2$ and Dispersant on PCC Morphology

Figure 6:
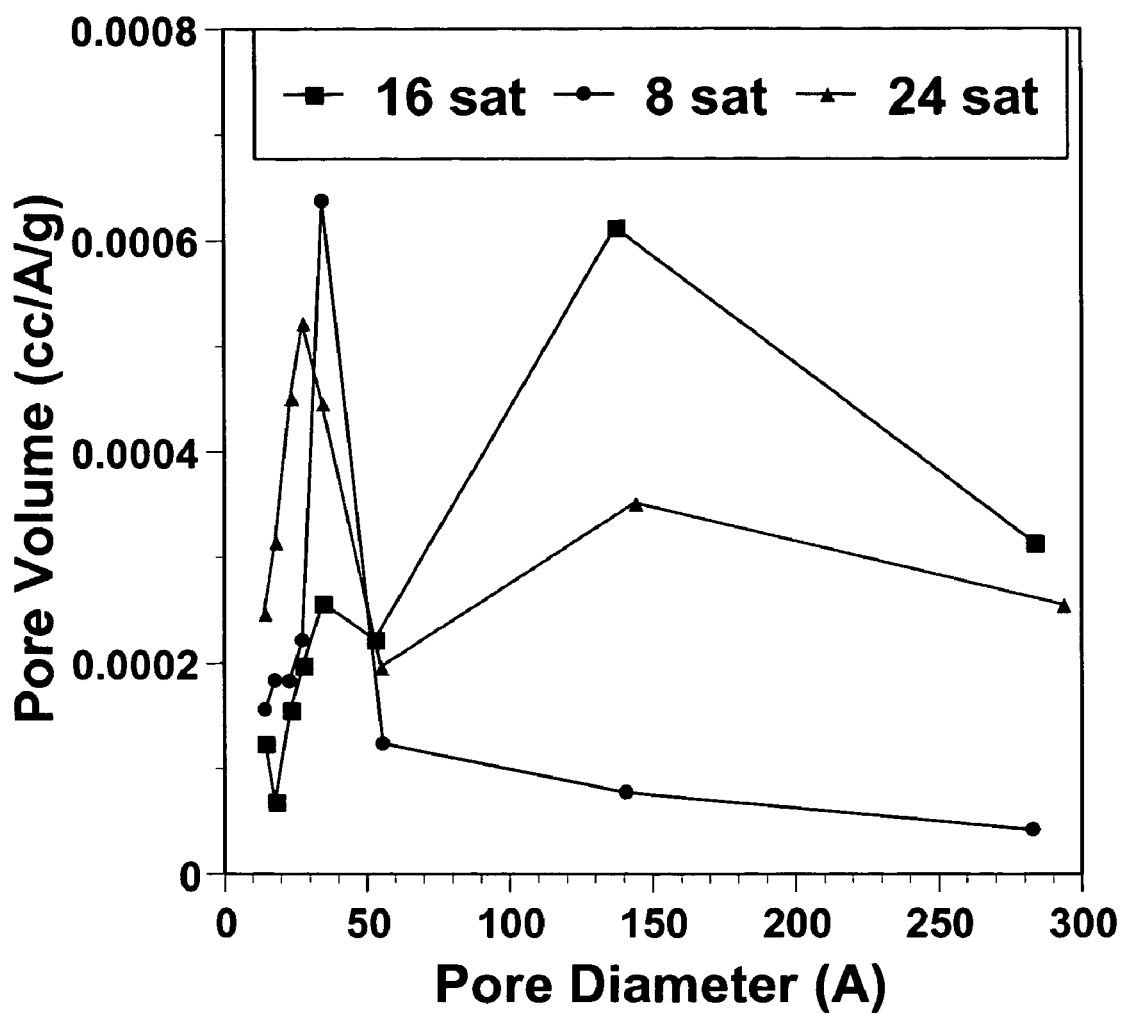
FIG. 6 depicts the effect of $Ca(OH)_2$ loading on the morphology of Precipitated Calcium Carbonate (PCC) (500 mL water, 0.0575% N40V® dispersant, 4 scfh $CO_2$).

Precipitated calcium carbonate can be obtained by the reaction between carbonate and calcium ions in solution. It is known that the CaCO$_3$ nuclei that precipitate out have positive surface charge on them that prevent agglomeration (Agnihotri, R.; Chauk, S.; Mahuli, S.; Fan, L.-S. Influence of Surface Modifiers on Structure of Precipitated Calcium Carbonate. *Ind. Eng. Chem. Res.* 1999, 38, 2283-2291). The resulting structure is also microporous in nature. However, the structural properties of the synthesized PCC can be altered by the use of negatively charged dispersants that neutralize the surface charges. This makes the ratio between the Ca(OH)$_2$ loading and the dispersant used very critical. Besides, the effect of Ca(OH)$_2$ loading in the slurry was studied to enhance the productivity of the precipitation process by synthesizing more PCC from the same slurry volume. 8-sat, 16-sat and 24-sat were used as Ca(OH)$_2$ loading levels, all other factors remaining constant. It can be seen from FIG. 6 and Table 1 that at a concentration of 8-sat, there is proportionally more dispersant in the slurry causing the incipiently formed CaCO$_3$ particles to be negatively charged. The negative charge prevents the agglomeration of these nuclei eventually leading to the formation of microporous PCC as shown in FIG. 6. Its surface area is also relatively lower. At a Ca(OH)$_2$ loading corresponding to 16-sat, the ratio of N40V® and CaCO$_3$ is balanced and the surface charge on the nuclei is zero. This allows optimal association of these nuclei leading to a predominantly mesoporous structure. The SA of PCC under these optimum conditions is also the highest at 38.3 m$^2$/g. As the loading of Ca(OH)$_2$ is raised to 24-sat, there is not enough N40V® dispersant to neutralize the surface charge on all the incipiently formed nuclei. There could possibly be some positively charged particles. This again creates non-optimum conditions leading to a loss in SA and PV compared to the 16-sat case. Another experiment was conducted to process a 32-sat Ca(OH)$_2$ slurry keeping the Ca(OH)$_2$ to N40V® ratio constant. The SA/PV of PCC synthesized from a 32-sat slurry was 37.07 m$^2$/g and 0.139 cm$^3$/g respectively; lending support to the fact that higher mass of PCC can be synthesized from the same amount of slurry.

TABLE 1

Morphological properties of PCC as a function of N40V ®:Ca(OH)$_2$ loading ratio (500 ml water, 0.0575% N40V ® dispersant, 4 scfh CO$_2$).

| Ca(OH)$_2$ loading weight % | Surface Area (m$^2$/g) | Pore Volume (cm$^3$/g) |
|---|---|---|
| 1.28 | 13.8 | 0.03 |
| 2.56 | 38.3 | 0.14 |
| 3.84 | 36.8 | 0.11 |

Pore Structure of CaO Sorbents

Figure 7:
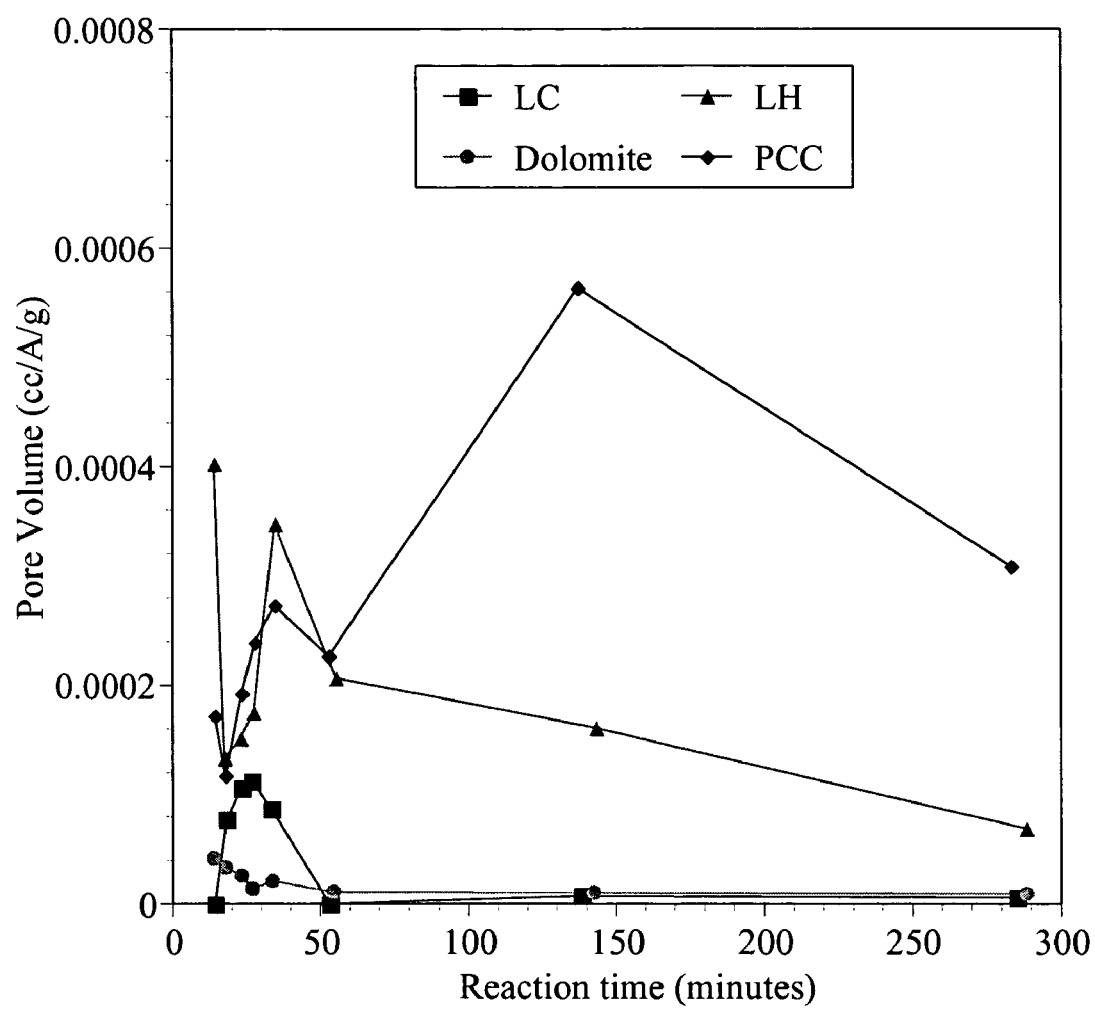
FIG. 7 compares the pore size distribution of four CaO precursors.

CaO sorbents were synthesized by calcining various CaO precursors such as Linwood calcium carbonate (LC), dolomite (DL), Linwood calcium hydroxide (LH), and precipitated calcium carbonate (PCC). For convenience, the oxides derived from these sources are termed as LC-CaO, FCD-CaO (for fully calcined dolomite-CaO), LH-CaO, and PCC-CaO, respectively. The procedure involved heating the precursor in flowing nitrogen beyond the calcination temperature (800-950° C.) for an hour followed by its storage in a desiccator. Structural properties such as surface area (SA) and pore volume (PV) of these chemicals are listed in Table 2 and their pore size distributions are shown in FIG. 7. The SA of naturally occurring minerals, LC and dolomite was very low, 1.06 and 1.82 m$^2$/g, respectively. LH was synthesized by first calcining the LC followed by its hydration. LH exhibited a considerably higher SA (13.19 m$^2$/g) and PV compared to the LC. The SA of PCC (38.3 m$^2$/g), however, was the highest among all precursors. From FIG. 5, we can infer that the structures of LC, DL and LH are predominantly microporous in nature. Most of the porosity lies in pores below 5 nm in diameter. In contrast, the maximum in PV occurs at 15 nm for PCC and most of its PV originates from mesopores in the 5-25 nm range.

TABLE 2

Morphological properties (surface area and pore volume) of various CaO sorbents and their precursors.

| Sorbent Name | Surface Area (m$^2$/g) | Pore Volume (cm$^3$/g) |
|---|---|---|
| LC | 1.1 | 0.003 |
| LC-CaO | 17.8 | 0.078 |
| Dolomite | 1.8 | 0.004 |
| FCD-CaO | 29.8 | 0.08 |
| LH | 13.2 | 0.0453 |
| LH-CaO | 33.3 | 0.1 |
| PCC | 38.3 | 0.11 |
| PCC-CaO | 12.8 | 0.027 |

Carbonation of CaO Sorbents

Figure 8:
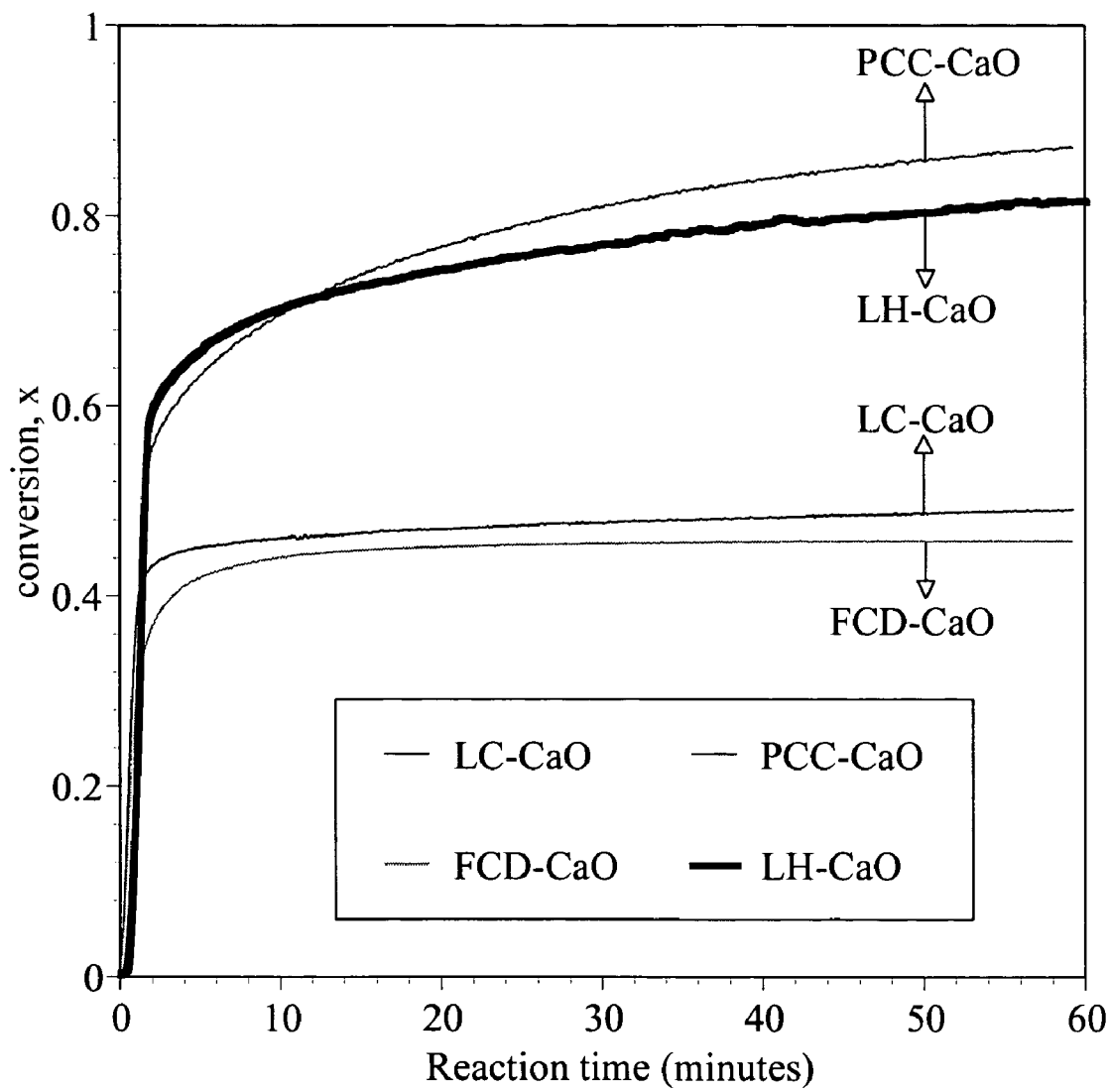
FIG. 8 compares the conversion of four CaO sorbents under pure $CO_2$ at 650° C.
Figure 9:
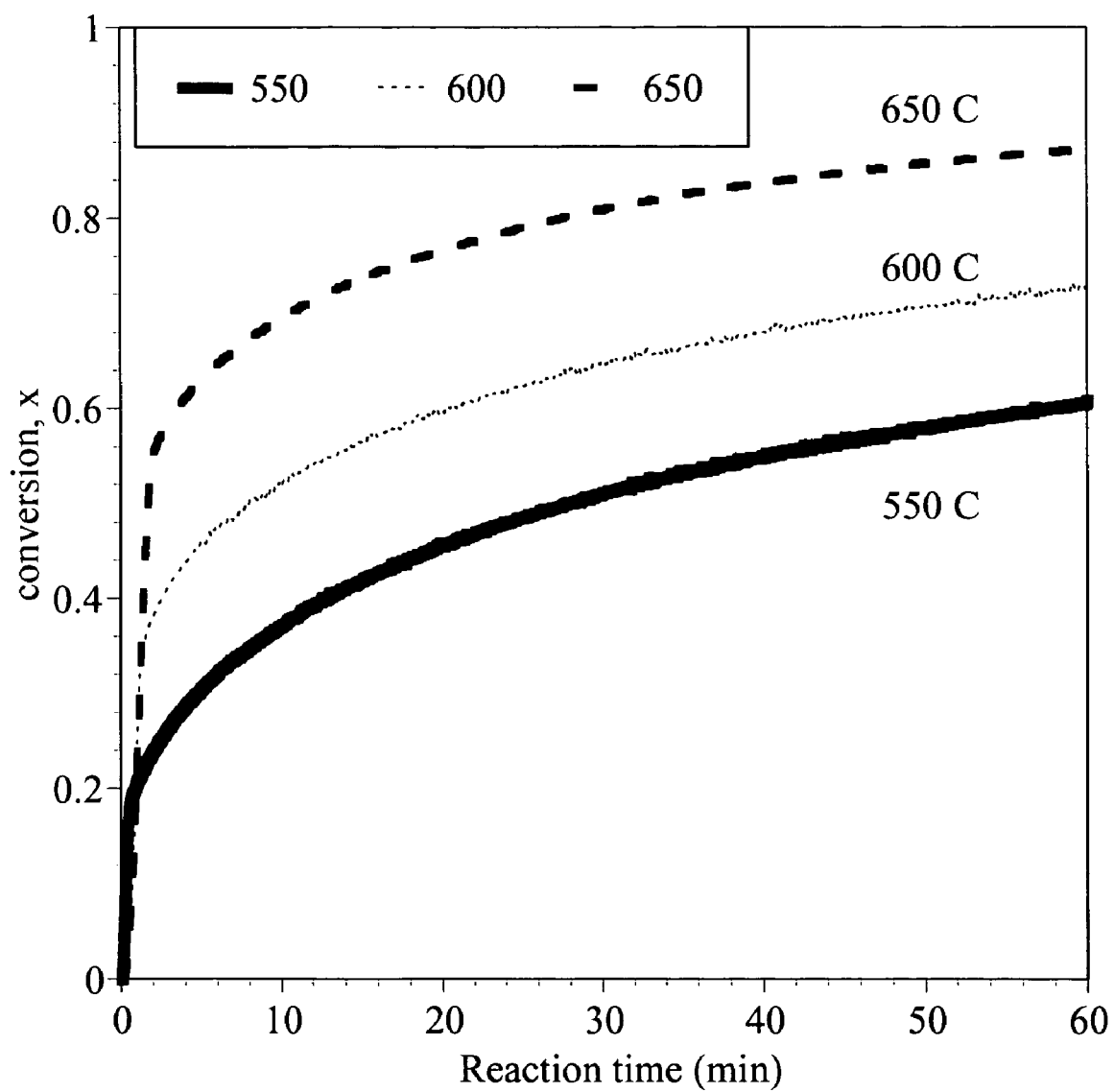
FIG. 9 illustrates the effect of temperature on the carbonation of PCC-CaO.

The performance of these four CaO sorbents was tested in a TGA. The experimental procedure consisted of placing 6-12 mg of the chosen CaO sorbent in a thin layer in a quartz pan to minimize external mass transfer resistances. The sorbent was then heated in flowing nitrogen (5.0 grade, 99.999% pure) to the desired temperature. The representative temperatures used in these experiments were 550° C., 600° C. and 650° C. Once the desired temperature was reached, the flow was switched to 100% CO$_2$ stream. The increase in weight with time was recorded and the conversion of CaO to CaCO$_3$ was calculated from the increase in weight. Only the data obtained at 650° C. is reported here. The performance of the four CaO sorbents, LC-CaO, FCD-CaO, LH-CaO and PCC-CaO at 650° C. is depicted in FIG. 8. Initially, CO$_2$ diffuses into the pores of the LC-CaO and the reaction takes place on the CaO surface provided by the pores. The figure shows that there is a rapid increase in weight in the first 1-2 minutes. The conversion attained in this kinetically controlled regime depends on the initial surface area of the CaO sorbent. LC-CaO and FCD-CaO attained 40-45% conversion, while LH-CaO and PCC-CaO attained about 60% and 54% conversion, respectively, in this regime. After this regime, conversion increases relatively slowly with time. The increase in conversion is only about 2-4% in the next hour for LC-CaO and FCD-CaO. This confirms the susceptibility of micropores to pore filling and pore pluggage described earlier due to the formation of a higher volume product, CaCO$_3$. The trend is not as dramatic for the case of LH-CaO because of its relatively higher initial surface area. The conversion for LH-CaO increases by another 18% in the diffusion controlled regime. However, the increase in conversion for PCC-CaO is about 34-36% more in the second regime. Since the PCC-CaO structure is mesoporous, the formation of $CaCO_3$ product layer is not able to plug all the pore mouths. This in turn allows the heterogeneous reaction to occur on a larger CaO surface. Once the kinetically controlled regime is over, diffusion of ions occurs through a larger area, ultimately leading to a higher conversion of 88-90% for PCC-CaO. FIG. 9 shows the effect of temperature on the carbonation of PCC-CaO. It can be seen that the extent of conversion in the kinetic regime is different at different temperatures. However, unlike LC-CaO, the conversion at any temperature does not seem to taper off and given sufficient time, PCC-CaO is capable of attaining 90% or higher conversion at all of these temperatures.

Cyclic Calcination and Carbonation

Figure 10:
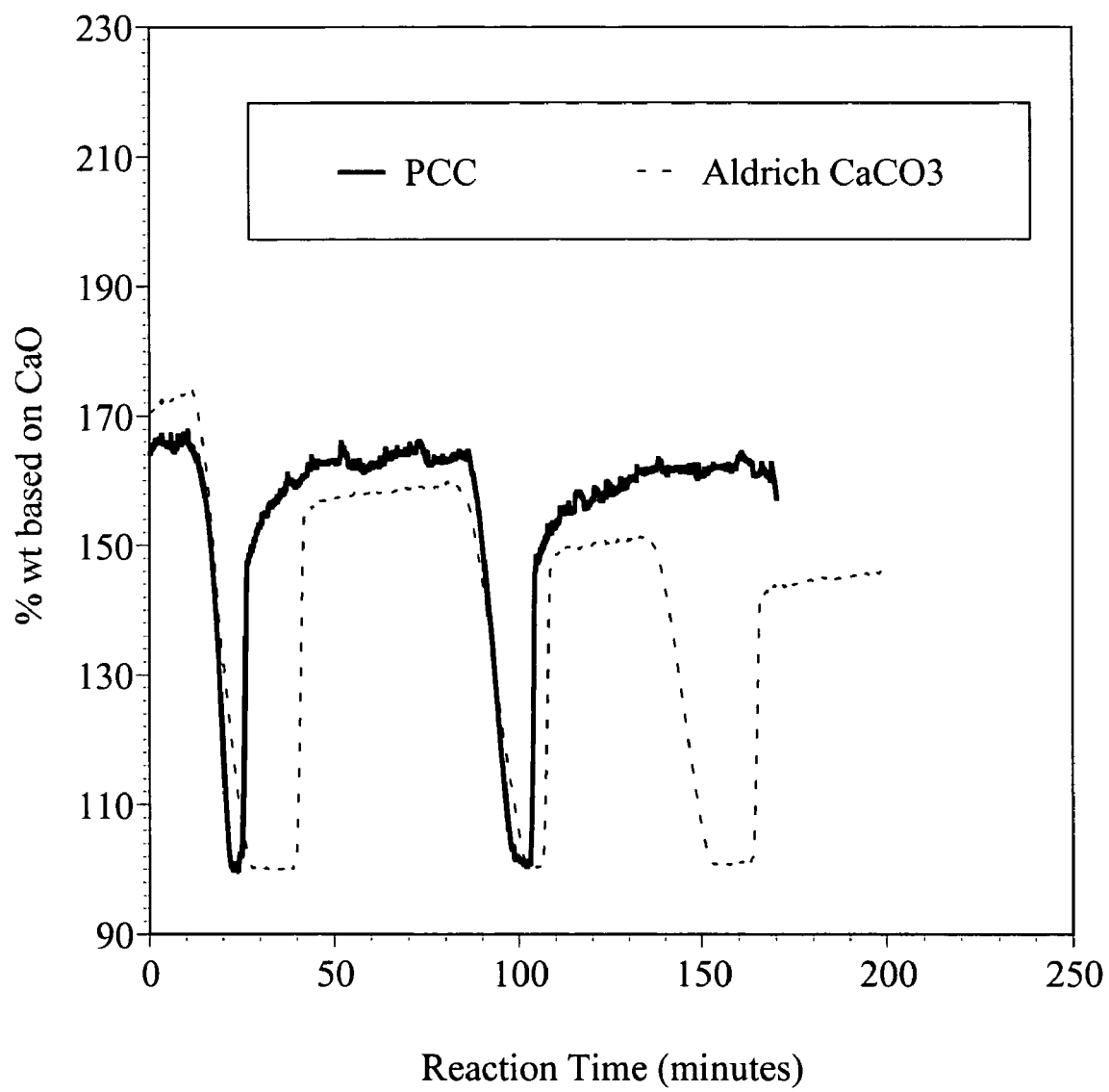
FIG. 10 illustrates the carbonation-calcination cycles on Aldrich $CaCO_3$ and PCC at 700° C.
Figure 11:
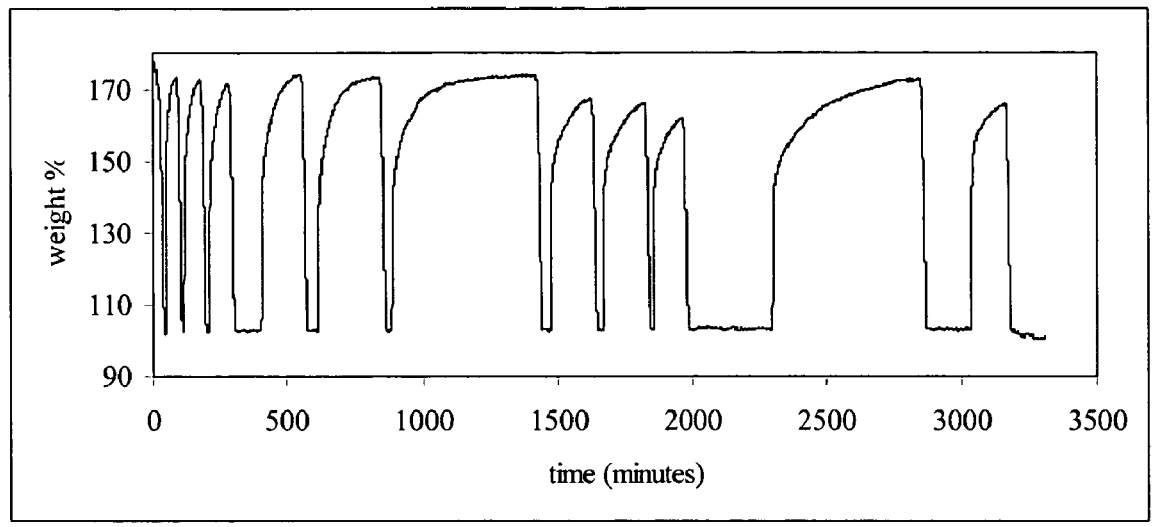
FIG. 11 shows extended carbonation-calcination cycles on precipitated calcium carbonate (PCC) powder at 700° C.

One of the possible hurdles in the utilization of metal oxides for the carbonation and calcination reaction scheme is its vulnerability to sintering due to the thermal cycling imposed by the cyclical nature of these reactions. Cyclical studies were carried out to quantify any loss in reactivity of these sorbents upon multiple cycles. The temperature chosen for cyclical studies was 700° C. This temperature is sufficient to achieve carbonation in the presence of pure $CO_2$, and also to calcine the $CaCO_3$ so formed after the gas is switched from $CO_2$ to $N_2$. A variety of precursors were first calcined in nitrogen at 700° C. The gas was then switched to pure $CO_2$ and the weight gain continuously tracked. After reaching the ultimate conversion, the gas was switched back to $N_2$. This process was repeated for 2-3 cycles. The data obtained on Aldrich $CaCO_3$ and PCC undergoing this cyclical study is shown in FIG. 10. It can be seen that the reactivity of Aldrich $CaCO_3$ exhibited a gradual decrease even after the first cycle. In contrast, PCC completely regained its mass after the first calcination and carbonation cycle. At 700° C., we can deduce that the conversion is almost complete (>95%). The figure also shows that the reactivity did not decrease in the second cycle either. Under the reaction conditions chosen, any sintering did not seem to adversely affect the sorbent morphology. We continued an extended study of eleven calcination and carbonation cycles lasting over three days on PCC. The data is provided in FIG. 11. It can be seen that the sorbent reactivity remained high and if enough reaction time is provided, the conversion could reach beyond 90% in every cycle. This is a positive result for the structural viability of this sorbent under multiple cycles.

Effect of Vacuum Calcination

Figure 12:
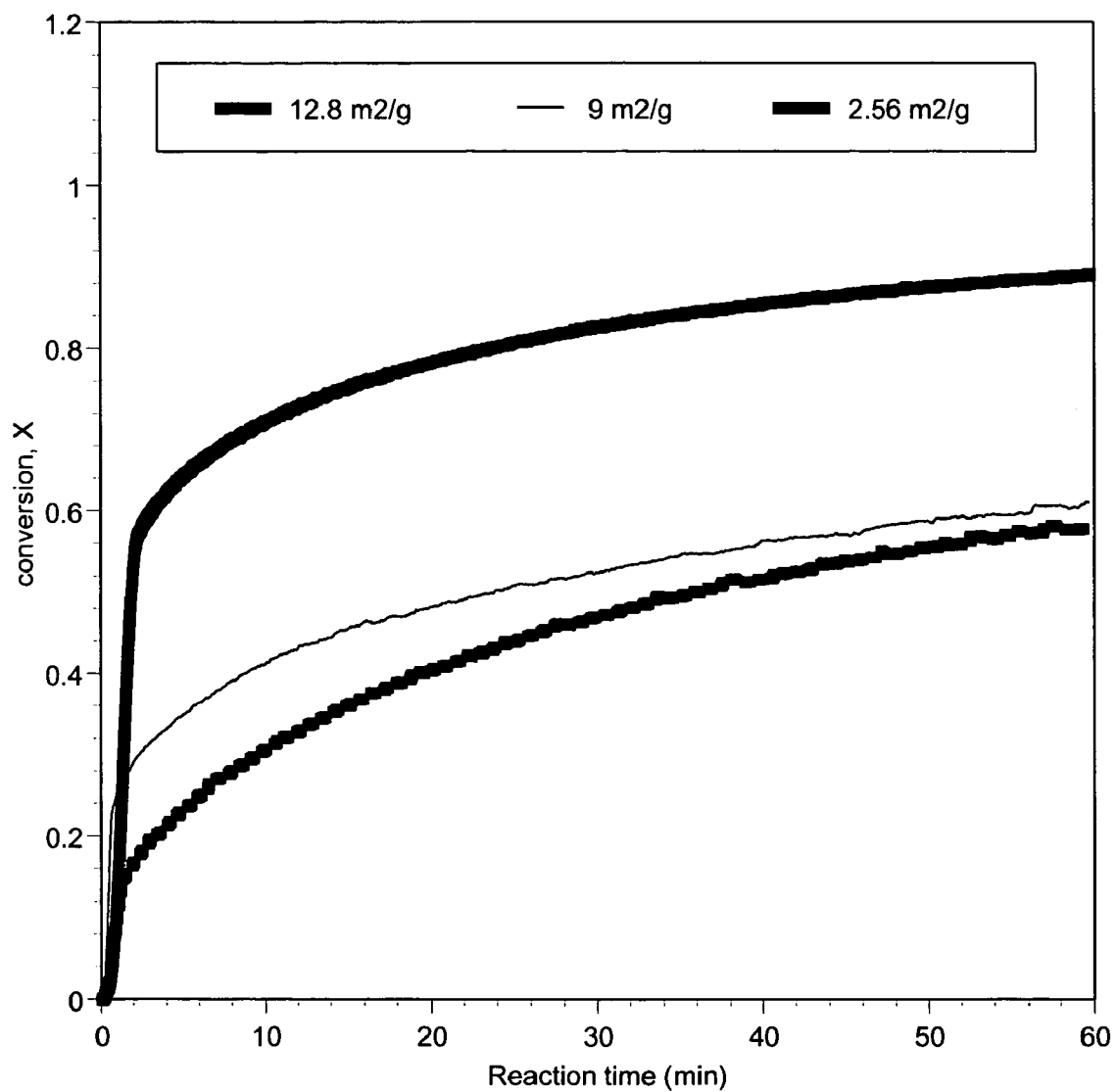
FIG. 12 compares the effect of initial surface area of PCC-CaO to its reactivity towards the carbonation reaction at 700° C.

The effect of initial surface area of CaO sorbents was studied. CaO sorbents were synthesized from PCC under different calcination conditions. The role of surface area on the extent of carbonation is shown in FIG. 12. Different surface area PCC-CaO sorbents were synthesized by the calcination of PCC at a range of calcination temperature to induce varying degrees of sintering. It can be seen that a higher initial surface area (and its associated pore volume) leads to higher reactivity and conversion. Thus, it is necessary to identify calcination conditions that optimize the SA/PV and pore size distribution of PCC-CaO. It has been suggested in literature that CaO procured from the calcination of limestone under vacuum has a higher reactivity. It was observed that under air calcination at 650-800° C., sharp edges of calcite powder were replaced by rounded surfaces and neck areas indicating severe sintering (Beruto, D., and Searcy, A. W., "Calcium oxides of high reactivity." Nature, 1976, 263, 221-222). The resulting CaO structure was highly crystalline as well. In contrast, the sharp edges of calcite were retained in the CaO obtained under vacuum. The CaO however did not possess a high degree of crystallinity. The latter also showed high reactivity towards hydration. Vacuum calcination leads to the formation of a metastable-nanocrystalline calcia structure while calcination in helium atmosphere lead to a stable microcrystalline calcia structure (Dash, S., Kamruddin, M., Ajikumar, P. K., Tyagi, A. K., and Raj, B., "Nanocrystalline and metastable phase formation in vacuum thermal decomposition of calcium carbonate." Thermochimica acta, 2000, 363, 129-135). Beruto et al., [1980] estimated the surface area and pore volume of limestone based CaO to be about 78-89 $m^2/g$ and 0.269 ml/g respectively.

Figure 13:
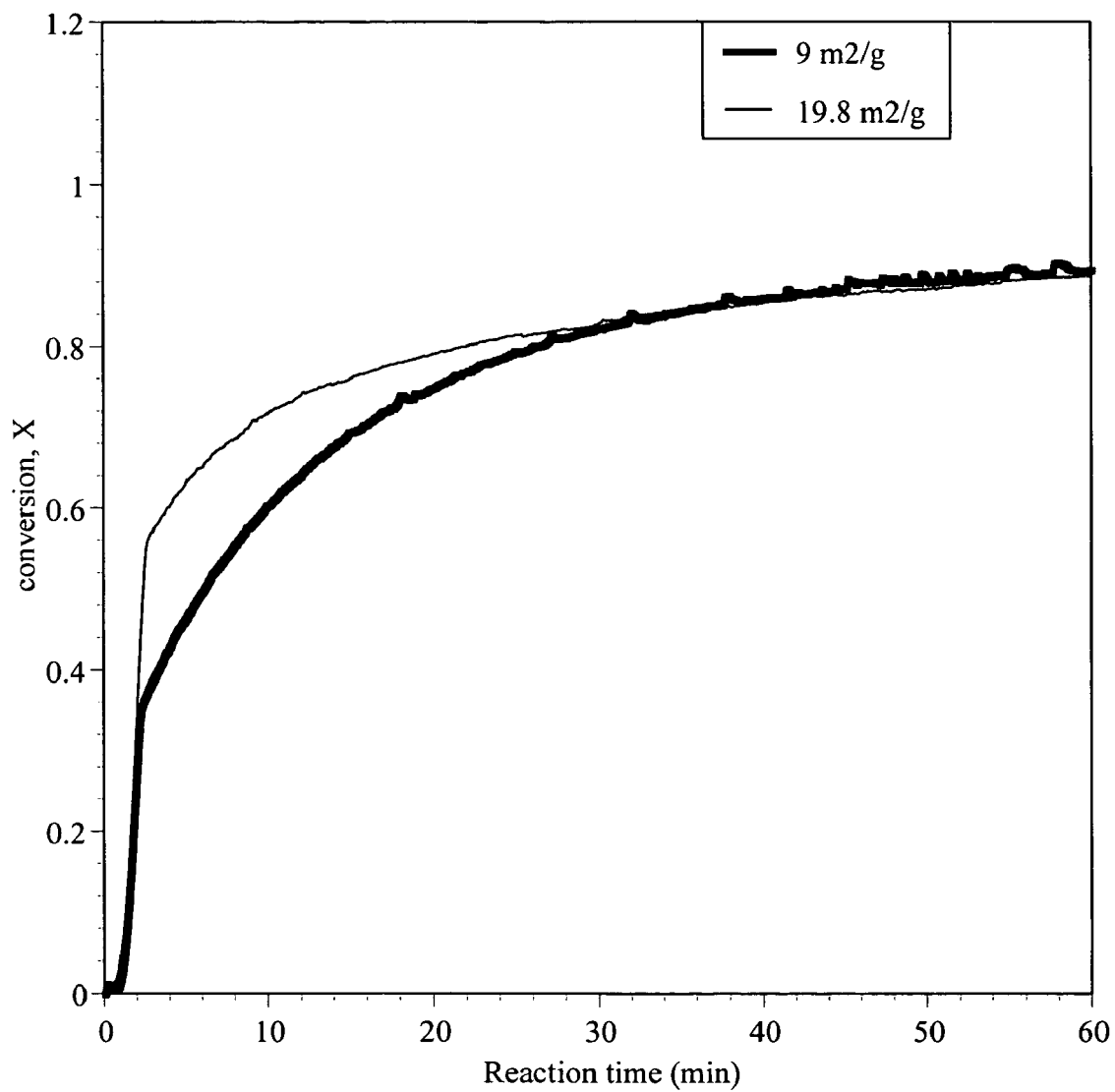
FIG. 13 depicts the effect of vacuum calcination on the reactivity of PCC-CaO towards the carbonation reaction at 700° C.

The effect of vacuum calcination was studied in this process. The surface area of Linwood carbonate increased from 17.79 to 21.93 $m^2/g$ and pore volume from 0.07815 to 0.1117 ml/g for calcination under nitrogen and under vacuum, respectively. Similar enhancements were observed for PCC based CaO sorbents as well. It has been observed that PCC-CaO is susceptible to high degree of sintering and the surface area of the sorbent falls off rapidly. Calcination in nitrogen resulted in surface areas below 13 $m^2/g$ repeatedly. However, vacuum calcination lead to a surface area of 19.84 $m^2/g$ and 0.04089 ml/g pore volume. The carbonation characteristics are shown in FIG. 13.

Vacuum calcination of PCC followed by the carbonation of PCC-CaO was repeated over two cycles. PCC was first vacuum calcined to CaO-1 at 750° C. CaO-1 was carbonated to CC-2 at 700° C. followed by its vacuum decomposition to CaO-2 that is carbonated to CC-3. The values of surface area and pore volume of the sorbent at various stages are provided in Table 3 below:

TABLE 3

Structural properties of Calcium based sorbents undergoing vacuum calcination at 750° C. and carbonation at 700° C.

| | Surface Area ($m^2/g$) | Pore Volume (cc/g) |
|---|---|---|
| PCC | 38.3 | 0.1416 |
| CaO-1 | 12.63 | 0.02409 |
| CC-2 | 6.5 | 0.0103 |
| CaO-2 | 15.93 | 0.04008 |
| CC-3 | 2.361 | 0.004483 |

The data shows that PCC is susceptible to sintering because the CaO obtained in the first cycle has a surface area of only 12.63 m2/g compared to 38.3 m2/g of PCC. As expected, pore filling leads to a drop in both properties when CaO 1 carbonates. The extent of carbonation was beyond 90%. However, it can be seen that the SA of CaO obtained after the second vacuum calcination step, CaO 2, is 15.93 $m^2/g$, which is higher than the SA of CaO 1. The pore volume of CaO 2 is also higher than that of CaO 1. These results prove that there is no systematic decline in SA and PV of sorbents with increasing calcination-carbonation cycles and that this combination is capable of providing a sustained conversion over many cycles.

The article "Carbonation-Calcination Cycle Using High Reactivity Calcium Oxide for Carbon Dioxide Separation from Flue Gas" by Himanshu Gupta and Liang-S. Fan, published on the web Jul. 11, 2002 by Ind. Eng. Chem. Res. 2002, 41, 4035-4042 is hereby incorporated in its entirety by reference.

Enhanced Hydrogen Production Integrated with CO2 Separation in a Single-stage Reactor A variety of chemical processes known to generate syngas include:

$$\text{Steam Gasification: } C + H_2O \rightarrow CO + H_2 \quad (X)$$

$$\text{Steam Methane Reforming: } CH_4 + H_2O \rightarrow CO + 3H_2 \quad (X)$$

$$\text{Partial oxidation of Hydrocarbon: } C_xH_y + O_2 \rightarrow CO + H_2 \quad (X)$$

The flow sheet shown in FIG. 14 integrates the Calcium-based reactive separation process under development in this project with a coal gasifier based electric power/chemical synthesis process plant 140. The main coal gasifier 140a consists of a high pressure and high temperature unit that allows contact between coal 140b, steam 140e and air/pure oxygen 140y in a variety of schemes. Boiler feed water 140d is preheated by passing it through gasifier 140a prior to steam tubine 140c. Waste from the gasifier is collected as slag 140z. Typical fuel gas compositions from various known coal gasifiers are shown in Table 4. Once the water gas mixture is formed at the exit of the gasifier 140a, CaO fines are injected 140f into the gas duct that react with the $CO_2$ present in the gas mixture leading to the formation of solid $CaCO_3$. As the fuel gas flows past the WGS catalyst monoliths 140g, the WGS reaction is effected forming more $CO_2$ in the process. The entrained CaO particles react with the incipiently formed $CO_2$ gas, thereby allowing further catalysis of the WGS reaction to occur. This process can be tailored to attain as high a $H_2$ concentration as possible. At the exit of the WGS reactor, the reacted $CaCO_3$ particles are captured using a high temperature solids separator 140h (e.g., a candle filter or a high temperature ESP) and separated fuel gas stream. The spent solids are now sent to a rotary calciner 140k to thermally decompose the $CaCO_3$ 140j back to CaO 140f and pure $CO_2$ 140m. The high purity $CO_2$ gas can now be economically compressed 140l, cooled, liquefied and transported for its safe sequestration 140n. The rotary calciner allows the calcium particles to remain segregated, which is crucial in maintaining a sorbent structure characterized by a higher porosity. It was previously observed in our studies that heaping of calcium sorbents leads to a lower porosity and consequently a lower reactivity over the next carbonation cycle. The calcination of the sorbent can also be effected under sub-atmospheric conditions that allow the removal of $CO_2$ as soon as it is formed from the vicinity of the calcining sorbent, thereby aiding further calcination. This vacuum can be created by means of ejector systems that are widely used in maintaining vacuum in large vacuum distillation units (VDU) in the petroleum refining industry. Lock and hopper combinations and appropriate seals ensure that the sorbent can be effectively separated from the $CO_2$ stream and re-entrained in the fuel gas duct. The hydrogen enriched fuel gas 140i can now be used to generate electric power in a fuel cell 140n or used to make fuels and chemicals 140q without any low temperature clean up. The fuel cell may receive a supply of air 140p and discharge steam 140o. The hydrogen enriched fuel gas may be sent to gas turbine 140r used to drive generator 140t to produce electricity and air compressor 140s to produce a stream of compressed air. The stream of compressed air may be sent to air separator 140x to produce the air/oxygen of 140y. The discharge from gas turbine 140t may be sent through heat exchanger 140u prior to being discharged at stack 140v. The absorbed heat may be collected by steam turbine 140w to produce additional electricity.

Thermodynamic Analysis

Primarily three important gas-solid reactions can occur when calcium oxide (CaO) is exposed to a fuel gas mixture obtained from coal gasification. CaO can undergo hydration, carbonation and sulfidation reactions with $H_2O$, $CO_2$ and $H_2S$, respectively. These can be stoichiometrically represented as:

$$\text{Hydration: } CaO + H_2O \rightarrow Ca(OH)_2 \quad (5)$$

$$\text{Carbonation: } CaO + CO_2 \rightarrow CaCO_3 \quad (6)$$

$$\text{Sulfidation: } CaO + H_2S \rightarrow CaS + H_2O \quad (7)$$

All these reactions are reversible and the extent of each of these reactions depends on the concentrations of the respective gas species and the reaction temperature. Detailed thermodynamic calculations were performed to obtain equilibrium curves for the partial pressures of $H_2O$ ($PH_2O$), $CO_2$ ($PCO_2$) and $H_2S$ ($PH_2S$) as a function of temperature, for the hydration, carbonation, and sulfidation reactions using HSC Chemistry v 5.0 (Outokumpu Research Oy, Finland). The equilibrium calculations were based on the fuel gas compositions that are typical of the different types of coal gasifiers. The details of the fuel gas mixtures are illustrated in Table 4.

TABLE 4

Typical fuel gas compositions obtained from different gasifiers. (Stultz and Kitto, 1992)

|  | Moving Bed, dry | Moving Bed slagging | Fluidized Bed | Entrained Flow, slurry | Entrained Flow, dry |
|---|---|---|---|---|---|
| Oxidant | air | Oxygen | Oxygen | Oxygen | Oxygen |
| Fuel | Sub Bituminous | Bituminous | Lignite | Bituminous | Bituminous |
| Pressure (psi) | 295 | 465 | 145 | 615 | 365 |
| CO | 17.4 | 46 | 48.2 | 41 | 60.3 |
| $H_2$ | 23.3 | 26.4 | 30.6 | 29.8 | 30 |
| $CO_2$ | 14.8 | 2.9 | 8.2 | 10.2 | 1.6 |
| $H_2O$ | . . . | 16.3 | 9.1 | 17.1 | 2 |
| $N_2$ | 38.5 | 2.8 | 0.7 | 0.8 | 4.7 |
| $CH_4$ + HCs | 5.8 | 4.2 | 2.8 | 0.3 | . . . |
| $H_2S$ + COS | 0.2 | 1.1 | 0.4 | 1.1 | 1.3 |

Figure 15A:
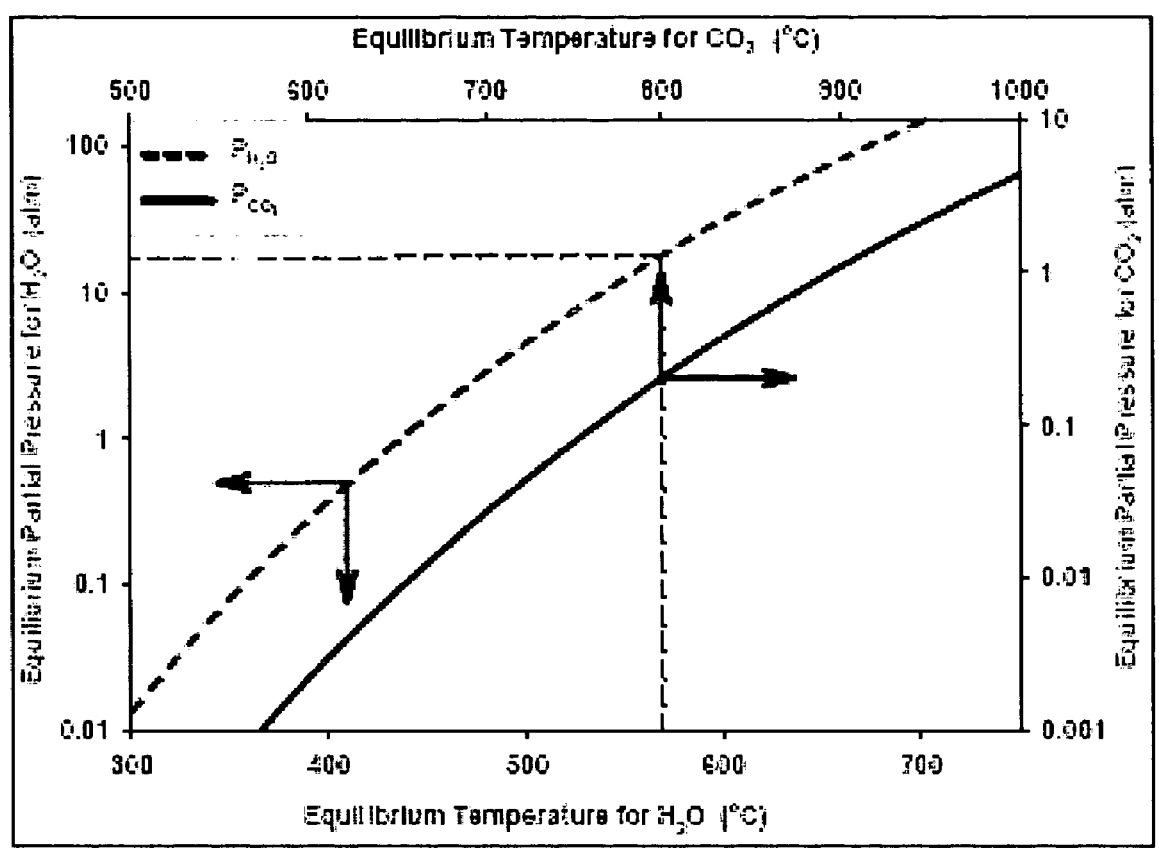
FIG. 15 illustrates thermodynamic data for predicting the temperature zones for hydration and carbonation of CaO.
Figure 15B:
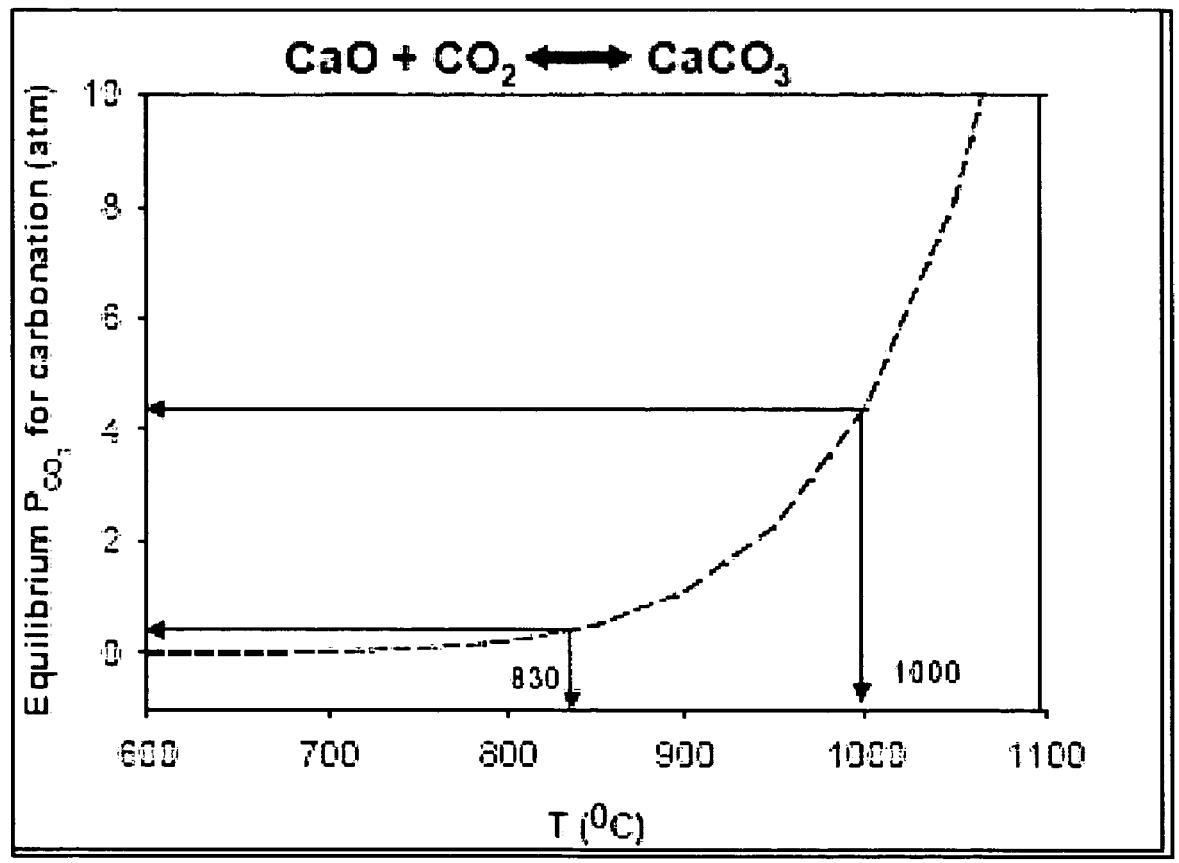
Figure 16:
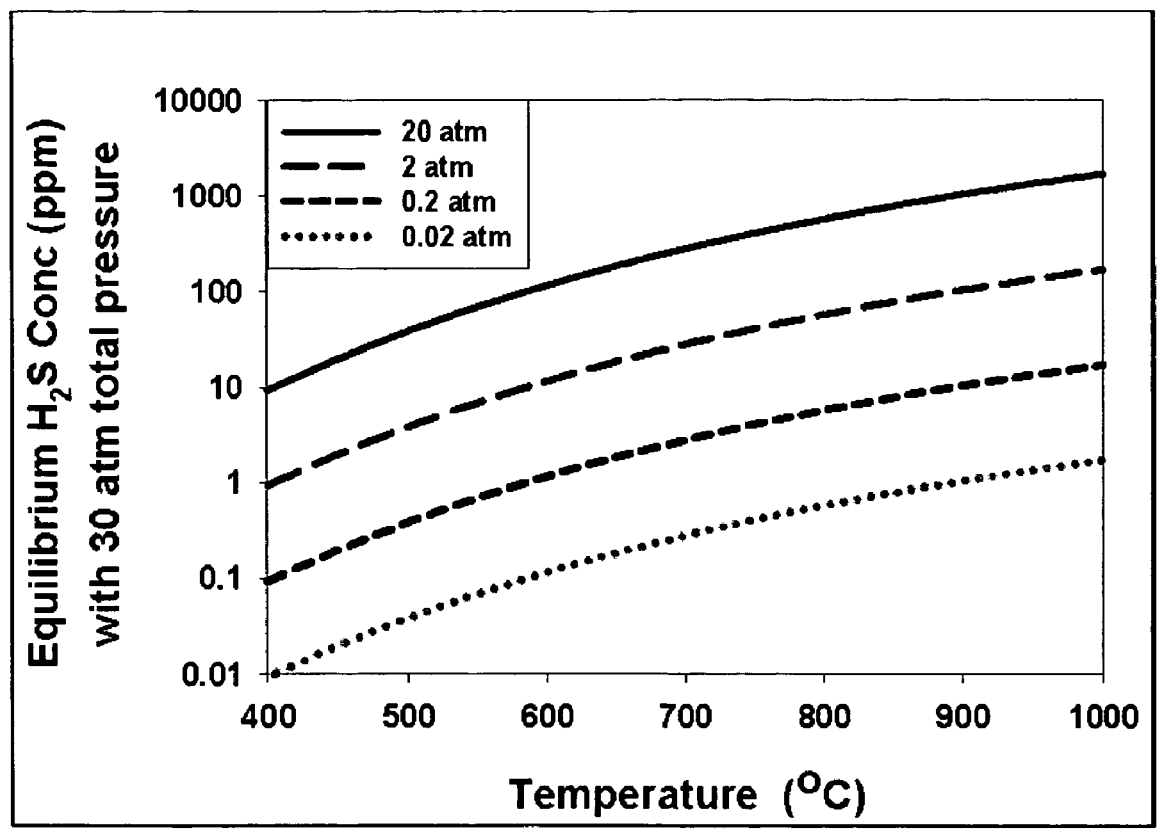
FIG. 16 illustrates thermodynamic data for predicting the equilibrium H2S concentration for CaO sulfidation with varying steam concentration (PTotal–1 atm).

The relationship between the reaction temperature and the equilibrium partial pressures of $H_2O$ and $CO_2$ for the hydration and carbonation reactions are shown in FIG. 15(a). For a typical gasifier moisture composition ranging from 12-20 atm ($PH_2O$) the hydration of CaO occurs for all temperatures below 550-575° C., respectively. By operating above these temperatures, the CaO-hydration can be prevented. FIG. 15(b) shows the typical equilibrium $CO_2$ partial pressures ($PCO_2$) as a function of temperature. From the data in Table 4, it can be inferred that the typical PCO2 in the gasifiers ranges from 0.4-4.3 atm for entrained flow (slurry) and entrained flow (dry) gasifier systems respectively. The equilibrium temperatures corresponding to those $PCO_2$ lie in the 830-1000° C. range as shown in FIG. 15(b). Thus, by operating below these temperatures, we can effect the carbonation of CaO. For the reversible sulfidation of CaO (eqn 7) the thermodynamic calculations depend on the concentration of moisture in the system. Hence, FIG. 16 depicts the equilibrium $H_2S$ concentrations in ppm for varying moisture concentrations ($PH_2O$) and 30 atm total pressure. For a typical operating temperature range of 800-1000° C. the equilibrium $H_2S$ concentration is between 5700-1700 ppm respectively for 20 atm $PH_2O$. Consequently, at 800° C. we need more than 5700 ppm $H_2S$ for the sulfidation of CaO to occur. This number changes to 570 ppm for a $PH_2O$ of 2 atm at 800° C. Thus, by changing the moisture/steam concentration in the system we can prevent the sulfidation of CaO from occurring.

EXPERIMENTAL

Sorbent and Catalyst Characterization

The high and low temperature water gas shift (WGS) reaction catalysts were procured from Süd-Chemie Inc., Louisville, Ky. The high temperature shift (HTS) catalysts comprises of iron (III) oxide supported on chromium oxide. Precipitated calcium carbonate (PCC) was synthesized by bubbling CO2 through a slurry of hydrated lime. The neutralization of the positive surface charges on the $CaCO_3$ nuclei by negatively charged N40V® molecules forms $CaCO_3$ particles characterized by a higher surface area/pore volume and a predominantly mesoporous structure. Details of this synthesis procedure have been reported elsewhere (Agnihotri et al., 1999). Hydrated lime from a naturally occurring limestone (Linwood Hydrate, LH) and a naturally occurring limestone (Linwood Carbonate, LC) was obtained from Linwood Mining and Minerals Co.

The sorbents and catalyst were analyzed to determine their morphologies using a BET analyzer. The BET surface areas, pore volumes, and pore size distributions of the catalysts and sorbents were measured at −196° C. using nitrogen as the adsorbent in a Nova 2200 Quantachrome BET analyzer. Special care was taken to ensure that all samples were vacuum degassed at 250° C. for 5 hours prior to BET analysis.

WGS Reactor Setup

Figure 17:
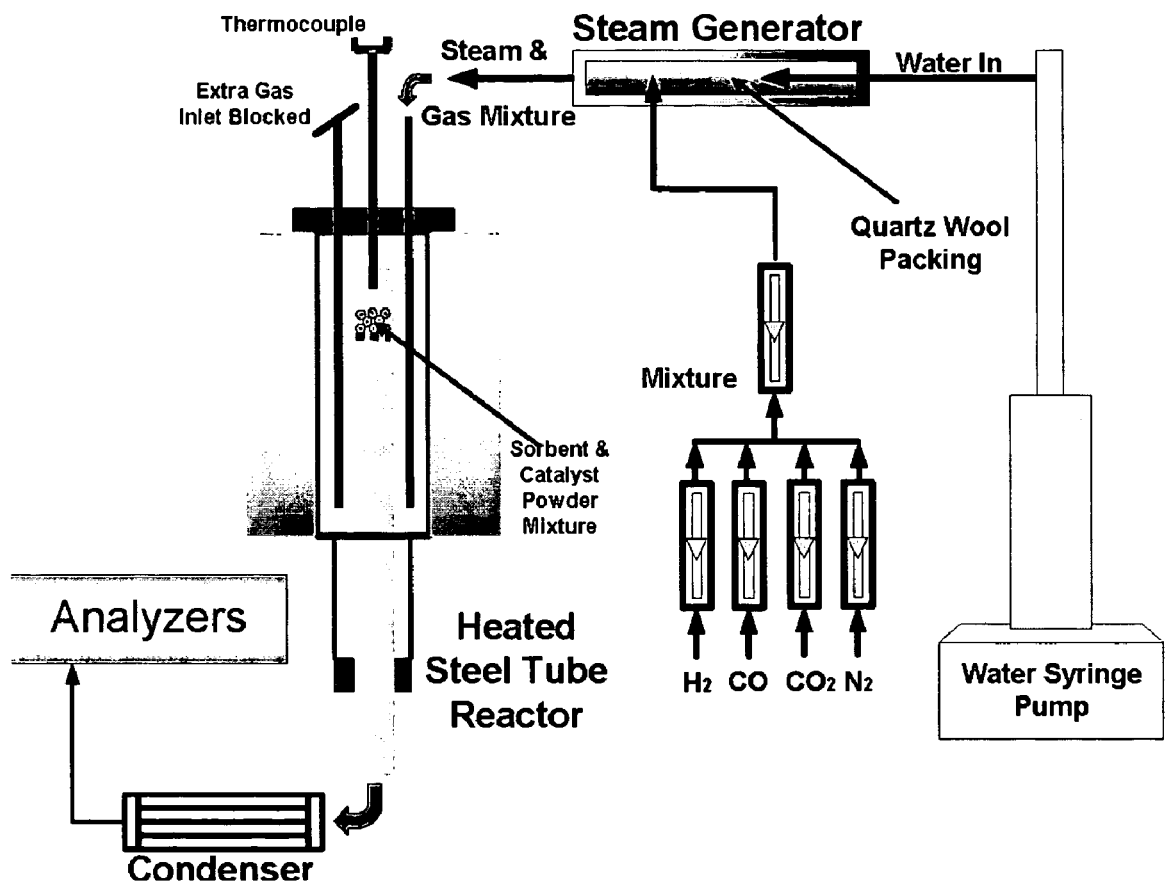
FIG. 17 shows a modified reactor set-up with steam generating unit for investigating WGS and carbonation reactions.

A reactor setup was designed, underwent several iterations and was assembled to carry out water gas shift reactions in the presence of CaO and catalyst. The reactor design assembly used to carry out these experiments is shown in FIG. 17. This setup enables us to carry out both the water gas shift reaction in the presence of CaO as well as the regeneration of the sorbent in flowing gas such as nitrogen and/or steam. The setup 170 consists of a tube furnace 170p, a steel tube reactor 170a, a steam generating unit 170c, a set of gas analyzers for the online monitoring of CO and $CO_2$ concentrations 170n, a condenser 170m to remove water from the exit gas stream and a high pressure water syringe pump 170b.

All the reactant gases ($H_2$, CO, $CO_2$, and $N_2$) are metered using modified variable area flowmeters 170e-h respectively. The syringe pump is used to supply very accurate flow-rates of water into the heated zone of the steam-generating unit in the 0.01-0.5 ml/min range. Once the steam is generated, it is picked up by the CO/$N_2$ gas mixture 170i and enters the main reactor where the sorbent/catalyst mixture 170o is loaded. All the lines connecting the steam-generating unit to the main reactor are heated using heating tapes. The steam generator is also packed with quartz wool 170d in order to distribute the water drops as they enter into the heating zone. The packing is utilized in order to provide greater surface for water evaporation and to dampen out fluctuations in steam formation. The main problem with a fluctuating steam supply is that the gas analyzers used to measure the exit CO and $CO_2$ concentrations are sensitive to gas flow rates. Even though the steam is being condensed out before the gas is sent into the analyzers, surges in the steam supply still affect the overall gas flow rate, causing the CO and $CO_2$ readings to fluctuate. The packing ultimately ensures a more continuous and constant overall gas flow rate into the main reactor and into the analyzers. Thermocouple 170k is used to monitor the temperature inside reactor 170a. Any extra gas inlets of reactor 170a are blocked 170l.

A steel tube reactor is used to hold the Ca-based sorbent and catalyst, and is kept heated using a tube furnace. The sorbent loading unit of the reactor is detachable which enables easy removal and loading of the sorbent and therefore minimizes the sorbent loading time between runs. Also, the sorbent can be changed without having to cool down the entire reactor. The gas mixture 170j entering the reactor is preheated to the reaction temperature before contacting the sorbent/catalyst particles. The gases exiting the reactor first flow through a condenser in order to separate out the moisture and then to a set of gas analyzers.

Sub Atmospheric Calcination Reactor Setup

Figure 18:
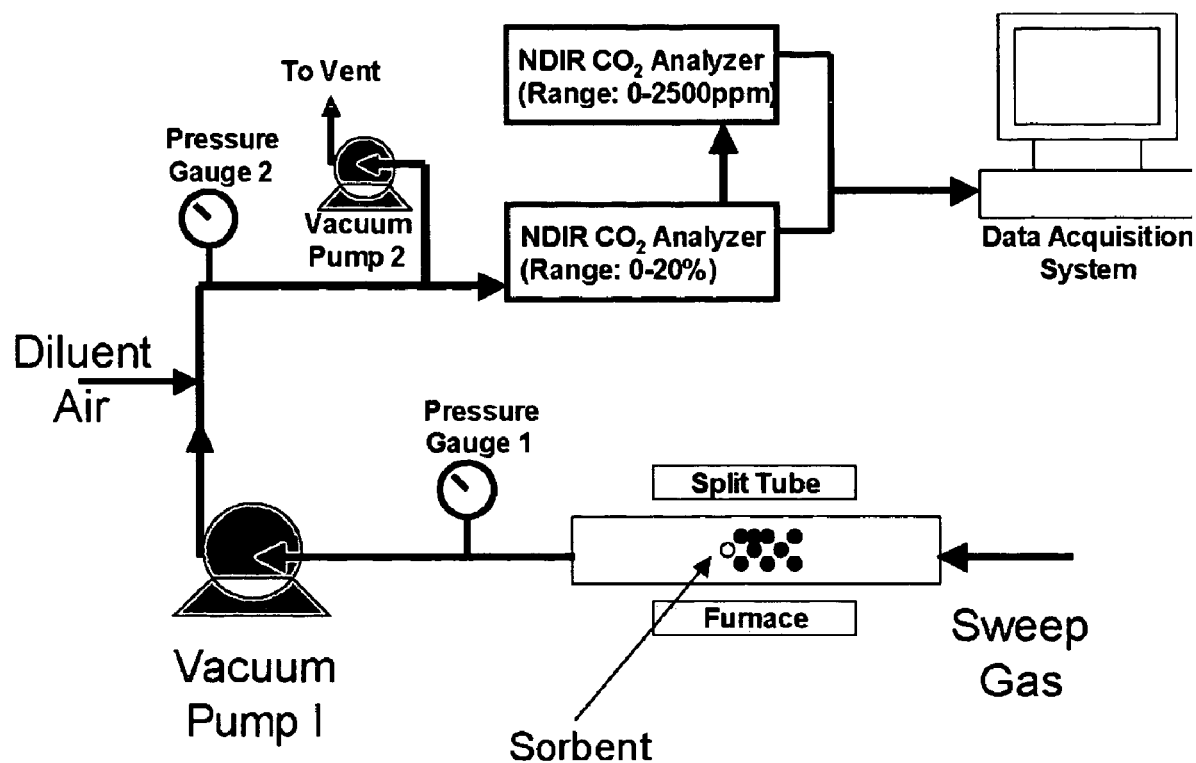
FIG. 18 illustrates the set-up for combined vacuum/sweep gas calcination experiments allowing the use of larger sorbent samples.

Once the Calcium based sorbent has reacted with the $CO_2$ being produced by the WGSR, the sorbent has to be regenerated for further use in subsequent cycles. During the regeneration of the sorbent, carbon dioxide is released from the sorbent. In order to minimize the necessity for further treatment of this released $CO_2$ before sending it to sequestration sites, it is necessary to regenerate the sorbent such that a pure stream of $CO_2$ is released. Vacuum calcination provides one method for ensuring that concentrated streams of $CO_2$ are release in the regeneration phase. The detailed setup is shown in FIG. 18. This setup 180 was assembled to handle the regeneration of large quantities of sorbent (~10-20 g per batch). The setup includes an alumina tube reactor 180b, which would hold the sorbent samples in a split tube furnace 180c that provides the heat necessary to calcine the sorbent 180d, two Non Dispersive Infra Red (NDIR) analyzers 180k-l to monitor the $CO_2$ concentration (ranges 0-2500 ppm and 0-20%) and two vacuum pumps 180f and 180i. 10 g of sorbent yields about 2.4 L of $CO_2$ at atmospheric pressure and temperature over the entire decomposition process. This gas needs to be diluted with air in order to ensure that the $CO_2$ concentration lies in the detection range of the $CO_2$ analyzers. Vacuum Pump 180f is a dry vacuum pump procured from BOC Edwards capable of achieving vacuum levels as low as 50 mtorr and gas flowrates of 6 m³/hr. The CO2 analyzers have their own inbuilt pumps and are capable of drawing up to 2 LPM from the header for online CO2 analysis. The second pump 180*i* is a smaller dry pump and is put in place to ensure that there is no pressure buildup in the ¼" lines connecting the vacuum pump to the analyzers. Pump 180*i* discharges to vent 180*j*. The temperature of the furnace is controlled with a thermocouple inserted into the central zone of the furnace. The temperature of the reactor was also monitored using a second thermocouple inserted into the center of the alumina tube. The setup is also capable of combining vacuum calcination with flow of sweep gas 180*a*. As it may not be feasible to supply very low vacuum levels for the calcination of the sorbent in industrial settings, it may be necessary to study the calcination process in combination with the addition of various sweep gases such as N2/steam. Pressure gauges 180*e*, *h* and volumetric flow meters are included to monitor the vacuum pressure in the reactor, the pressure in the ¼" lines and the flows of the sweep gases into the calciner and the flow of the air 180*g* used in the dilution of the exhaust $CO_2$ before sending it to the analyzers. The analyzers are also connected to a data acquisition system 180*m* that can record analyzer readings every second.

RESULTS AND DISCUSSIONS

Catalyst and Sorbent Characterization

Figure 19:
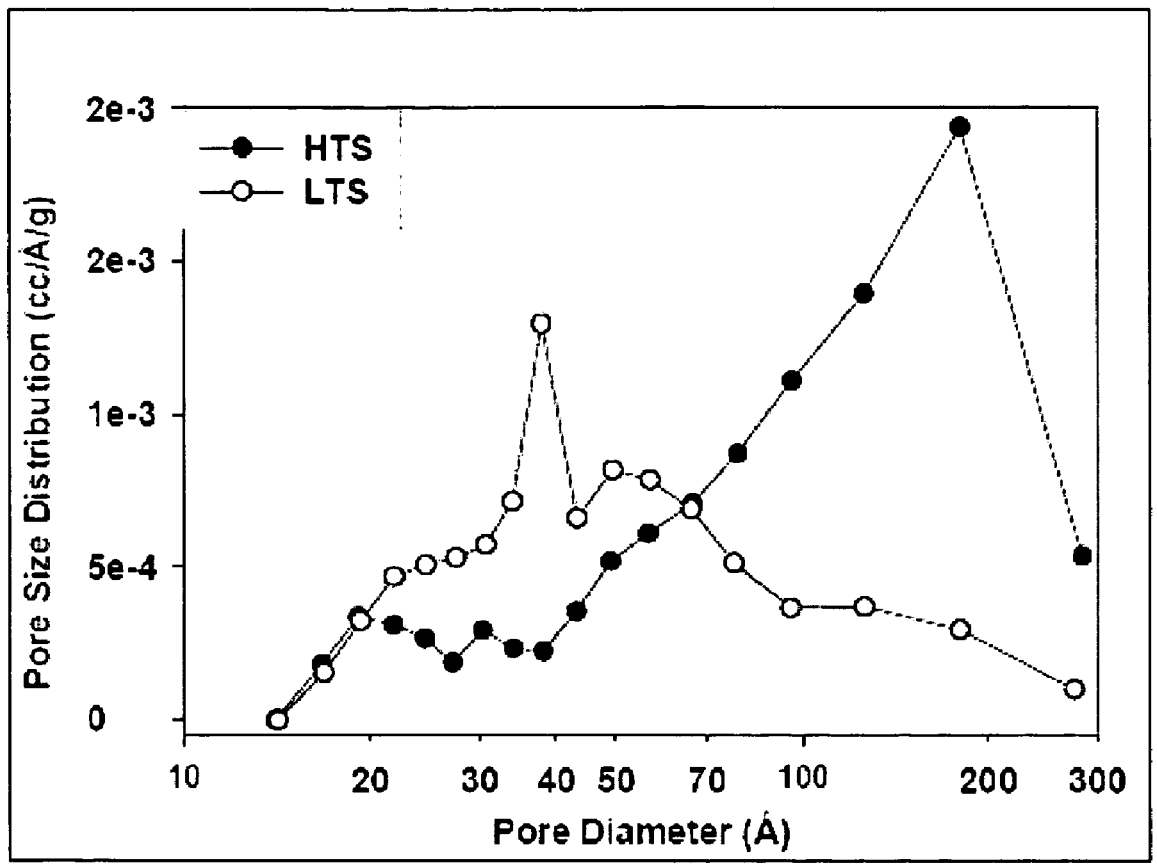
FIG. 19 is a pore size distribution of the HTS and LTS obtained from BET analysis.

The characterization of the high temperature shift (HTS) catalyst in a BET analyzer revealed that the catalyst has a BET surface area of 85 m²/g and a total pore volume of about 0.3 cc/g. The majority of the pores were found to occur around 180 Å as evident from the maximum in its pore size distribution plot shown in FIG. 19. In contrast, the low temperature shift (LTS) catalyst has a BET surface area of 52 m²/g and a total pore volume of about 0.1 cc/g. The majority of these pores were found to occur around 37 Å as evident from the maximum in its pore size distribution plot (FIG. 19).

Figure 20:
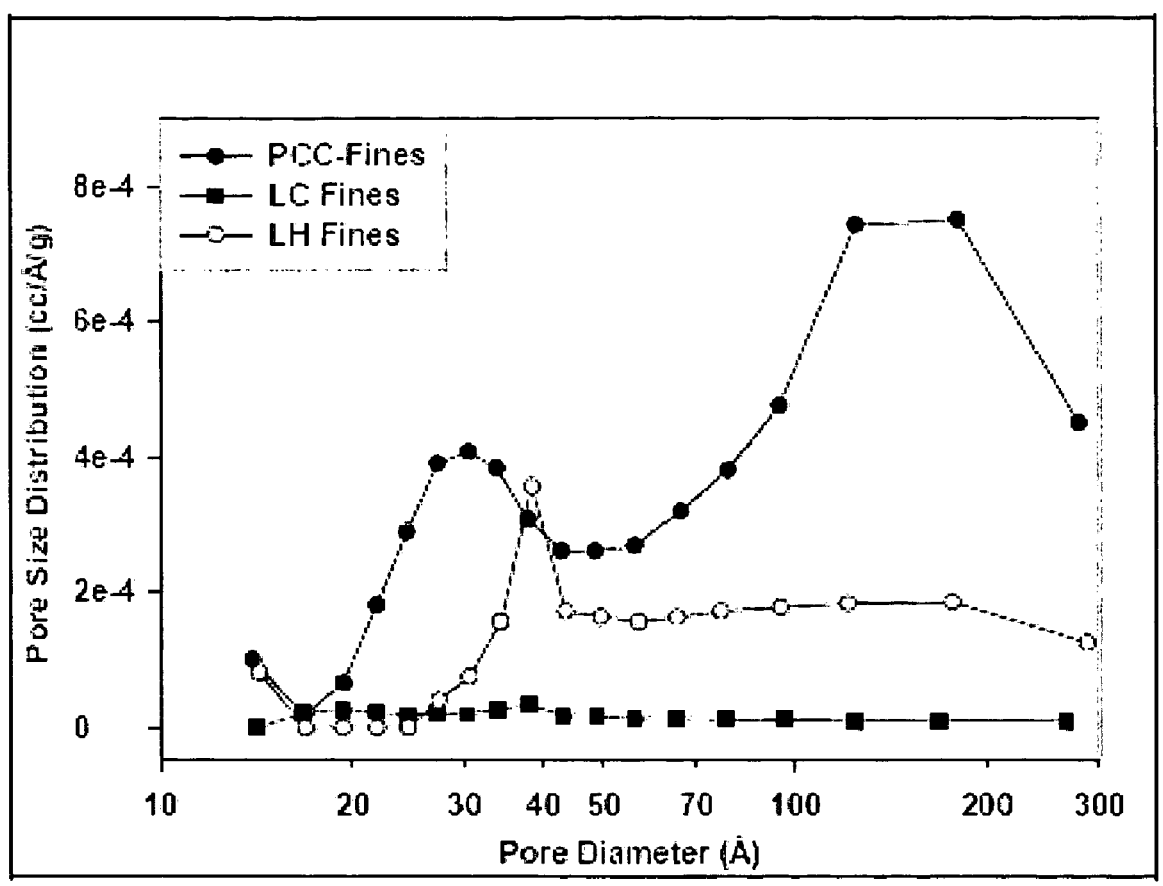
FIG. 20 shows the pore size distribution of various calcium oxide precursors.

The surface area (SA) and pore volume (PV) of the three different CaO precursors are provided in Table 5. FIG. 20 shows the pore size distribution (PSD) of these precursor fines. It can be seen that LC fines do not have high SA/PV. However, upon calcination and subsequent hydration, the SA/PV of the calcium hydroxide (LH) fines increase as can be observed for the LH sample. The porosity is maximized in the microporous range (30-50 Å range). In contrast, the SA/PV of the morphologically altered PCC are much higher. Further, most of the porosity lies in the 100-300 Å range.

TABLE 5

Morphological properties of the natural and synthesized CaO precursors and the HTS catalyst obtained from BET analyses.

| Sorbent | Surface Area (m2/g) | Pore Volume (cc/g) |
|---|---|---|
| Linwood Carbonate (LC) | 1.5 | 0.004 |
| Linwood Hydrate (LH) | 13.9 | 0.050 |
| Precipitated Calcium Carbonate (PCC) | 49.2 | 0.170 |
| High Temperature Shift (HTS) catalyst | 85 | 0.3 |

Water Gas Shift Reaction (WGSR): Catalyst Testing and Analysis

Figure 21:
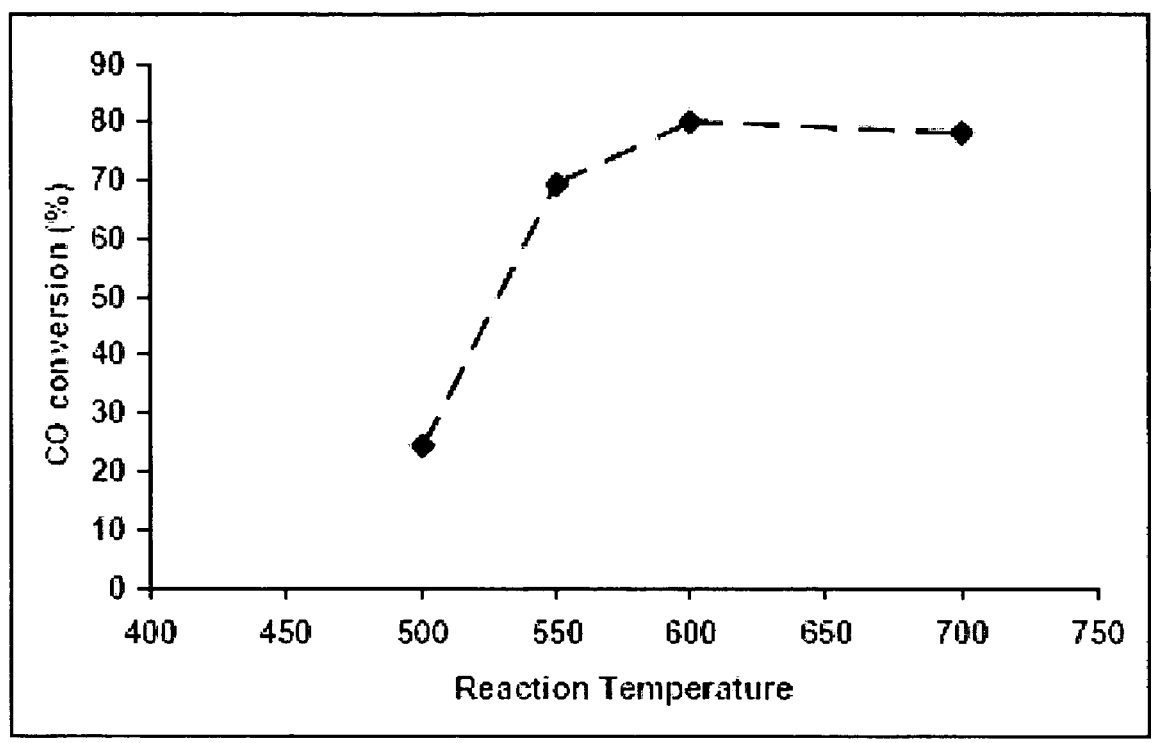
FIG. 21 shows the effect of reaction temperature on the CO conversion (0.5 g HTS catalyst, 3% CO, H2O/CO ration=3, total flow=1.5 slpm).

The HTS catalyst was tested for its catalyst activity towards the WGS reaction between 500-700° C. Blank runs (without any sorbent) were performed in a reaction mixture comprising of 3% CO and 9% H2O, the balance being 5.0 grade N2. The total gas flow-rate was maintained at about 1.5 slpm and the steam/CO ratio was set at ~3. Typically about 0.5 grams of the HTS catalyst was loaded in the reactor prior to each run. The catalyst activity increases monotonically with increasing reaction temperature. This is evident from FIG. 21 below. The CO conversion increases from 24.3% at 500° C. to 69.3% at 550° C. It finally reaches about 80% at 600° C. Beyond 600° C. the conversion does not change much but remains steady at ~78% at 700° C. This might be due to the equilibrium limitations governing the WGS reaction scheme is depicted in eqn (8) below:

$$CO + H2O \rightarrow CO2 + H2 \tag{8}$$

The data were further analyzed to check if the system was operating within the domain of WGS equilibrium. The thermodynamic equilibrium constant (K) for any temperature for this reaction was computed using the software "HSC Chemistry v 5.0" (Outokumpu Research Oy, Finland). The observed ratio was computed from the experimental data by obtaining the ratio of the partial pressures of the products and the reactants as per the eqn (9) below:

$$1/K_{obs} = \frac{(P_{CO})(P_{H_2O})}{(P_{H_2})(P_{CO_2})} \tag{9}$$

Figure 22:
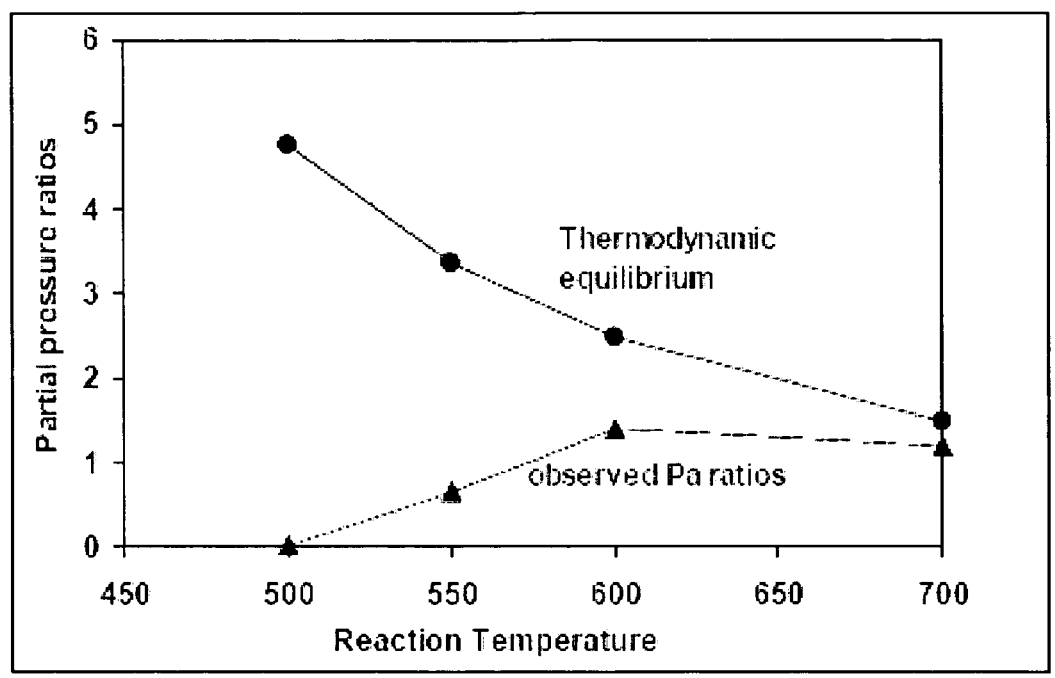
FIG. 22 shows the extent of reaction equilibrium as a function of temperature for the WGS reaction.

FIG. 22 illustrates the effect of temperature on the ratio of partial pressures (Kobs) obtained from the experimental data. This is compared with the thermodynamic equilibrium values ($K_{eq}$). From the figure it is evident that we are operating in the region that is below the thermodynamic equilibrium. At 500° C. the $K_{obs}$ is 0.028 while the corresponding $K_{eq}$ is 4.77. $K_{eq}$ monotonically decreases with increasing temperature. In contrast, $K_{obs}$ increases with temperature for our operating conditions. Thus, at 600° C. the $K_{obs}$ increases to 1.4 while the $K_{eq}$ moves down to 2.5. This trend continues and it is clearly evident from the figure that the system moves closer to equilibrium as we progressively increase the temperature from 500 to 700° C.

Combined Carbonation and Water Gas Shift Reaction: Sorbent Testing and Analyses The combined carbonation and WGS reaction was tested in the reactor assembly used for the catalyst testing. The experimental conditions were exactly identical to that used for testing the catalyst. The runs were performed in a reaction mixture comprising of 3% CO and 9% H₂O, the balance being 5.0 grade N₂. The total gas flow-rate was maintained at about 1.5 slpm and the steam/CO ratio was set at ~3. Typically about 0.5-1 g of the HTS catalyst was loaded in the reactor prior to each run. Different calcium oxide precursors were tested. Naturally occurring limestone, Linwood Carbonate (LC) and the corresponding hydrated lime, Linwood Hydroxide (LH) were obtained from Linwood Mining and Minerals Co. The structurally modified calcium carbonate (PCC) was prepared in-house and the details are outlined below.

Sorbent Testing without Catalyst

The sorbents were initially tested for catalytic activity towards WGSR and CO conversion without any HTS catalyst from 500-700° C. This would obviate the need for any catalyst in the system. However, detailed investigation resulted in very miniscule activity and hence it was concluded that HTS catalyst was required for further combined reaction testing.

Combined Reactions with PCC-HTS Catalyst System

Figure 23:
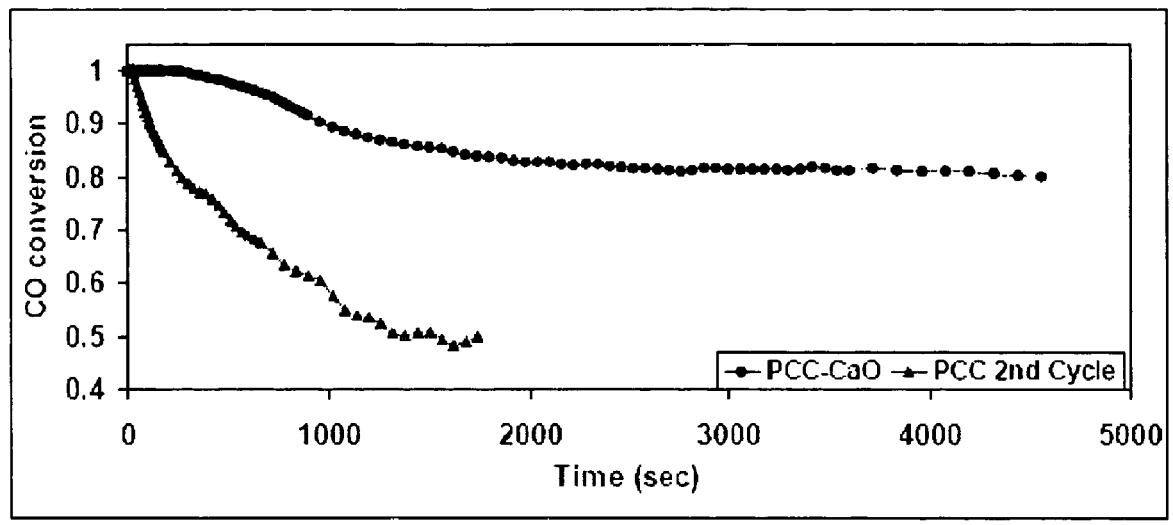
FIG. 23 is a breakthrough curve of CO conversion using a PCC-HTS catalyst system (T=600 C, 3% CO, 9% H2O, Total flow=1.5 slpm).

Typically about 0.5 g of HTS catalyst and 1.5 g of PCC were loaded in the reactor and the temperature was ramped till 700° C. in flowing $N_2$. This procedure ensured the calcination of the calcium carbonate to calcium oxide and it was monitored using $CO_2$ analyzer. Subsequently, the reaction temperature was lowered to 600° C. and the reaction gas mixture was allowed to flow through the system. The CO analyzer continuously monitored the CO flow through the system and the breakthrough curve depicting the CO conversion with time is as shown in FIG. 23 below. The system gives almost 100% conversion for first 240 seconds (4 min) following which the initial reactivity of the sorbent slowly falls to give about 90% CO conversion at 1000 seconds (16.5 min). The sorbent gradually achieves its maximum loading capacity with time and finally at around 2500 seconds (42 min) the sorbent reaches its breakthrough loading. Beyond this the CO conversion of 81% corresponds to that obtained with only the catalyst at 600° C. This can be validated from FIG. 21.

The system was then switched to pure $N_2$ flow and the reaction temperature was increased to 700° C. to drive the calcination of the $CaCO_3$ formed due to carbonation. Thus the reactions occurring in the system are:

Reaction Phase:

WGSR: $CO+H_2O \rightarrow CO_2+H_2$ (7)

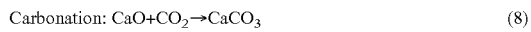

Carbonation: $CaO+CO_2 \rightarrow CaCO_3$ (8)

Regeneration Phase:

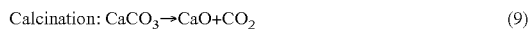

Calcination: $CaCO_3 \rightarrow CaO+CO_2$ (9)

The termination of the calcination was ensured by monitoring the CO2 released using a $CO_2$ analyzer. The reaction temperature was again lowered to 600° C. and the sorbent-catalyst system was subjected to the reaction mixture for a second reaction cycle. The $2^{nd}$ cycle CO breakthrough curve is also depicted in FIG. 23. It is evident from the figure that the CO conversion is not as superior as in the $1^{st}$ cycle. The CO conversion monotonically decreases to about 90% in 110 seconds, 80% in 240 seconds and gradually to about 50%. It is interesting to note that at the end of the breakthrough the sorbent-free catalytic CO conversion of 81% is not achievable. This could be attributed to the loss in the catalytic activity after the first regeneration cycle. This is because the catalyst is subjected to $CO_2$, an oxidizing atmosphere, during the calcination phase. Thus the deactivated catalyst is not able to augment the WGS reaction kinetics and hence we see a poor performance of the sorbent-catalyst system in the $2^{nd}$ cycle. The solitary sorbent has been subjected to numerous carbonation calcination cycles and has shown satisfactory performance (Iyer et al, 2004).

Combined Reactions with LH-HTS Catalyst System

Figure 24:
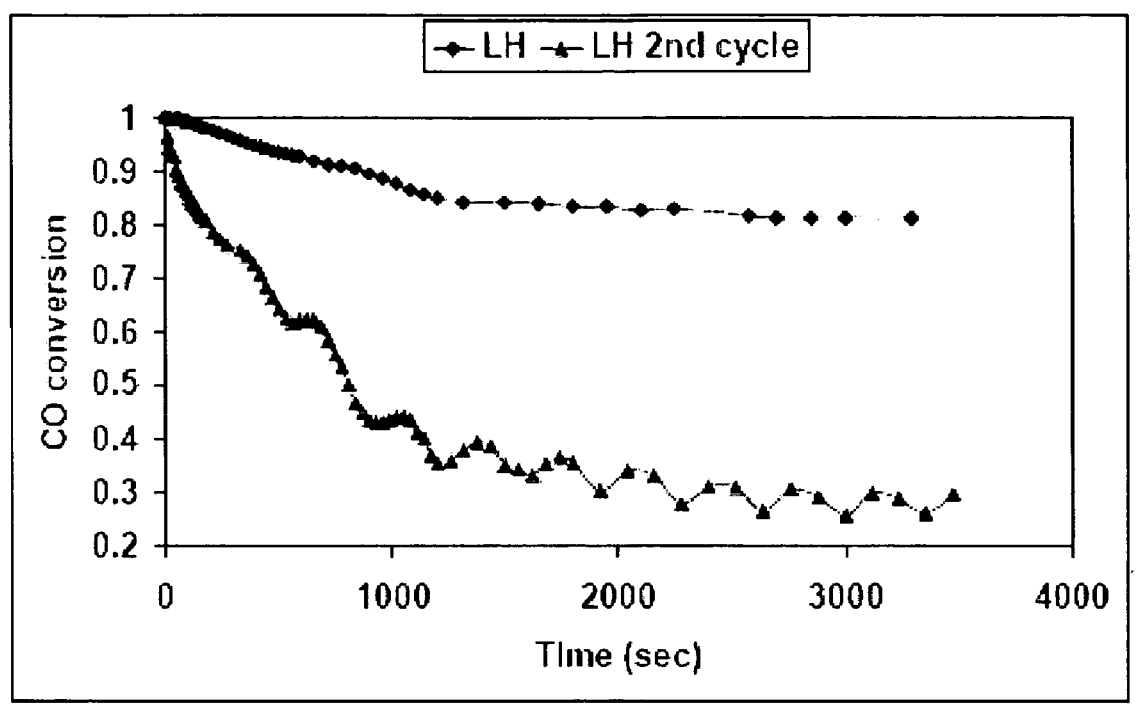
FIG. 24 is a breakthrough curve of CO conversion using a LH-HTS catalyst system (T=600 C, 3% CO, 9% H2O, total flow=1.5 slpm).

Typically about 1 g of the HTS catalyst and 1.3 g of LH were loaded in the reactor and the temperature was ramped up slowly till 600° C. in flowing $N_2$. This procedure ensured the calcination of the calcium hydroxide to calcium oxide. Calcium hydroxide decomposes above 400° C. Subsequently, the reaction gas mixture was allowed to flow through the system. The CO analyzer continuously monitored the CO flow through the system and the breakthrough curve depicting the CO conversion with time is as shown in FIG. 24 below. The system gives almost 100% conversion initially to give about 90% CO conversion at 900 seconds (15 min). The sorbent gradually achieves its maximum loading capacity with time and finally at around 3000 seconds (50 min) the sorbent has achieved its breakthrough loading. Beyond this the CO conversion of 81% corresponds to that obtained with only the catalyst at 600° C. as was shown in FIG. 21.

The system was then switched to pure $N_2$ flow and the reaction temperature was increased to 700° C. to drive the calcination of the $CaCO_3$ formed due to carbonation. Subsequently, the reaction temperature was lowered to 600° C. and the LH-CaO/catalyst system was subjected to the reaction mixture for a second reaction cycle. The $2^{nd}$ cycle CO breakthrough curve is also depicted in FIG. 24. It is evident from the figure that the CO conversion is not as superior as in the $1^{st}$ cycle. The CO conversion monotonically decreases to about 90% in 60 seconds, 80% in 180 seconds and gradually to about 30%. It is interesting to note that at the end of the breakthrough the sorbent-free catalytic CO conversion of 81% is not achievable. This could be attributed to the loss in the catalytic activity after the first regeneration cycle. This is because the catalyst is subjected to $CO_2$, an oxidizing atmosphere, during the calcination phase. Thus the deactivated catalyst is not able to augment the WGS reaction kinetics and hence we see a poor performance of the sorbent-catalyst system in the $2^{nd}$ cycle. The solitary sorbent had been subjected to numerous carbonation calcination cycles and has shown satisfactory performance over few cycles.

Comparison of the PCC and LH Sorbents

Figure 25:
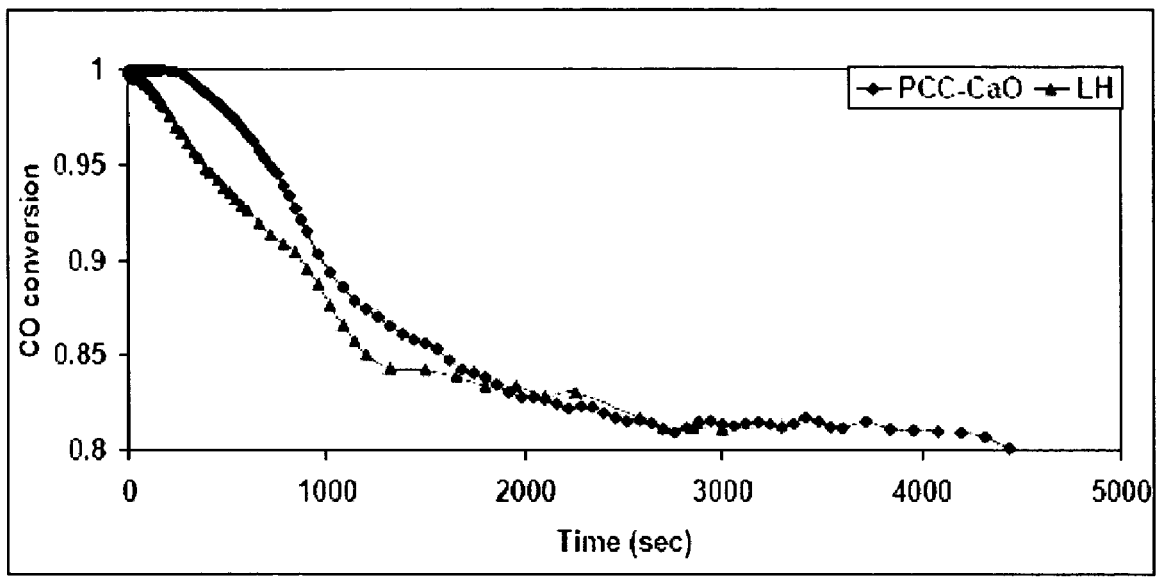
FIG. 25 provides a comparison of breakthrough curves for PCC-HTS and LH-HTS systems (T=600 C, 3% CO, 9% H2O, Total flow=1.5 slpm).

FIG. 25 compares the CO conversion breakthrough curves for the PCC and LH sorbent-catalyst systems. The curves are for the $1^{st}$ reaction cycle. The CO conversion at any given time for PCC-CaO is always higher than that of LH-CaO. The PCC system gives almost 100% conversion for first 240 seconds (4 min) while the LH sorbent system sustains this conversion only in the initial few seconds. Subsequently, the PCC system gives about 90% CO conversion at 1000 seconds (16.5 min) followed by 85% in 1600 seconds (27 min). In contrast, the LH system gradually gives about 90% CO conversion at 900 seconds (15 min) and followed by 85% in 1200 seconds (20 min). Both the sorbent systems gradually achieve their maximum loading capacity with time and finally at around 2500-3000 seconds they reach their breakthrough loading. Beyond this the CO conversion of 81% corresponds to that obtained with only the catalyst at 600° C. Hence, it is evident from FIG. 24 that the PCC-CaO performance dominates over that of LH-CaO at any given time.

Figure 26:
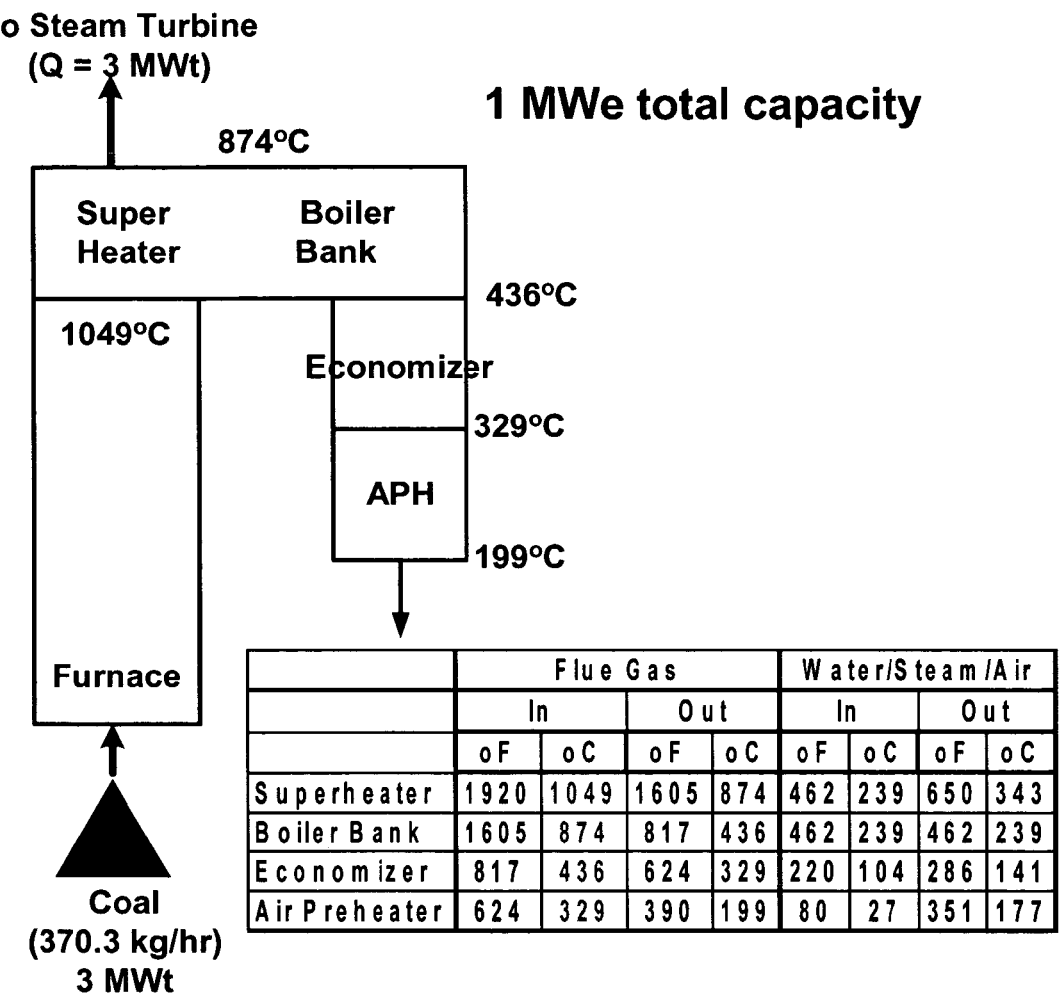
FIG. 26 depicts a typical steam generation scenario and use.

FIG. 26 illustrates the generation 1 MWe of steam.

Figure 27:
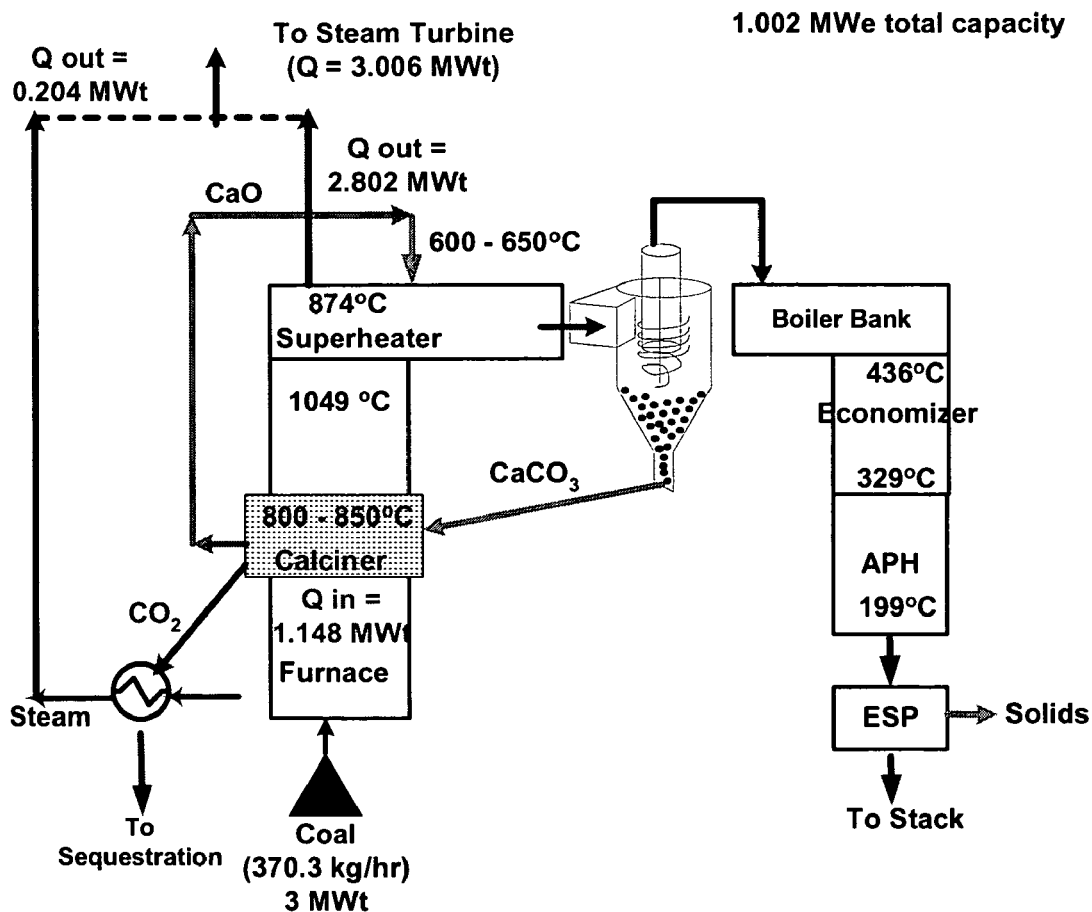
FIG. 27 depicts one implementation of one embodiment of the present invention.

FIG. 27 illustrates one embodiment of the present invention providing 1.002 MWe total capacity.

Figure 28:
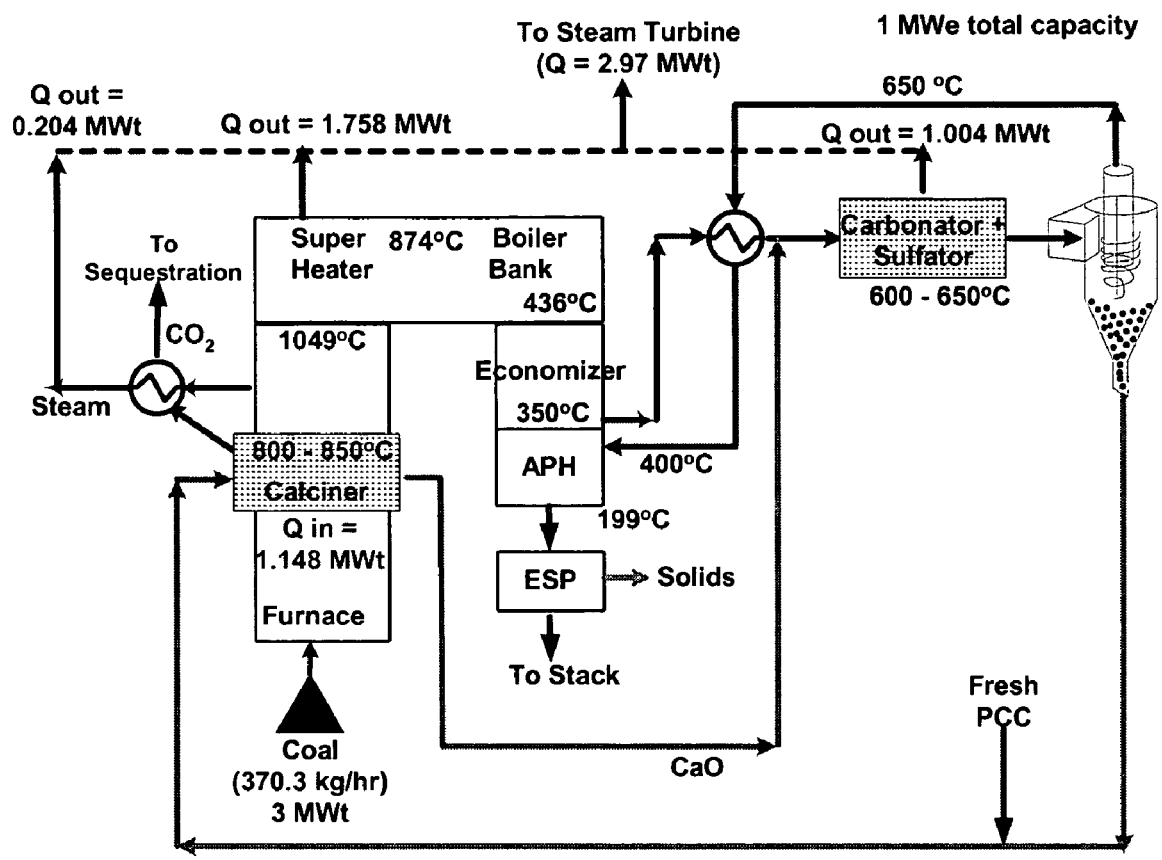
FIG. 28 depicts one implementation of one embodiment of the present invention.

FIG. 28 illustrates a second embodiment of the present invention providing 1 MWe total capacity.

Figure 29:
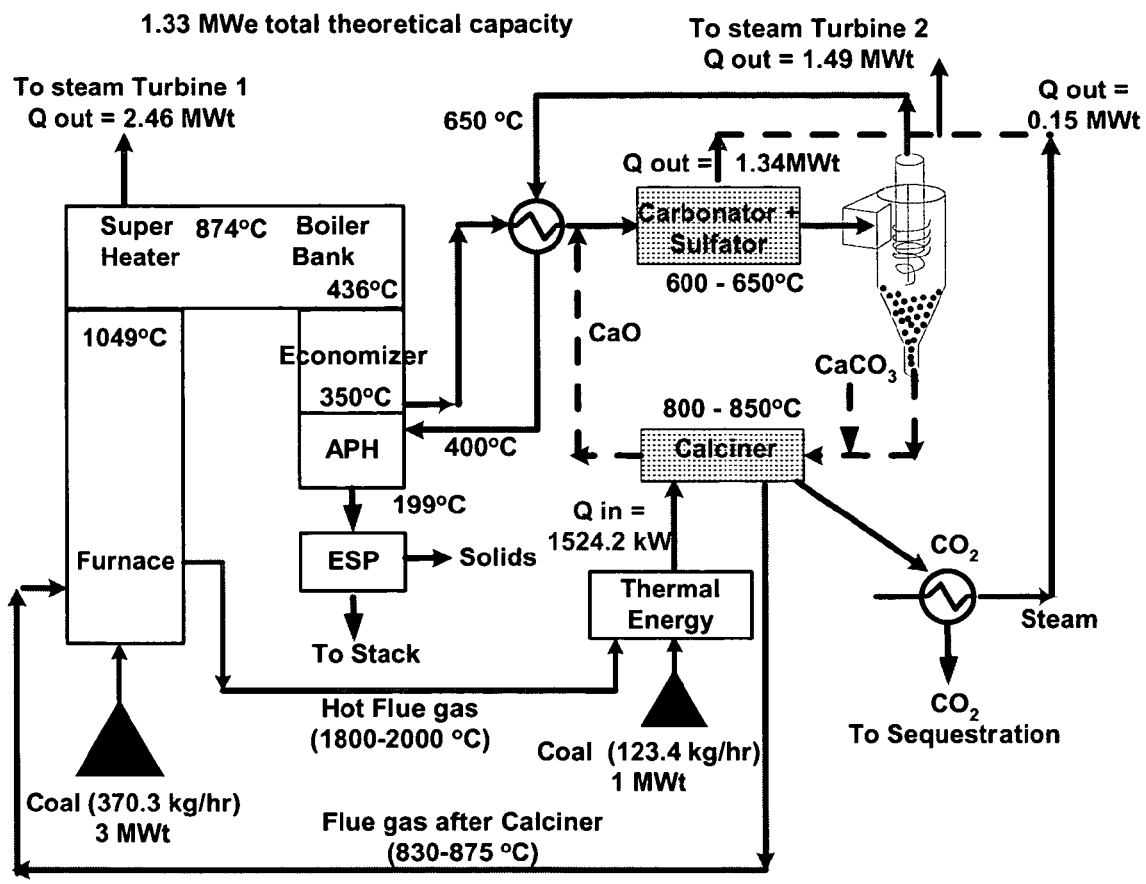
FIG. 29 depicts one implementation of one embodiment of the present invention.

FIG. 29 illustrates another embodiment of the present invention providing 1.33 MWe total capacity.

Figure 30:
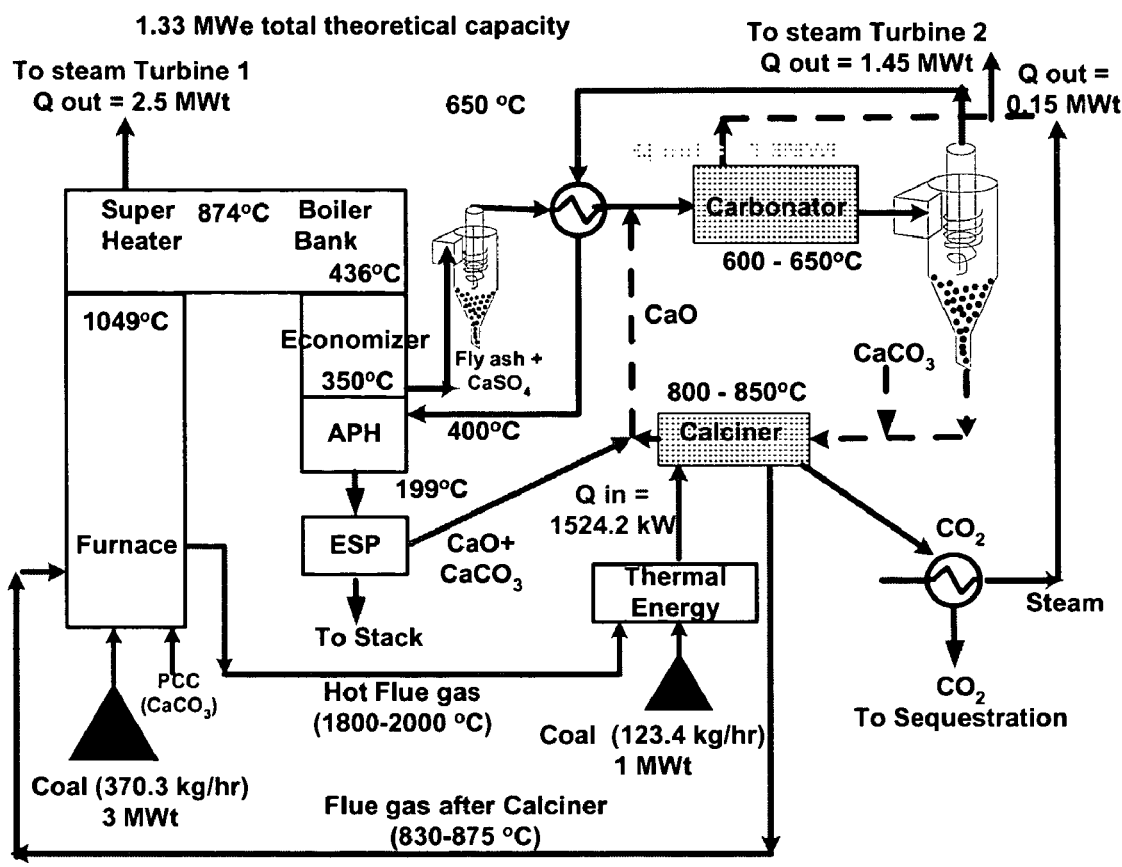
FIG. 30 depicts one implementation of one embodiment of the present invention.
Figure 31:
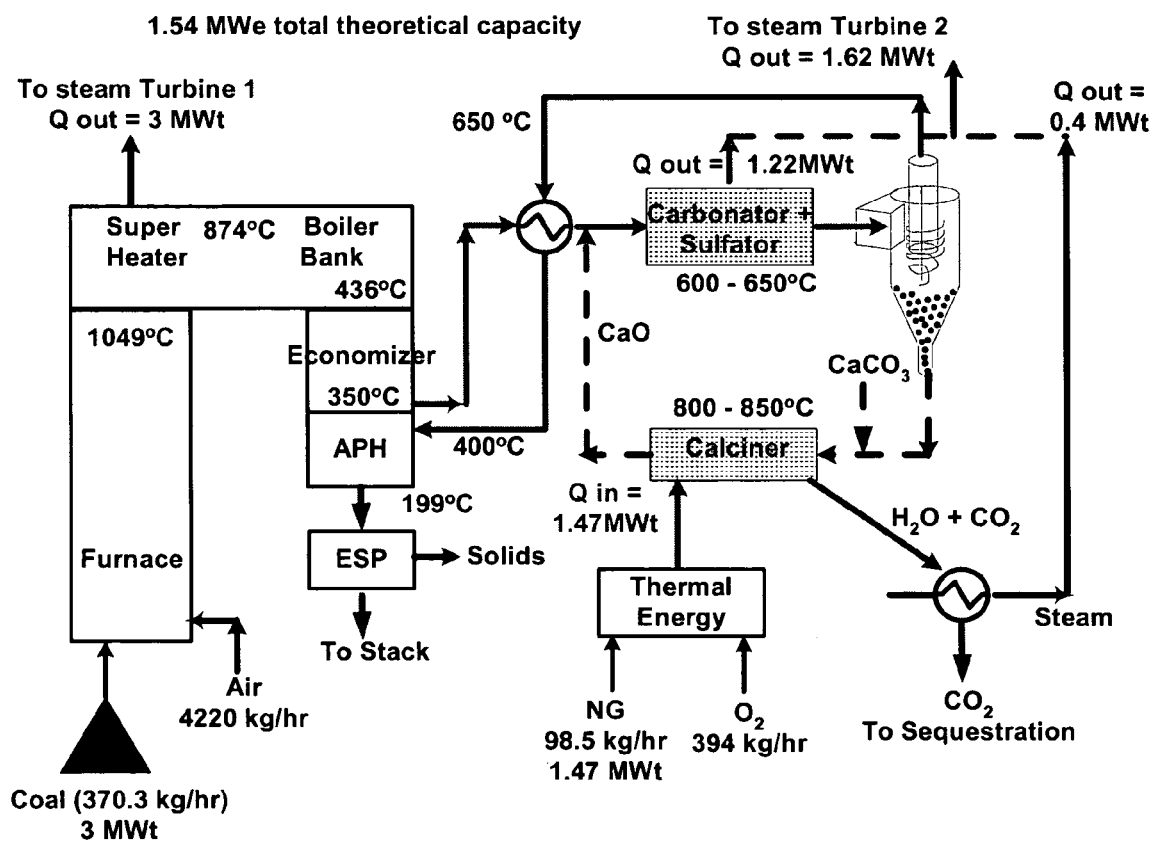
FIG. 31 depicts one implementation of one embodiment of the present invention.

FIG. 30 illustrates yet another embodiment of the present invention providing 1.33 MWe total capacity FIG. 31 illustrates an alternative embodiment of the present invention providing 1.54 MWe total capacity.

Figure 32:
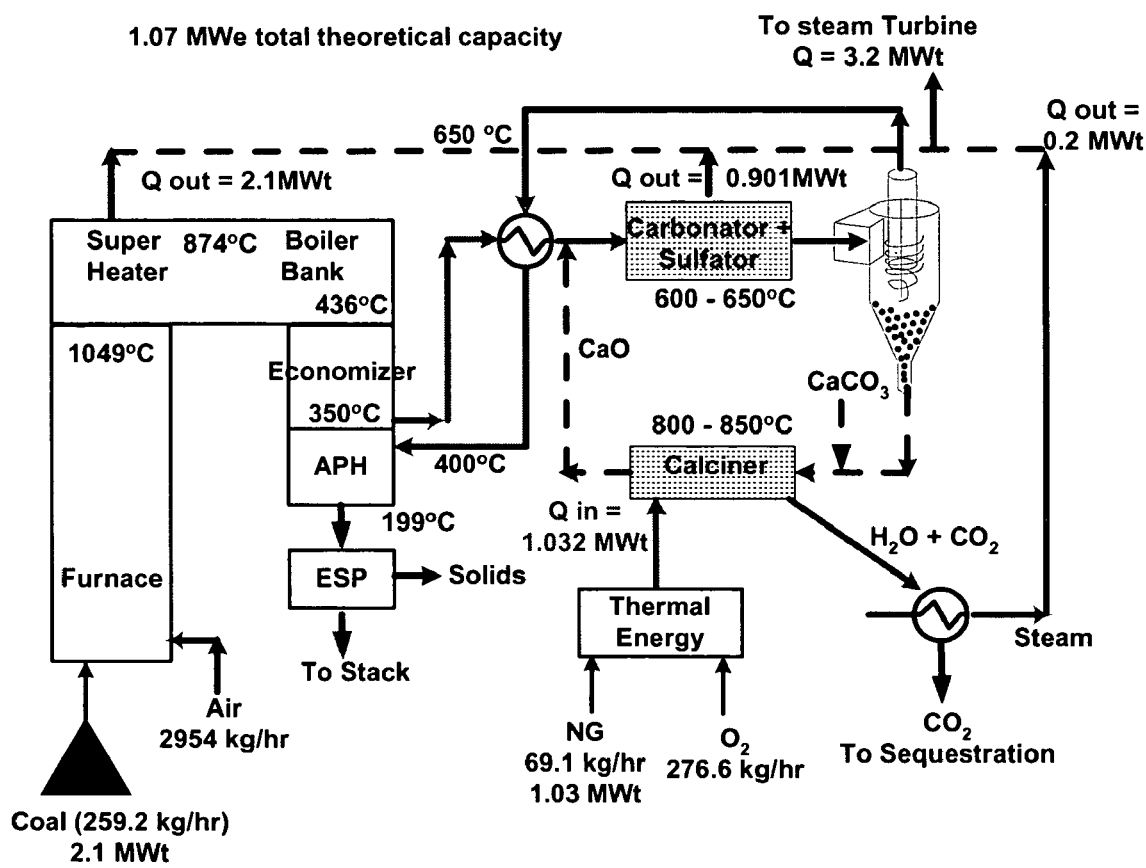
FIG. 32 depicts one implementation of one embodiment of the present invention.

FIG. 32 illustrates yet another alternative embodiment of the present invention providing 1.07 MWe total capacity.

Figure 33:
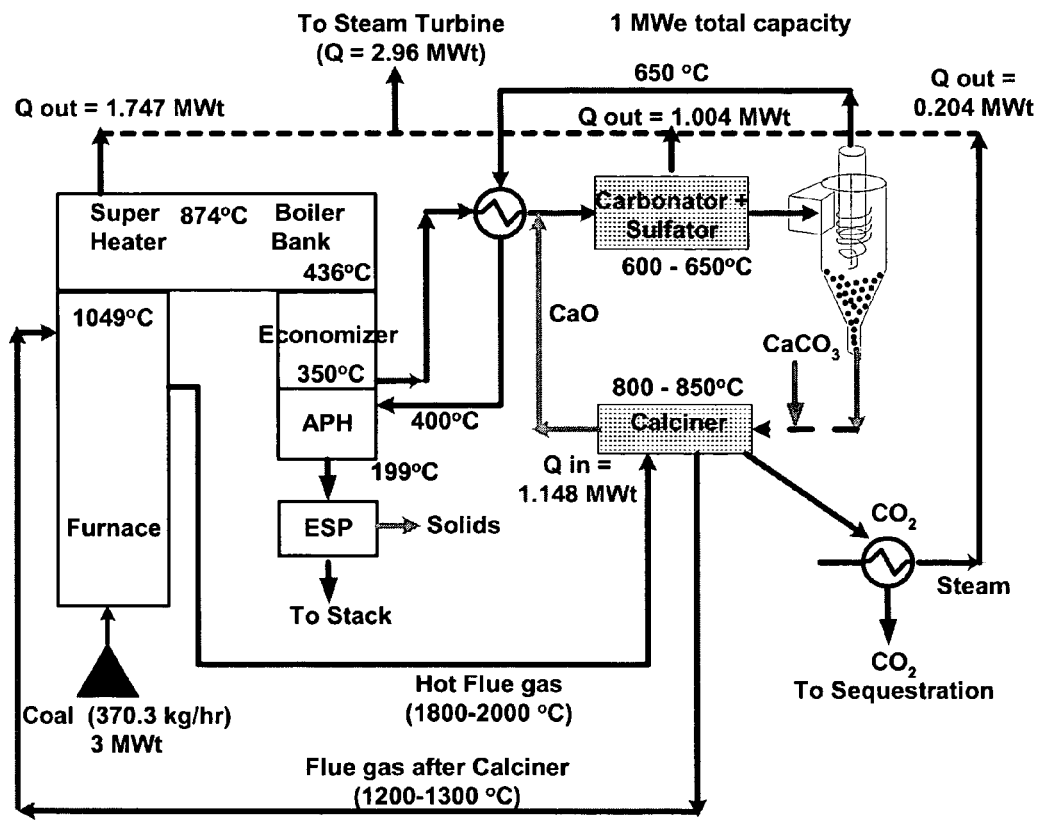
FIG. 33 depicts one implementation of one embodiment of the present invention.

FIG. 33 illustrates an alternative embodiment of the present invention providing 1 MWe total capacity.

Figure 34:
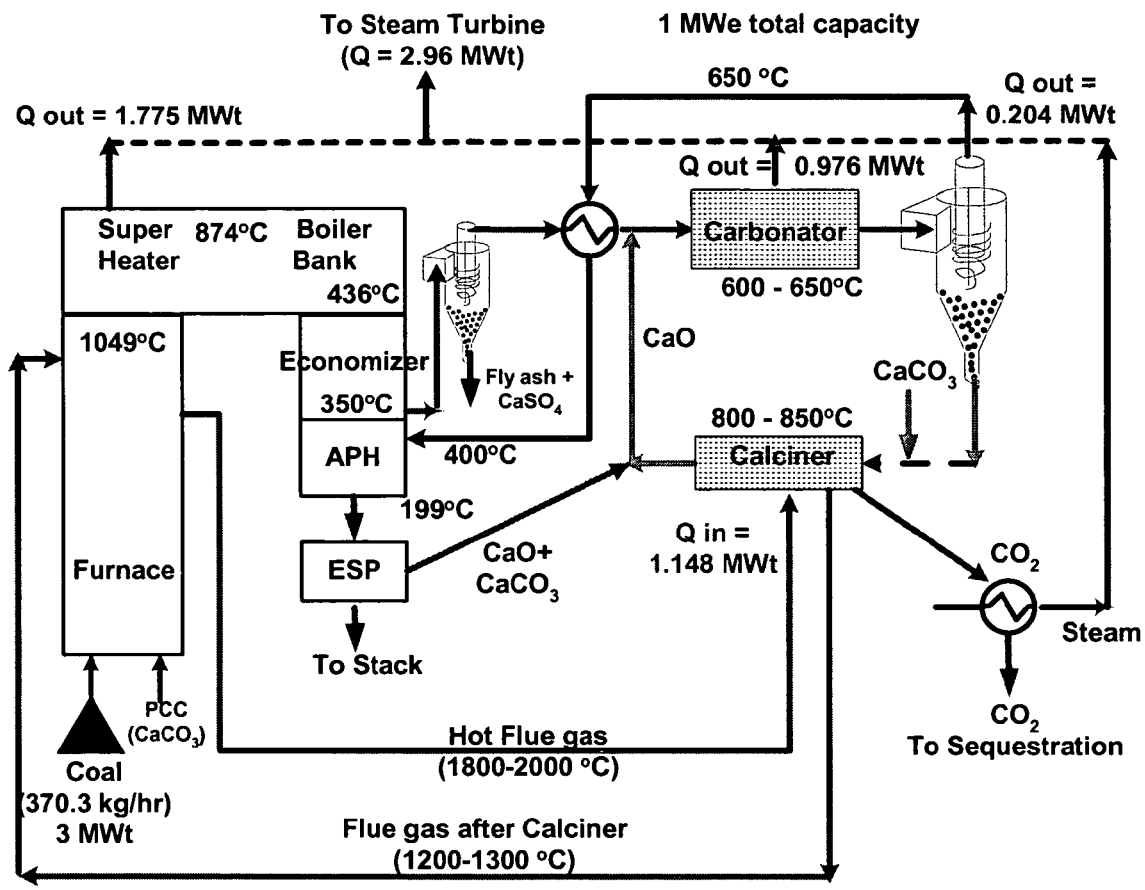
FIG. 34 depicts one implementation of one embodiment of the present invention.

FIG. 34 illustrates an alternative embodiment of the present invention providing 1 MWe total capacity.

Figure 35:
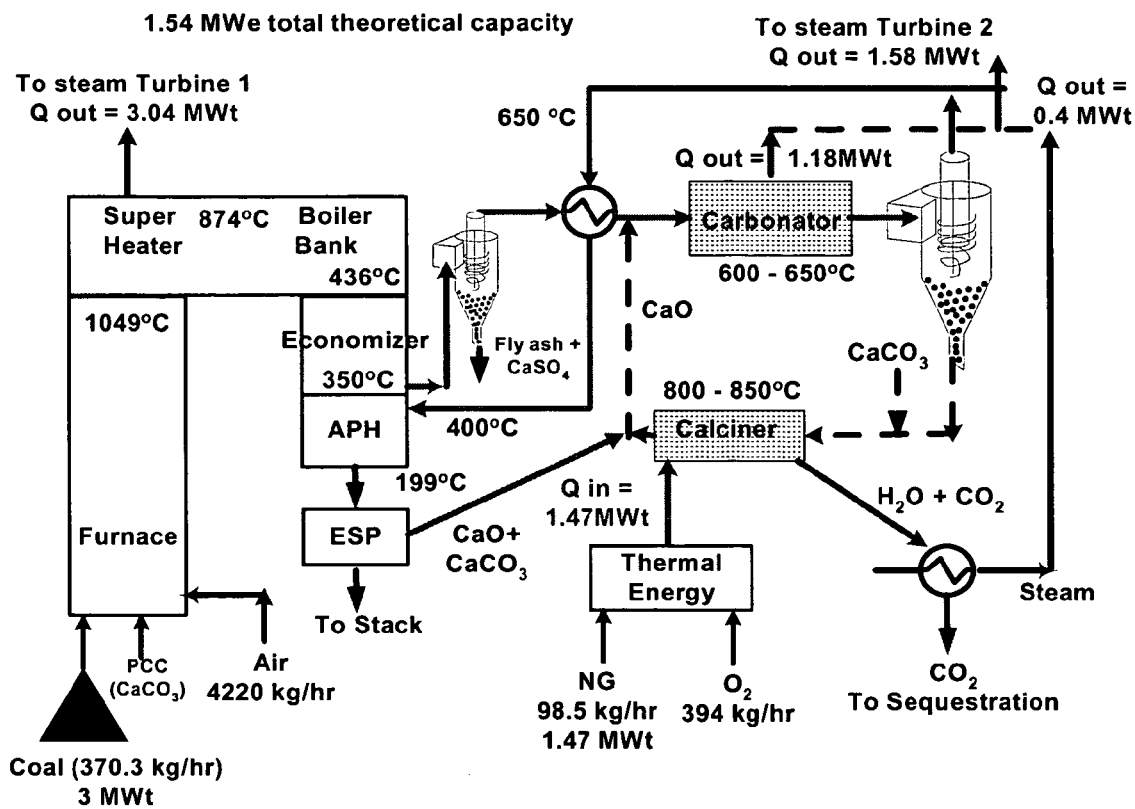
FIG. 35 depicts one implementation of one embodiment of the present invention.

FIG. 35 illustrates yet another embodiment of the present invention providing 1.54 MWe total capacity.

Figure 36:
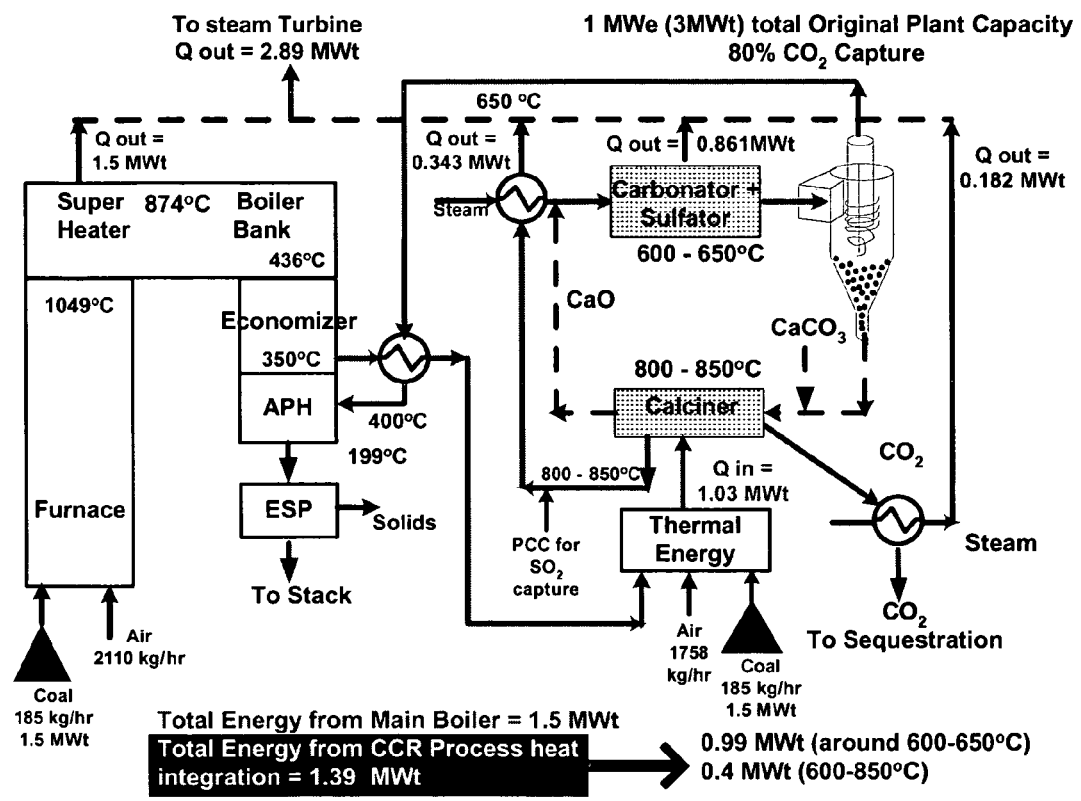
FIG. 36 depicts one implementation of one embodiment of the present invention.

FIG. 36 illustrates an alternative embodiment of the present invention providing 1 MWe total capacity at 80% $CO_2$ capture.

Figure 37:
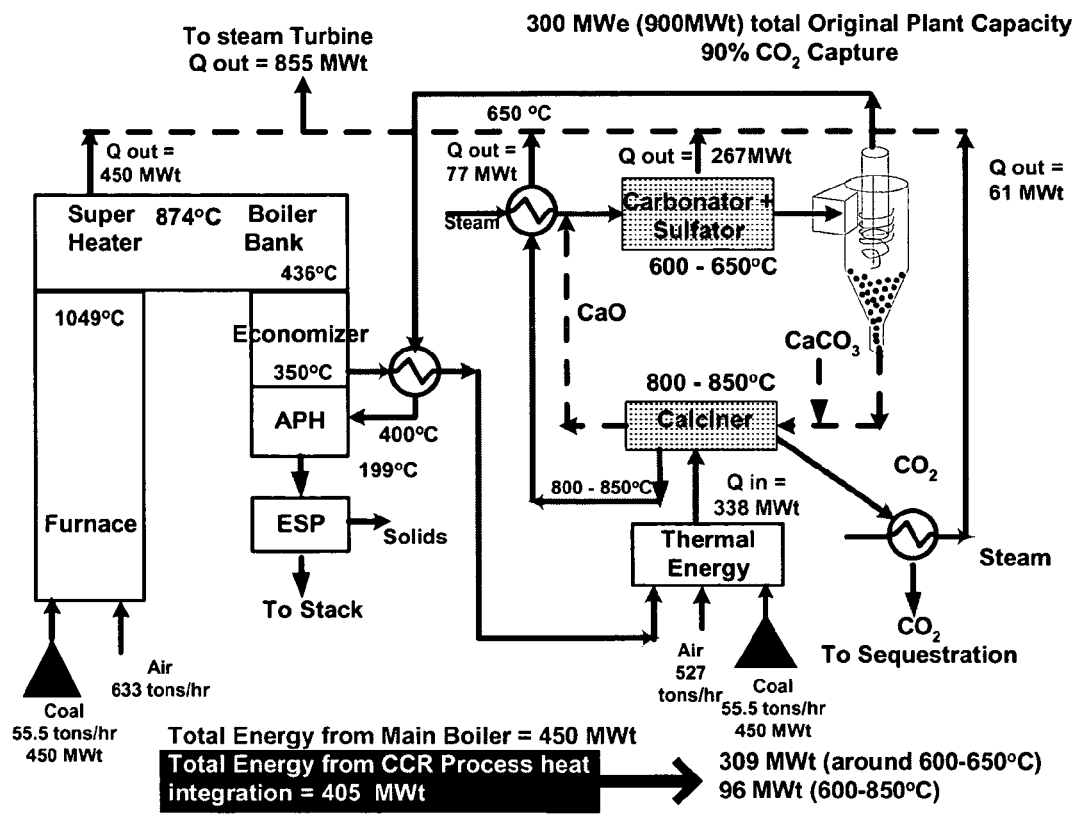
FIG. 37 depicts one implementation of one embodiment of the present invention.

FIG. 37 illustrates another embodiment of the present invention providing 300 MWe total capacity at 90 $CO_2$ capture.

CONCLUSIONS

The enhanced water gas shift reaction for $H_2$ production with in-situ carbonation was studied at 600° C. using HTS catalyst and calcium sorbents. A naturally occurring calcium precursor (Linwood hydrate, LH) and a modified mesoporous Precipitated Calcium Carbonate (PCC) were used for capturing $CO_2$ for two successive cycles. The PCC system gives almost 100% conversion for first 4 min followed by 90% at 16.5 min. In contrast, the LH sorbent system sustains 100% conversion only in the initial few seconds and gradually gives about 90% CO conversion at 15 min. Experimental evidence clearly shows that the PCC-CaO performance dominates over that of LH-CaO at any given time.

While the invention has been described in connection with what is presently considered to be the most practical and preferred embodiments, it is to be understood that the invention is not to be limited to the disclosed embodiment(s), but on the contrary, is intended to cover various modifications and equivalent arrangements included within the spirit and scope of the appended claims, which are incorporated herein by reference.

What is claimed is:

1. A method for separating carbon dioxide from a flow of gas comprising carbon dioxide, said method comprising the steps of:
    directing said flow of gas to a gas-solid contact reactor, said gas-solid contact reactor containing at least one mesoporous sorbent, said at least one mesoporous sorbent comprising at least one metal oxide;
    reacting said carbon dioxide with said at least one sorbent so as to remove said carbon dioxide from said flow of gas at a temperature of about 600° C. to about 700° C., thereby converting said at least one mesoporous sorbent into spent sorbent;
    calcining said spent sorbent so as to liberate said carbon dioxide from said spent sorbent, thereby regenerating said mesoporous sorbent; and
    repeating the aforementioned steps.

2. The method according to claim 1 wherein said at least one metal oxide is selected from the group consisting of: ZnO, MgO, $MnO_2$, NiO, CuO, PbO, and CaO.

3. The method according to claim 1 wherein said spent sorbent is a metal carbonate.

4. The method according to claim 1 wherein said sorbent has a sorption capacity of at least about 70 grams of carbon dioxide per kilogram of sorbent.

5. The method according to claim 1 wherein said sorbent has a sorption capacity of at least about 300 grams of carbon dioxide per kilogram of sorbent.

6. The method according to claim 1 wherein said sorbent has substantially the same sorption capacity after calcining as said sorbent had prior to adsorbing said carbon dioxide.

7. The method according to claim 1 wherein said calcining is performed under at least partial vacuum.

8. The method according to claim 1 wherein said calcining is performed by steam.

9. A facility practicing the method according to claim 1.

10. A method for separating carbon dioxide from a flow of gas comprising carbon dioxide, said method comprising the steps of:
    directing said flow of gas to a first gas-solid contact reactor, said first gas-solid contact reactor containing at least one sorbent, said sorbent comprising calcined modified mesoporous preciritated calcium carbonate;
    reacting said carbon dioxide in said flow of gas on said sorbent in said first gas-solid contact reactor so as to remove said carbon dioxide from said flow of gas at a temperature of about 600° C. to about 700° C.;
    directing said flow of gas to a second gas-solid contact reactor when said sorbent in said first gas-solid contact reactor is spent thereby forming spent sorbent, said second gas-solid contact reactor containing at least one sorbent, said sorbent comprising calcined modified mesoporous preciritated calcium carbonate;
    reacting said carbon dioxide in said flow of gas on said sorbent in said second gas-solid contact reactor so as to remove said carbon dioxide from said flow of gas at a temperature of about 600° C. to about 700° C.;
    calcining said spent sorbent from said first gas-solid contact reactor so as to generate carbon dioxide and to regenerate said sorbent;
    directing said flow of gas to said first gas-solid contact reactor when said sorbent in said second gas-solid contact reactor is spent, thereby forming spent sorbent; and
    calcining said spent sorbent from said second gas-solid contact reactor so as to generate carbon dioxide and to regenerate said sorbent.

11. The method according to claim 10 wherein said calcining of said spent sorbent from said first gas-solid contact reactor is performed under at least partial vacuum.

12. The method according to claim 10 wherein said calcining of said spent sorbent from said first gas-solid contact reactor is performed by steam.

13. The method according to claim 10 wherein said calcining of said spent sorbent from said second gas-solid contact reactor is performed under at least partial vacuum.

14. The method according to claim 10 wherein said calcining of said spent sorbent from said second gas-solid contact reactor is performed by steam.

15. The method according to claim 10 wherein said calcined modified mesoporous preciritated calcium carbonate has a mean pore size distribution of about 5 nanometers to about 20 nanometers.

16. The method according to claim 10 wherein said sorbent has a sorption capacity of at least about 70 grams of carbon dioxide per kilogram of sorbent.

17. The method according to claim 10 wherein said sorbent has a sorption capacity of at least about 300 grams of carbon dioxide per kilogram of sorbent.

18. The method according to claim 10 wherein said sorbent has substantially the same sorption capacity after calcining as said sorbent had prior to adsorbing said carbon dioxide.

19. A facility practicing the method according to claim 10.

20. A method of separating carbon dioxide from a flow of gas comprising carbon dioxide, said method comprising the steps of:
    calcining a modified Precipitated Calcium carbonate so as to produce a mesoporous sorbent;
    directing said flow of gas into contact with said sorbent, said sorbent at a temperature of about 600° C. to about 700° C.;
    reacting said carbon dioxide with said sorbent so as to remove said carbon dioxide from said flow of gas, thereby converting said sorbent into a spent sorbent;
    calcining said sorbent so as to liberate said carbon dioxide from said spent sorbent, thereby regenerating said sorbent; and
    repeating the aforementioned steps.

* * * * *

UNITED STATES PATENT AND TRADEMARK OFFICE
CERTIFICATE OF CORRECTION

PATENT NO. : 7,618,606 B2  Page 1 of 2
APPLICATION NO. : 11/255099
DATED : November 17, 2009
INVENTOR(S) : Fan et al.

It is certified that error appears in the above-identified patent and that said Letters Patent is hereby corrected as shown below:

On the title page, Item (54), please delete "SEPARATION OF CARBON DIOXIDE ($CO_2$) FROM GAS MIXTURES" and insert -- SEPARATION OF CARBON DIOXIDE ($CO_2$) FROM GAS MIXTURES BY CALCIUM BASED REACTION SEPARATION (CaRS-$CO_2$) PROCESS --.

On the Title Page:

The first or sole Notice should read --

Subject to any disclaimer, the term of this patent is extended or adjusted under 35 U.S.C. 154(b) by 1002 days.

On the title page, Item (56) References Cited, FOREIGN PATENT DOCUMENTS, please delete "DE 265559 A1 3/1989" and insert -- DD 265559 A1 3/1989 --.

On the title page, Item (56) References Cited, FOREIGN PATENT DOCUMENTS, please delete "EP 1251948   10/2002" and insert -- EP 1251948 A0 10/2002 --.

In column 1, lines 1-2, please delete "SEPARATION OF CARBON DIOXIDE ($CO_2$) FROM GAS MIXTURES" and insert -- SEPARATION OF CARBON DIOXIDE ($CO_2$) FROM GAS MIXTURES BY CALCIUM BASED REACTION SEPARATION (CaRS-$CO_2$) PROCESS --.

In column 2, line 6, please delete "Report No. DE-AF22-96PC1257" and insert -- Report No. DE-AF22-96PC01257 --.

In column 5, line 56, please delete "KWGS" and insert -- $K_{WGS}$ --.

In column 12, line 34, please delete "$_{40}g$" and insert -- 40g --.

In column 26, line 2 claim 10, please delete "mesorporous preciritated" and insert -- mesoporous precipitated --.

Signed and Sealed this

Nineteenth Day of October, 2010

David J. Kappos
*Director of the United States Patent and Trademark Office*

CERTIFICATE OF CORRECTION (continued)
U.S. Pat. No. 7,618,606 B2

In column 26, line 12 claim 10, please delete "preciritated" and insert -- precipitated --.

In column 26, line 38 claim 15, please delete "mesorporous preciritated" and insert -- mesoporous precipitated --.